United States Patent [19]
Daley

[11] Patent Number: 5,650,994
[45] Date of Patent: Jul. 22, 1997

[54] OPERATION SUPPORT SYSTEM FOR SERVICE CREATION AND NETWORK PROVISIONING FOR VIDEO DIAL TONE NETWORKS

[75] Inventor: Kathleen Daley, Manassass, Va.

[73] Assignee: Bell Atlantic Network Services, Inc., Arlington, Va.

[21] Appl. No.: 441,590

[22] Filed: May 16, 1995

[51] Int. Cl.$^6$ .................................................. H04L 12/28
[52] U.S. Cl. ...................... 370/259; 370/40.1; 364/514 A
[58] Field of Search ........................ 370/259, 271, 370/395, 401; 348/6, 7, 9, 10, 12, 13, 434, 435, 465, 467, 468; 364/514 A; 395/200.1; 455/3.1, 4.1, 4.2, 5.1, 6.3, 15

[56] References Cited

U.S. PATENT DOCUMENTS

| | | | |
|---|---|---|---|
| 4,965,825 | 10/1990 | Harvey et al. | 380/9 |
| 5,231,494 | 7/1993 | Wachob . | |
| 5,247,347 | 9/1993 | Litteral et al. . | |
| 5,568,489 | 10/1996 | Yien et al. | 395/200.01 |
| 5,581,552 | 12/1996 | Civanlar et al. | 370/401 |

*Primary Examiner*—Melvin Marcelo
*Attorney, Agent, or Firm*—Lowe, Price, LeBlanc & Becker

[57] ABSTRACT

An operational support system includes service creation, service activation and service control functions to provide on-line service activation for video information providers (VIPs) and video information users (VIUs) on a video dial tone network. The operational support system provides an open interface for VIPs to remotely provision network resources by remotely accessing and requesting changes in corresponding VIP profiles, stored in the operational support system, in order to add/delete VIP subscribers, update event schedules, and/or to download billing and usage statistics. The operational support system processes the remote request by verifying the request data with internal subscriber databases, comparing the request with available network inventory, and provisioning network resources by generating requests to network elements to establish the new service. The operational support system also is adapted to perform network creation functions including initial network configuration, logical assignment of network elements, initializing network element systems, assignment of work orders for physical interconnections, and performance verification of installed systems.

51 Claims, 14 Drawing Sheets

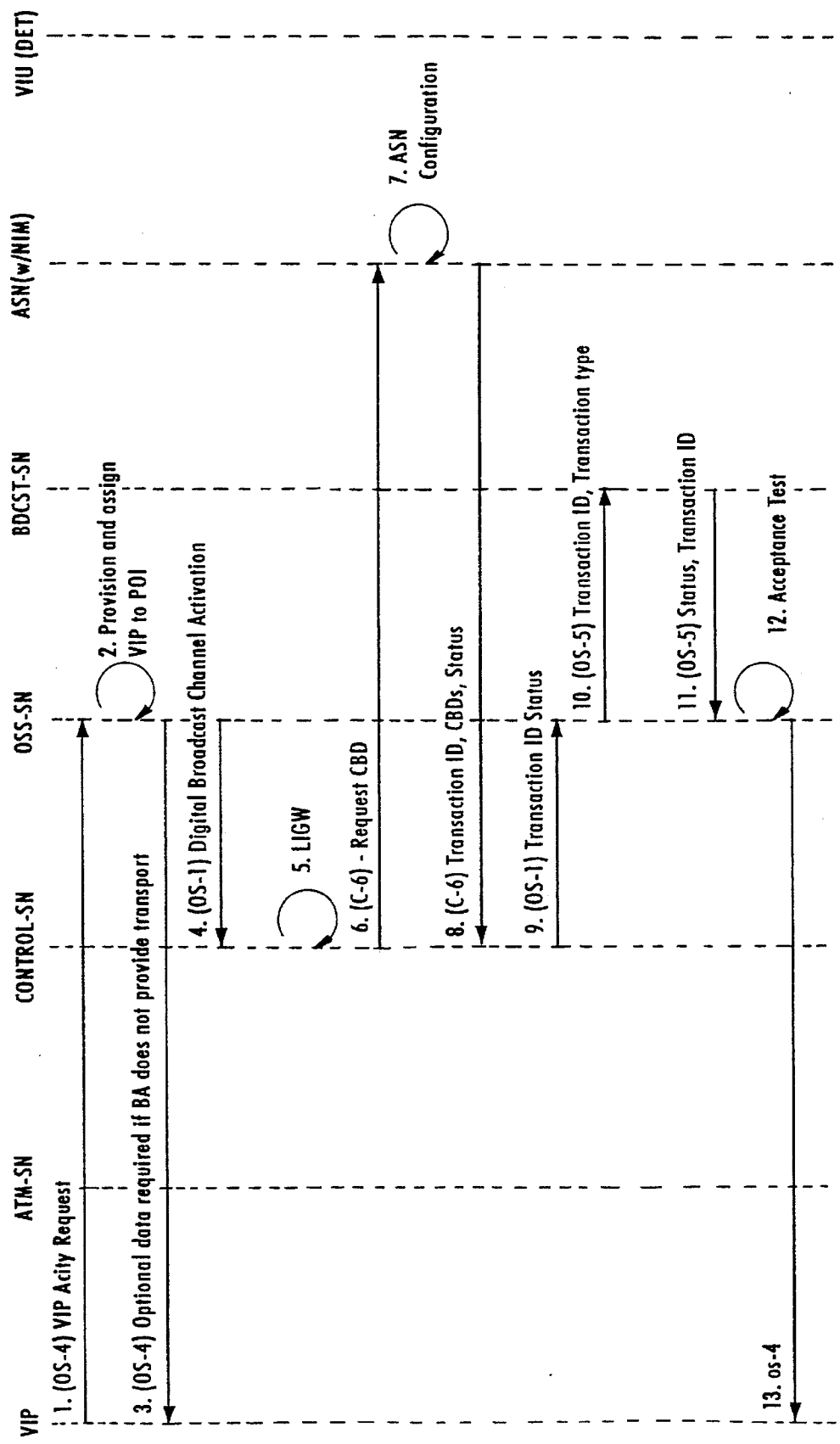

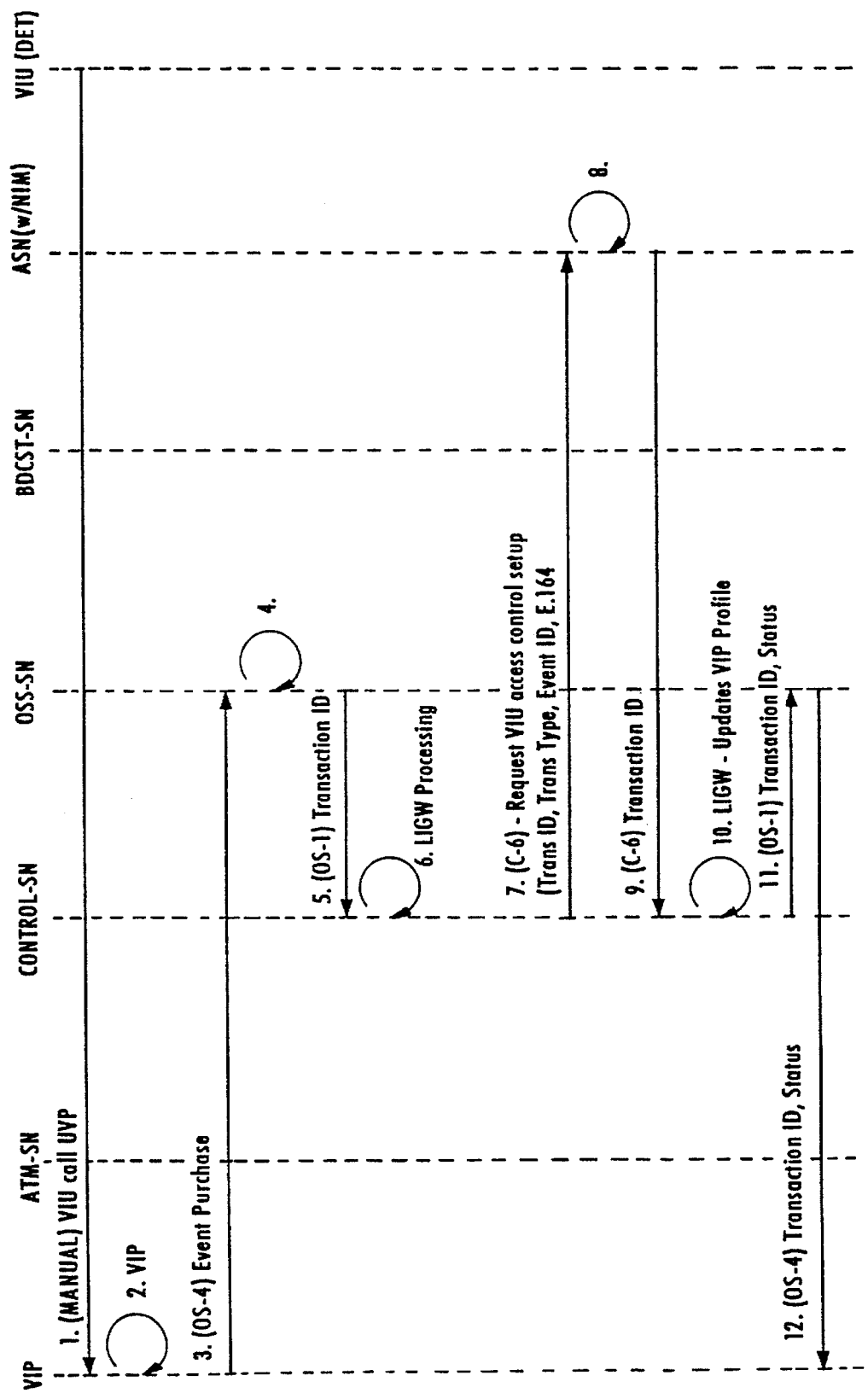

OPERATION SUPPORT SYSTEM FOR SERVICE CREATION AND NETWORK PROVISIONING FOR VIDEO DIAL TONE NETWORKS

TECHNICAL FIELD

The present invention relates to operational support systems for use in switched information networks, such as video distribution networks, for performing service creation and provisioning of video dial tone services in order to provide subscribers with access to multiple information service providers.

ACRONYMS

The written description and drawings use a large number of acronyms to refer to various services and system components. Although generally known, use of several of these acronyms is not strictly standardized in the art. For purposes of this discussion, acronyms therefore will be defined as follows:

Access Subnetwork (ASN)
Access Subnetwork Controller (ASNC)
Asymmetrical Digital Subscriber Line (ADSL)
Asynchronous Transfer Mode (ATM)
ATM Adaptation Layer (AAL)
ATM cell Adaptation Unit (AAU)
ATM Packet Demultiplexer (APD)
Broadcast (BC)
Broadcast Consolidation Section (BCS)
Broadcast Service Area (BSA)
Carrier Access Billing System (CABS)
Cell Loss Priority (CLP) bit
Central Office (CO)
Customer Record Information System (CRIS)
Customer Premises Equipment (CPE)
Digital Cross-connect Switch (DCS)
Digital Entertainment Terminal (DET)
Drop and Continue (D/C)
Electrical to Optical (E/O)
Ethernet (ENET)
First-In-First-Out (FIFO) buffers
Header Error Check (HEC) word
Integrated Services Digital Network (ISDN)
Interactive Multimedia Television (IMTV)
Level 1 (L1)
Level 1 Gateway (L1GW)
Level 2 (L2)
Level 2 Gateway (L2GW)
Local Loop Distribution (LLD) network
Local Video Access Node (LVAN)
Media Access Control (MAC)
Moving Pictures Experts Group (MPEG)
Network Interface Controller (NIM)
Network Interface Device (NID)
Operations and Support System (OSS)
Optical to Electrical (O/E)
Over-the-Air (OTA)
Packetized Elementary Streams (PES)
Payload Type (PT)
Pay-Per-View (PPV)
Permanent Virtual Circuit (PVC)
Permanent Virtual Circuit Controller (PVCC)
Personal Identification Number (PIN)
Physical Layer Convergence Protocol (PLCP)
Plain Old Telephone Service (POTS)
Point of Interconnect (POI)
Program Clock Reference (PCR)
Program Identification (PID) number
Public Access Channel (PAC)
Public Switched Network (PSN)
Quadrature Amplitude Modulation (QAM)
Quadrature Phase-Shift Keyed (QPSK) modulation
Time-Division Multiple Access (TDMA)
Vestigial Sideband (VSB) modulation
Video Dial Tone (VDT)
Video Information Provider (VIP)
Video Information User (VIU)
Video Network Hub (VNH)
Video Provider Service Center (VPSC)

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television (CATV) systems have initiated distribution of premium channels viewable only by subscribers having appropriate descramblers. Typically, a subscriber would telephone the CATV company and speak with a customer service representative to order the service; a CATV service technician would visit the subscriber's premises at an appointed time to manually install a descrambler, after which time the descrambler would be registered with the CATV company. Upon activation of the descrambler, the subscriber would tune the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., the disclosure of which is hereby incorporated in its entirety into this disclosure by reference, discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line.

A subscriber can request transmission of video data using a telephone instrument by dialing a Voice Response Unit (VRU) of a video gateway device, through the voice telephone switch and dialing in selection information. Alternatively, the user can access the video gateway device and select a video using a remote control device, the set-top terminal and the control signaling channel through the network. The VIP's equipment identifies the requested title and determines if the title is available.

If the title is found, the corresponding data file is opened and a reserve idle communications port is identified for transmission of the video data to an input node of a digital cross-connect switch (DCS). The video data file is transmitted from the VIP's video storage device, through the DCS, to the designated ADSL interfaces for transmission to the requesting subscriber's premises. The ADSL interface on the subscriber premises demultiplexes the broadband program transmission off of the subscriber loop and applies the digital data stream to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

Several recent proposals for video networks have relied on the assumption that multiple video information providers and/or video subscribers are already on-line as having access on the video network. Such prior art video networks have not addressed the manner in which the video information providers or video subscribers are established as users of the video network. Further, such prior art video network disclosures do not address the procedure by which video information providers or video users are provisioned on the network based upon existing capacity and inventory. It would be desirable to provide a system which provides efficient activation and provisioning techniques to establish video information providers and video users on a video dial tone network.

In addition, the prior art documents do not suggest an efficient procedure for establishing new services on the network to be supplied by video information providers, let alone accumulating the usage data and billing for the switched network broadband connectivity to multiple providers. Also, the prior art systems have not addressed the need for the interactions of the end users with the video dial tone network to be readily adaptable to end user demands as well as the need to provide equal access to all of the broadcast and interactive service providers available to each end user. Thus a need clearly exists for an enhanced network control and provisioning system, which is both efficient and highly flexible to the needs of both the video information providers and the video information users.

DISCLOSURE OF THE INVENTION

A principal object of the present invention is to provide a seamless, smooth approach for connecting video information users (VIUs) and video information providers (VIPs) to a video dial tone network by provisioning network resources and activating network services for use by the VIUs and the VIPs.

Another object of the present invention is to provide a system for establishing a service profile for a VIP that identifies facilities associated with providing the VIP services to a video information user, including the access link between the VIP head end and the video dial tone network point of interconnect (POI), the digital broadcast channels available to the VIP within a serving area, and the bandwidth reserved to the VIP for user-interactive sessions.

Another object of the present invention is to provide in a video dial tone network an operational support system (OSS) having a common platform interface that enables VIPs to remotely provision changes in the corresponding service profile on an as-needed basis in order to accommodate changes in VIP services and event scheduling. Such remote provisioning may also be used by the VIPs to activate and deactivate video information users on the network as authorized subscribers to the VIP services.

Another object of the present invention is to provide effective techniques for providing billing and usage statistics to the information service providers for the communication connectivity services between the corresponding information service provider and end users through a broadband network.

Another objective of the present invention is to provide efficient techniques for informing subscribers of information service providers available to them through the network, as well as event schedules provided by the information service providers, and responding to subscriber selections to establish communication between subscribers and providers. This objective might include development of enhanced techniques for offering subscriber menus of available VIP's, and/or a VIP's menu of available services. In addition, this objective might include techniques for on-line activation of a video information user to a selected VIP, whereas the video dial tone network includes a system to report to the selected VIP that a video information user has been activated as a subscriber to the VIP's services.

A further objective of the present invention is to develop enhanced mechanisms to allow an end user to interact with a selective connectivity broadband communication network to customize services provided to that subscriber through the network.

Another objective of the invention is to provide enhanced control over establishment of communications between a subscriber and a particular information service provider, e.g. so that only authorized subscribers of that provider can communicate and/or so that subscribers can personally limit who can use their network service to access a particular provider.

Another objective is to develop network provisioning means, providing one or more of the required enhanced functionalities discussed above, which is readily adaptable to use in a variety of different types of video distribution networks.

The present invention provides a number of the detailed network features needed to offer a truly effective video dial tone service. In particular, the present invention provides a number of enhanced network functionalities using an operational support system (OSS), also referred to as a service creation and activation system, to establish hardware and facilities necessary to enable user access to a video dial tone network. Since a "user" of the video dial tone network can be considered as either a video information provider using the video dial tone network to transport information, or a video information user using the video dial tone network to receive selected information, the operational support system includes all the functionality necessary to establish VIPs as service providers and VIUs as information users on the network.

The operational support system is used as a common platform that enables multiple information providers to maintain their respective network profiles with respect to dynamic provisioning of assigned network resources and facilities, updating VIP customer records, establishing and maintaining event schedules for future broadcast or IMTV events, and on-line requests for additional network transport, e.g., purchases of additional channels. Thus, the operational support system enables each VIP to provision changes automatically in order to individually program the necessary channel line-up, bit-rate, and bandwidth allocation.

The operational support system also provides billing and usage statistics for the information providers, as well as information regarding the video information users connected to the video dial tone network. For example, the video dial tone network includes a network control subnetwork comprising a Level 1 Gateway that accumulates usage data for billing purposes. The operational support system includes a billing system that processes the usage data to bill the service provider for connect time for the broadband communication links. The VIP's then bill their individual subscribers. Alternatively, the billing system can process the broadband usage information together with rate information from the service providers to produce combined bills for direct billing to the subscribers.

The operational support system includes a video provisioning system that tracks available inventory as assignable for VIP services. The video provisioning system receives information regarding inventory established by network creation and tags the available inventory as assignable inventory. In response to a service order from a video information provider, for example during service activation, the video provisioning system assigns a part of the assignable inventory as equipment and/or facilities assigned to the requesting VIP. The video provisioning system supplies the assignment information to the Level 1 Gateway, and sends configuration information to an Access Subnetwork Controller (ASNC) in order to establish a communication path through the video dial tone network. In addition, the operational support system includes means for completing connections for requested services, so that any requesting VIP or VIU can be connected for communication on the video dial tone network. Thus, the operational support system automatically activates available equipment after a VIP request in order to automatically provide the requested video dial tone services.

The operational support system provides equipment assignment information to the Level 1 Gateway so that the Level 1 Gateway is able to monitor communication paths throughout the network. The Level 1 Gateway receives notification of the status of broadband communications links as they are being set up and during ongoing communications through those links. As a result, the Level 1 Gateway can inform a subscriber when a requested session can not be set up with a selected service provider, i.e. because the provider's server ports are all busy or because the subscriber is not registered with the particular provider or due to some technical problem. The Level 1 Gateway also recognizes when an established link develops a fault or is interrupted and can stop accumulating usage or billing data regarding that link. The Gateway can also notify the OSS of the failure, so that the OSS may make any reassignment of equipment to compensate for the failure.

The remote provisioning feature of the operational support system enables a VIP to provision assigned network facilities for predetermined broadcast services, also referred to as event loading or event scheduling. For example, a VIP may arrange assigned network facilities in order to accommodate advance order upcoming broadcast pay-per-view events. The operational support system acknowledges the VIP provisioning request and downloads corresponding assignment information to the Level 1 Gateway and the Access Subnetwork Controller that controls the signal paths through the access subnetwork. At the time the event is to begin, the Level 1 Gateway will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway also permit subscribers to specify limitations they wish to place on their broadcast services, e.g. total number of hours of usage within some defined interval and/or time of day/week of permitted usage. The Level 1 Gateway will then control the broadcast network and/or download the control information to the subscriber's terminal, in accord with the limits defined by the subscriber, to implement the specified limitations.

The preferred video dial tone network serviced by the operational support system provides an enhanced video dial tone capability, allowing users to select services from an array of broadcast services, as well as for point-to-point interactive services as offered by multiple providers. The preferred network architecture comprises a backbone subnetwork, a network control subnetwork, and an access subnetwork. The backbone subnetwork provides point-topoint two-way communication sessions for broadband interactive multimedia communications signals with a selected one of the information providers. The access subnetwork receives digital broadband information signals from the selected information provider, via the backbone subnetwork, for transmission to one of the digital entertainment terminals. The access subnetwork also supplies control signals from the one digital entertainment terminal to the backbone subnetwork for transmission to the selected information provider. The access subnetwork also provides broadcast transport. Specifically, the access subnetwork receives broadcast digital broadband information signals for selective distribution to the digital entertainment terminals. The network control subnetwork controls service requests for network services. In the preferred network architecture, the network control subnetwork comprises the Level 1 Gateway that interacts with the respective subnetwork controllers to activate various broadcast services through the network and to set-up and tear down two-way communication sessions.

In the preferred implementation of this enhanced video dial tone network, the backbone subnetwork comprises one or more asynchronous transfer mode (ATM) switches. A permanent virtual circuit (PVC) controller serves as the ATM backbone subnetwork controller. The access subnetwork utilizes RF broadcast transport of both digital and analog information signals. The preferred implementation of the access subnetwork comprises hubs which convert ATM streams into digital packet streams for RF broadcast and a number of local video access nodes connected to each hub. The local video access nodes convert ATM streams for interactive services, as received from the ATM switch, into digital packet streams for RF transmission together with the RF broadcast signals from the hub.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 9A and 9B illustrate, in simplified form, the flow of messages between various components of the network of FIGS. 3–7 during activation of broadcast services to a new video information provider and a video information user, respectively.

FIGS. 10A and 10B illustrate, in simplified form, the flow of messages between various components of the network of FIGS. 3–7 during set-up of an upcoming pay-per-view event.

BEST MODE FOR CARRYING OUT THE INVENTION

Figure 1:
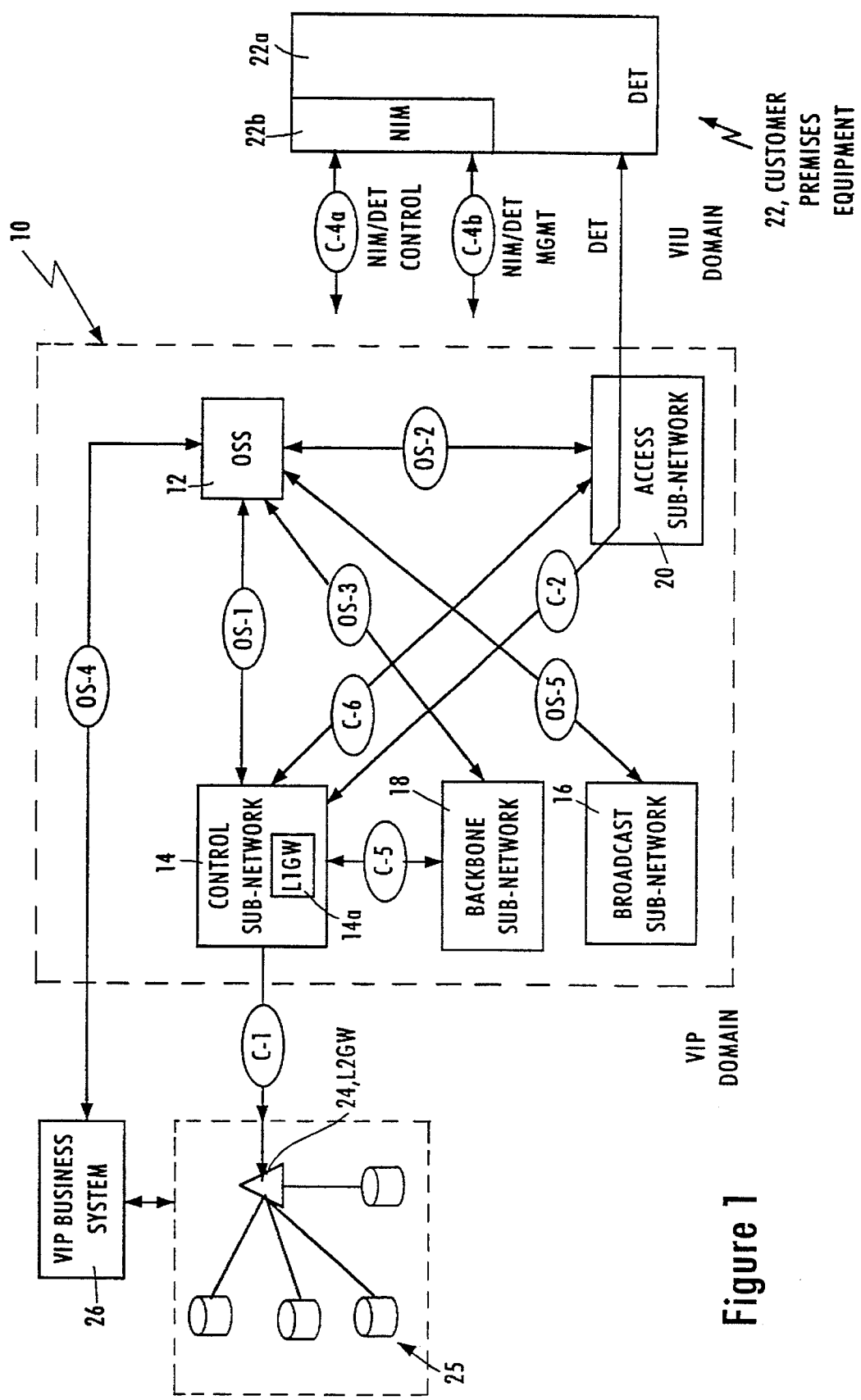
FIG. 1 is a block diagram of an example of a first Video Dial Tone network utilizing an operational support system of the present invention to control a wide range of broadcast and interactive multi-media services.

The operational support system of the present invention is useable in a variety of different broadband distribution networks which offer subscriber's selective communication with a plurality of broadband or video information service providers. FIG. 1 depicts a simplified block diagram of one such network, referred to as a Video Dial Tone Network, designed to provide broadcast and interactive broadband data to a plurality of subscribers using at least one of a plurality of access technologies. For ease of understanding, an overview of the Video Dial Tone network is set forth below, followed by a more detailed description of the preferred network architecture and a discussion of the operational support systems in the context of the preferred network architecture.

NETWORK OVERVIEW

FIG. 1 is a high level functional diagram of a video dial tone network providing broadcast and interactive broadband services from a plurality of video information providers (VIPs) to a plurality of video information users (VIUs). In the preferred architecture, the video dial tone network 10 includes an operational support system (OSS) 12, a control subnetwork 14, and three transport subnetworks, namely, a broadcast subnetwork 16, a backbone subnetwork 18, and an access subnetwork 20. The broadcast subnetwork 16 receives broadcast signals from different broadcast sources and distributes the received signals to the access subnetwork 20 for transport to video information users. The backbone subnetwork 18, preferably an ATM switch network and also referred to as an ATM subnetwork, provides point-to-point connectivity for interactive services. Thus, the backbone subnetwork 18 provides two-way communications between IMTV service VIPs and nodes of the access subnetwork 20. The access subnetwork 20 provides local loop distribution of broadcast signals and interactive service signals from the backbone subnetwork. Thus, the access subnetwork 20 distributes broadcast programming to customer premises devices 22 and dynamically provides transport for interactive service related signals to and from the customer premises devices 22. The control subnetwork 14, which comprises a Level 1 Gateway 14a, preferably conducts signaling communications with the customer premises devices 22, a Level 2 Gateway 24 (L2GW) serving a plurality of VIPs 25, and one or more controllers of the subnetworks through the backbone subnetwork.

The preferred embodiment illustrated in FIGS. 5 to 9 and discussed later utilizes asynchronous transfer mode (ATM) transport in the backbone network and RF transport technology for local loop distribution to the subscriber's terminal through the access subnetwork. The functionality provided by the operational support system of the present invention, however, applies to other broadband networks using other transport technologies in the backbone network and the access subnetwork. FIG. 1 thus provides a generic illustration of the video dial tone (VDT) transport network 10.

The operational support system (OSS) 12 is responsible for all service creation and activation for network services based upon the inventory of available facilities and office equipment (OE) for network use. The OSS includes a video provisioning system (shown in FIG. 12) that tracks available inventory as assignable for network services. The video provisioning system receives information regarding inventory established by network creation and tags the available inventory as assignable inventory. In response to a service order from a video information provider, for example during service activation, the video provisioning system assigns a part of the assignable inventory as equipment and/or facilities assigned to the requesting VIP. The video provisioning system supplies the assignment information to the Level 1 Gateway 14a, and sends configuration information to an Access Subnetwork Controller (ASNC) within the access subnetwork 20 in order to establish a communication path through the video dial tone network. However, the OS-2 interface may also be used to directly provide configuration information to the ASNC; in such a case, the Level 1 Gateway receives a portion of the configuration information that would otherwise be necessary.

The OSS 12 supplies assignment and provisioning information throughout the network 10 via operational support (OS) interface paths. For example, the OSS 12 supplies assignment information to the Level 1 Gateway 14a in the control subnetwork 14 via an OS-1 interface path. The ASNC within the access subnetwork 20 receives facilities and routing information from the OSS 12 via an OS-2 interface path. Similarly, the OSS 12 supplies assignment information for assigned virtual paths for IMTV communications to a controller of the backbone subnetwork 18 via an OS-3 interface path. Finally, the broadcast subnetwork receives assignment information from the OSS 12 via an OS-5 interface path.

In addition, the OSS 12 is adapted to communicate with VIPs via an open interface platform, disclosed in FIG. 1 as an OS-4 interface path. As shown in FIG. 1, a VIP business system 26 is adapted to communicate with the OSS 12 via the OS-4 signal path in order to automatically order changes in the VIP's services. As discussed in detail below, the VIP business system 26 is able to remotely provision its corresponding VIP profile to accomodate changes in transport requirements, such as increased capacity, etc., or to perform event scheduling for upcoming pay-per-view, staggercast, or IMTV events.

Certain digital program signals carried on the network may be encrypted in the access subnetwork, using encryption technology and key codes. Details of specific encryption algorithms and the key codes for encrypting and decrypting the signals are well known to those skilled in the art and familiar with the relevant patents and literature. Preferred procedures for downloading the key codes to the elements in the access subnetwork which encrypt the signals and the decoders in the CPE devices will be discussed later as they relate to aspects of service provisioning and/or activation.

The control subnetwork 14 preferably includes a Level 1 Gateway 14a and means for storing a variety of information relating to services provided through the network, VIPs and VIUs for use by the Level 1 Gateway 14a, either in a separate data storage system, or in storage within the computer system serving as the Level 1 Gateway 14a. The backbone subnetwork 18 and the access subnetwork 20 each preferably include a controller which is the single point of contact between the Level 1 Gateway 14a and the respective subnetwork. Thus, the backbone subnetwork 18 includes a backbone controller, and the access subnetwork includes an access controller.

As shown in FIG. 1, the control subnetwork 14 communicates with the Level 2 Gateway (L2GW) 24 and the main portion 22a of the DET via the control signal interface paths C-1 and C-2, respectively. Similarly, the control subnetwork communicates with the backbone subnetwork 18 and the access subnetwork via the control signal interface paths C-5 and C-6, respectively.

Figure 4:
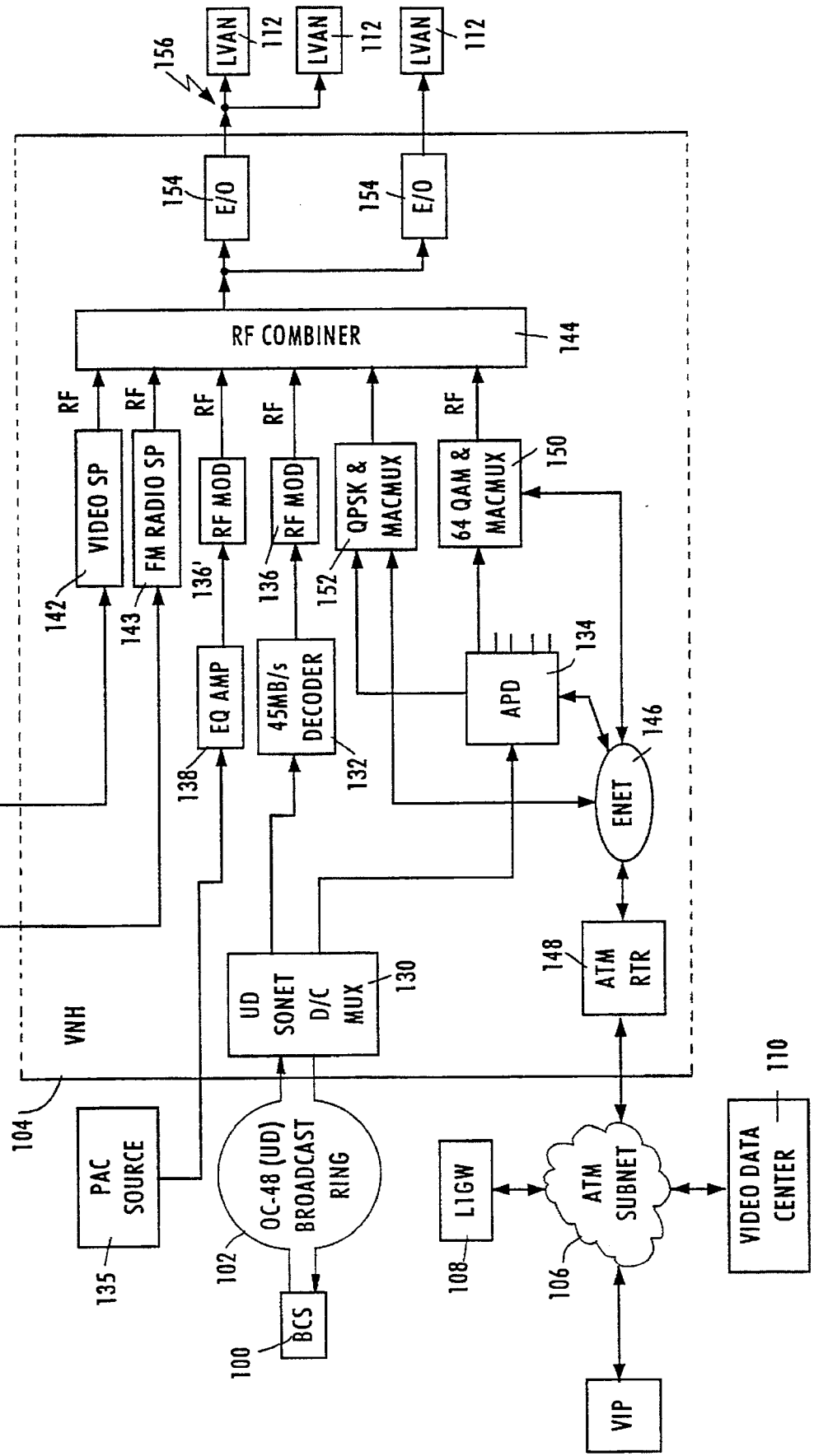
FIG. 4 is a block diagram of one of the video network hub offices shown in FIG. 3.

An example of a simple access subnetwork is found in the network embodiment shown in FIG. 4 of commonly assigned, copending patent application Ser. No. 08/304,174 filed Sep. 12, 1994, the loop distribution interface and associated hybrid-fiber-coax distribution system constituted an access subnetwork. A control element there identified as a video manager served as the access subnetwork controller. The backbone network included the ATM switch, and the backbone subnetwork controller was the permanent virtual circuit (PVC) controller. Other types of access subnetworks, backbone subnetworks and subnetwork controllers may be used to construct the video dial tone network interfaced to the OSS in accord with the present invention. For example, fiber-to-the-home or fiber-to-the-curb architectures may be used with the OSS of the present invention. Exemplary fiber-to-the-curb architectures are disclosed in commonly-assigned, copending applications Ser. No. 08/380,744, filed Jan. 31, 1995 (Attorney Docket No. 680-109), and Ser. No. 08/380,758, filed Jan. 31, 1995 (Attorney Docket No. 680-123), the disclosures both of which are incorporated in their entirety by reference.

In the network illustrated in instant FIG. 1, a number of broadcast video information providers (VIPs) may operate one or more broadcast sources that have a one-way connection (downstream) to the broadcast subnetwork 16. The broadcast signals may be analog or digital or a combination of both, as discussed below. In the preferred embodiment, each digital source supplies a number of broadcast programs to the broadcast subnetwork 16, preferably in ATM cell form.

A source will supply the program signals, e.g. ATM cells containing digitized broadcast information for a broadcast service, to the network 10 at all times that the service is to be available through the network. For video services, for example, the original source video material is digitally encoded and compressed, and the digital video information is packetized in ATM cells for transport through the network 10. The ATM cells can represent service signals for broadband services (e.g. video), audio services (e.g. radio) or data services (e.g. text).

In the preferred embodiment, the VIU's customer premises equipment (CPE) 22 includes a Digital Entertainment Terminal (DET) 22a which includes a network interface module (NIM) 22b adapted to connect the DET to the specific type of loop distribution plant servicing the subscriber's premises. For broadcast services, the DET 22a typically is able to select and process any digital or analog channel broadcast through the access subnetwork 20 to which the customer subscribes. The DET 22a is adapted to receive selected control signals received by the access subnetwork 20 via the control signal interface path C-2. As described in detail below, the control subnetwork 14 also communicates NIM/DET control signals and NIM/DET management signals to the CPE 22 via control signal interface paths C-4a and C-4b, respectively.

For example, for premium services requiring some form of network connection control, e.g. on-line selection of a pay-per-view event, the subscriber's terminal or CPE device 22 sends a request signal to the Level 1 Gateway 14a within the control subnetwork 14. In response to the instructions from the Level 1 Gateway 14a, the access controller causes the access subnetwork 20 to supply program signals for the requested broadcast service to the customer's CPE device 22. The routing functionality of the access subnetwork for broadcast services depends on the structure thereof. In the preferred embodiment, enabling reception of a broadcast program requires identifying the RF channel carrying the program to the DET and supplying certain information needed to decode the program signals to the DET 22a and/or the NIM 22b through the relevant control interface paths. The Level 1 Gateway 14a will store usage data identifying the requested service in its associated database, for billing purposes, for audience surveys, maintenance purposes, etc. and will periodically forward such data through the OS-1 interface path to the OSS 12 for appropriate processing.

For interactive multi-media television (IMTV) type services, the system will include a number of interactive service video information providers (VIP's) operating the plurality of VIP interactive systems 25. As discussed in more detail later, each IMTV VIP operates some form of source or server for transmitting information downstream through the network 10 to a terminal which has requested an interactive session with the particular VIP. Each IMTV VIP also operates a control element, such as the Level 2 Gateway 24, which provides two-way signaling communications to the Level 1 Gateway 14a via control path C-1 and provides two-way signaling communications through the network 10 to the CPE devices 22 corresponding to subscribers who have established interactive sessions with the VIP. The Level 2 Gateway 24 controls operations of the server in response to instructions from the Level 1 Gateway 14a and various information input by subscribers through their respective CPE terminal devices 22.

The signaling communications for the IMTV VIP's may go through a separate signaling network, such as the control path C-1 shown in FIG. 1, but in the preferred embodiment described in detail below, the signaling communications for those VIP's goes through the backbone subnetwork 18. The IMTV VIP's will typically offer broadband interactive services, such as video on demand, video based home shopping and video games, but these VIP's may offer other interactive services, such as interactive text services and interactive audio services (e.g. voice mail and audio on demand).

To establish a session with one of the interactive VIP's, a user operates his or her terminal device 22 to interact with the Level 1 Gateway 14a to identify the particular VIP of choice. Once the subscriber selects the VIP, the Level 1 Gateway 14a instructs the backbone subnetwork 18 and the access subnetwork 20 to establish at least a broadband downstream link between the VIP's server and the particular subscriber's CPE device 22 and provides any necessary information to the IMTV VIP's equipment.

Figure 2:
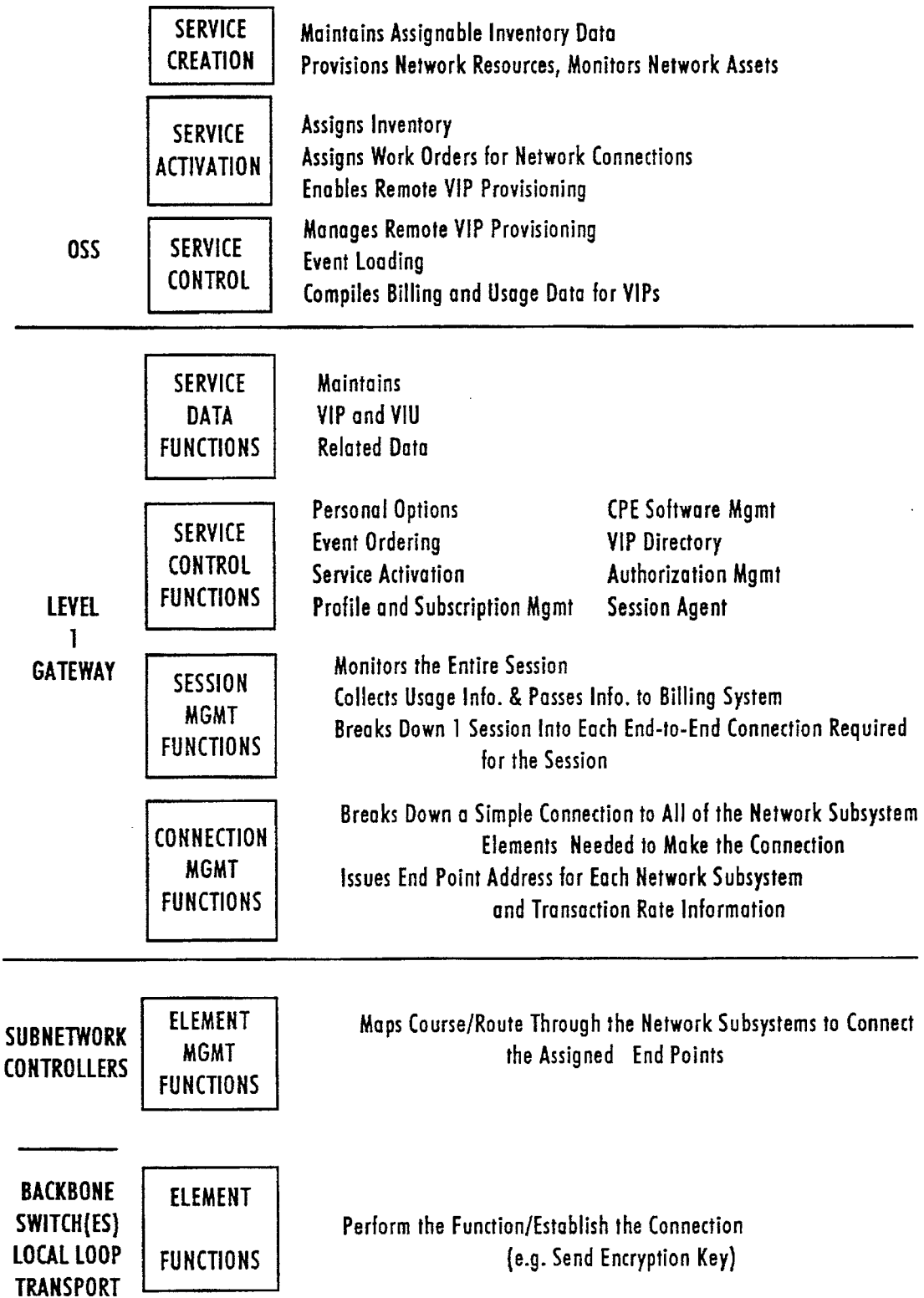
FIG. 2 presents a high-level overview of the control functions of a network of the type shown in FIG. 1 and delineates those functions performed by the operational support system from those performed by other network components.

FIG. 2 depicts a functional hierarchy stack of the software and network operations relating to the OSS and the Level 1 Gateway in the preferred network implementation. As shown in FIG. 2, the network functionality can be conceptually divided into eight block elements: service creation functions, service activation functions, OSS service control functions, service data functions, service control functions (Level 1 Gateway), session management functions, connection management functions, element management functions, and actual element functions. The service creation and service activation functions are performed by software application modules running in the OSS. The service control functions are shared between application modules running in the OSS and the Level 1 Gateway as shown. The service data functions, session management functions, and connection management functions all are performed by software application modules running on the Level 1 Gateway 14a.

In the diagram of FIG. 2 and the following description thereof, "VIU" refers to the video information user or subscriber.

As shown in FIG. 2, the OSS 12 is responsible for functions related to service creation, service activation, and service control within the network 10. With respect to the service creation functions, the OSS maintains assignable inventory data that identifies network facilities and office equipment (OE) that is available for use and assignable to a service. The assignable inventory data is generated during a network creation process and represents inventory that is not assigned to a service and that is not under repair. In other words, the assignable inventory represents the network equipment that is available for service but not in use. Thus, the OSS maintains the assignable inventory in order to provision available equipment for a new subscriber (VIP or VIU) that requests services from the network.

As described in detail below, the service creation function includes provisioning network resources. Provisioning of video dial tone network services includes forecasting demand for service, determining additions (or changes) to the network that will be needed, determining where and when the additions will be needed, installing the additions, testing the additions, and logging the additions as assignable inventory. The provisioning may be part of a long-range forecasting plan, or may be in response to a request for new service, whereby a request for new service (new VIP online or new VIU requesting connection to receive services) will be generated from a customer service center that receives the request from the subscriber, for example a VIU calling the customer service center managed by the network 10, or VIP business office 26 calling the customer service center. In the latter case, the VIP business office 26 may be processing a subscription request from a VIU requesting specific VIP services. However, an existing VIP already established on the network 10 may also request new service (new VIU or additional VIP services) by online registration via the OS-4 interface shown in FIG. 1.

The service creation function also includes monitoring network assets. Such monitoring includes comparing existing equipment and facilities to existing and projected service demands to determine if additional capital equipment is necessary. The monitoring of network assets may be affected by, for example, increased usage in specific serving areas, seasonal variations in usage (e.g., increased use in winter), or replacing obsolete equipment.

Thus, the OSS manages service creation functions by tracking the existing network assets and assignable and available inventory and provisioning of video dial tone resources to accomodate network service requirements. The OSS performs service activation functions in accordance with the service creation functions in order to implement new service for requesting subscribers. The service activation functions performed by the OSS include: assigning inventory, assigning work orders for network connections, and establishing VIP databases in order to enable subscribing VIPs remote access to their respective databases for remote provisioning.

The OSS assigns inventory in response to a request, either from the network customer service center (NCSC) or a VIP OS-4 interface, for new service for a subscriber. The network customer service center may either be a functional part of the OSS or a separate office. Specifically, the NCSC will receive a request from the VIP business system 26 for new service in a desired area. The NCSC will identify network resources that are available in the desired area, including the type of access subnetwork that is implemented (hybrid-fiber coax, optical fiber to the home, asynchronous digital subscriber loop, etc.), and provide to the VIP a listing of homes passed in the desired area. The term "homes passed" refers to homes within a serving area that can be activated as online VIU subscribers within approximately one week of an order.

For broadcast services, a VIP request for new service will include a specified number of desired digital broadcast channels within a targeted serving area. The OSS processes the request for new service by validating that the desired broadcast channels are available on the network in the targeted area, and assigning a set of digital broadcast channels to the VIP. In response, the VIP supplies head-end to point-of-interconnect access link information to the OSS. In other words, the VIP is considered an interexchange carrier, such that the VIP may establish a link directly to the network POI, purchase a link from the network from the VIP head-end to the POI via a separate network agreement, or in the alternative by purchasing a link from an alternate interexchange carrier. Thus, the VIP provides to the OSS the head-end to POI access link information, so that the OSS can identify the location of incoming VIP video data into the network.

In the event that a service order is needed to establish a connection between the network and the subscriber, the OSS generates a work order for a field technician to connect the subscriber's equipment at the subscriber premises to the network. In the case of a VIP type subscriber, the field technician may need to route the link from the VIP to the POI; in the case of a VIU, the field technician may need to install a drop cable from the local loop to the subscriber premises, as shown in detail below with respect to FIG. 6.

As part of the service activation function, the OSS also establishes a VIP database that includes a VIP profile, based on the OSS provisioning. The VIP database is accessible by the corresponding VIP using the OS-4 interface in order to perform remote provisioning, for example to add/delete digital channels or switch one of the VIP's existing channels from digital broadcast service to pay-per-view or premium channel service. As a result, the OSS provides an electronic interface for a VIP to access its specific VIP database so that the VIP has flexibility in automatically programming a permitted set of network facilities based upon the needs of the VIP. Since the VIP has access to only its specific VIP database, security is ensured so that a competing VIP cannot access another VIP's database.

The OSS also performs service control functions, including managing remote VIP provisioning, event loading, and compiling billing and usage data for VIPs. Specifically, the OSS reviews remote VIP provisioning requests, and determines whether the requests are executable. If the remote VIP provisioning requests are capable of being performed by the OSS, the OSS provisions the network resources in accordance with the request. If, however, the OSS determines that the request cannot be completed, the OSS returns a message to the VIP that the VIP request was denied. The OSS also manages event loading, whereby the VIP updates its VIP profile for upcoming broadcast or pay-per-view events, or IMTV ports, where "port" refers to the routing instructions for IMTV services. In such a case, the OSS schedules the provisioning of resources at the desired time, and downloads the appropriate event schedules to the Level 1 Gateway. Finally, the OSS receives billing and usage information from the Level 1 Gateway, compiles the information on a VIP-by-VIP basis, and supplies the compiled information to the corresponding VIPs for billing and any usage studies.

The OSS service control functions also include receiving VIP requests to activate new VIU's as subscribers on the network. For example, a VIU may contact a particular VIP in response to an advertisement. After the VIU enters into a subscription agreement with the VIP, the VIP includes a VIU activation request as part of the remote VIP provisioning process. The OSS reviews the request and provisions the request as described above, and downloads the a VIU subprofile to the Level 1 Gateway.

A detailed description of these functions of the OSS is discussed below with respect to FIGS. 8–12.

The service data functions application module of the Level 1 Gateway provides real time access to the customer and the network. The service data functions also include accumulation and maintenance of service related data. In particular, the service data includes VIP related data and VIU related data downloaded from the OSS. The VIP related data function stores service profile information (VIP identification code, sever port information, Level 2 Gateway signaling address, type of DET's serviced by each VIP's equipment, etc.) for each VIP and makes that information available to the service control functionality as needed. The VIU related data function of the Level 1 Gateway stores subscriber service profile information (VIU ID, type of subscribed service, NIM type, due date for service activation, access subnetwork addresses, etc. for each end user and makes that data available to the service control functionality of the Level 1 Gateway as needed. The second functional level performed by an application software module running in the Level 1 Gateway 14a relates to the service control functions of the network. This is the level at which most of the interactions with the VIP and the subscriber take place. In addition, some of these functions are shared with the OSS to the extent that the OSS handles resource allocation, whereas the Level 1 Gateway handles ongoing network activity. As shown, these interactions between the Level 1 Gateway and the DET include personal options, event ordering, service activation, profile and subscription management, CPE software management, VIP directory/menu, authorization management and session agent.

Personal options permits a subscriber to customize certain video dial tone related options through direct interaction with the Level 1 Gateway 14a. Examples of personal options set up and modified through this interaction with the Level 1 Gateway include PIN numbers, VIP menus, and hours of service. Another personal option might allow the subscriber to specify certain times of the day or week when the network should permit access to certain broadcast or interactive services.

The event ordering interaction permits a subscriber to interact with the Level 1 Gateway to specify a pay-per-view event to be broadcast in the future which the user wants authorized in advance, to insure on-time reception. As part of this function, the Level 1 Gateway maintains event related data for the various broadcast VIP's and their respective events downloaded by the service control functions of the OSS and interacts with the subscriber through the DET to inform the subscriber of upcoming events and receive event order inputs from the subscriber. The Level 1 Gateway 14a also signals the DET 22a at the appropriate time to at least notify the user and may instruct the DET to turn on and/or select the appropriate channel and digital video slot to receive and display the ordered event.

The service activation function permits the user to specify various levels of broadcast service that are to be provided to the subscriber through the subscriber's DET's. The profile and subscription management function is similar and related to the service activation function. The profile and subscription management application provides an automated means for the user to access the Level 1 Gateway to alter the user's profile and subscription information, which is downloaded by the service activation functions of the OSS stored in the Level 1 Gateway. This software application submodule communicates relevant change information to necessary systems, e.g. CPE software management, session management and/or subnetwork management, to implement desired changes. For example, this application submodule can be used to change scrambling, encryption or interdiction status of a broadcast channel for the user. As another example, through the profile and subscription management function the Level 1 Gateway would interact with the subscriber to add service for a new DET at the subscriber's premises. The Level 1 Gateway would subsequently provide the updated profile information to the OSS. The OSS would update its service activation functions in response to the updated profile information.

Under the CPE software management function, the Level 1 Gateway will download software needed by the DET for a particular call, if needed. Examples of such software downloaded from the Level 1 Gateway include broadcast channel maps, signaling protocol versions, and complete signaling protocols. Also, if the DET 22a is not capable of communicating with a VIP selected by the subscriber, the Level 1 Gateway 14a can download a translation program to the DET to convert messages compatible with the DET to and from message formats compatible with the VIP's equipment. Depending on the type of downloaded software, the downloading may occur only once at the time of installation, periodically or on an as-needed basis.

The VIP directory/menu application submodule presents an interface to the end user to navigate among video dial tone service features offered through the network. This application submodule presents the user with options, receives selections from the users and translates selections into service requests for processing by the session agent function application submodule. Options available to the user, in an initial preferred embodiment, include: establishing an internal session (within Level 1 Gateway) with a profile/subscription application, establishing an internal session (within Level 1 Gateway) with an event scheduling/ordering application, establishing an external session (with a Level 2 Gateway) to a particular interactive VIP, help functions, terminate a current session and resume an earlier interactive session (one of two maximum).

The authorization management application submodule provides a generic authorization control capability that can be re-used across different ones of the services applications. This functionality would be separate and in addition to the PIN number functionality offered by the personal options. The authorization management application software, for example, might be used to define a pass code to permit a subscriber access to the event scheduling/ordering application, particularly if the subscriber is paying for the ordered event by credit card.

The session agent function or application submodule of the Level 1 Gateway actually translates a subscriber's request to communicate with a particular VIP and that VIP's acceptance of the call from the subscriber into a command to the next level to take actions to set up the desired communication session. Specifically, the agent application maintains status information for each user session, whether the session has an external end-point to a VIP or an internal end point within the Level 1 Gateway (e.g. to the directory/ menu application, the event scheduling/ordering application, etc.). The session agent application responds to various requests from the user, from the VIP, or from the application within the Level 1 Gateway to establish, modify or breakdown a session and provides appropriate instructions to the session manager application to actually establish, modify or breakdown sessions. In turn, the session agent functionality receives feedback from the session manger as to the results of the instructions and in response thereto provides reports to the end users and to the VIP's. The session agent application submodule controls which sessions are active at any time, from an end user perspective, and which if any sessions become active upon termination of an existing active session. For applications internal to the Level 1 Gateway, the session agent also effectively wakes up and terminates the relevant application. Another feature of the session agent application is that it provides a mechanism to notify the user of events, e.g. network failures. Finally, the session agent functionality provides billing related information to the billing system.

As seen from the above discussion, the service control functions provide commands to the next lower level functionality to start making and/or terminating the communication connections through the network. The next lower level functionality, the session management functions breaks down each session into each end-to-end connection required for that session. The session management software application module maintains addresses of the network interface points of all of the VIP servers and each user's DET. The session management module functionality responds to requests from the session agent application to establish and breakdown session, relates user and VIP identifiers to the appropriate addresses for their respective network interface points and converts each individual session between two network interface points into the individual connection links needed for that session. The session management application module then provides appropriate requests to the network connection management functionality to establish and break down the individual connections which make up a session, and the session management application module receives feedback on the results of those requests. The session management application also monitors the entire session to maintain status information regarding active system topologies, and this application collects the actual usage information and passes that information to the billing system.

The connection management application module also has access to addresses of the network interface points of all of the VIP servers and each user's DET as well as the addresses of the entry and exit points of each subnetwork. The connection management application breaks down each end-to-end connection identified by the session management functionality into all of the network subsystem elements needed to complete the connection. This application coordinates with the subnetwork controllers (backbone controller and access controller 16) to determine availability of necessary transport capability and issues requests with end point addresses for each network subsystem (e.g. from an IMTV VIP and from the access subnetwork controller) for the requisite connectivity. Using this methodology, the connection management application module responds to requests from the session management function to establish and break down a connection between interface points of a VIP and an end user by providing corresponding requests to the relevant subnetwork controllers. The connection management application also receives feedback from the element management functionality applications performed by those controllers and notifies the service management application of events, such as failures.

Each element management function maps the course or route through the respective subnetwork and provides instructions to the relevant network elements to produce the actual connections. In the preferred embodiment, ATM element management is the function of the PVC controller which corresponds to the earlier-described backbone controller. Routing through the access subnetwork in the hybrid fiber-coax distribution network to the individual terminal devices 22 is controlled by an access subnetwork controller, discussed in more detail below.

In the preferred implementation, the ATM element management functionality maintains a view of allocated ATM connections and available resources across the ATM portion of the network. The backbone subnetwork controller functionality responds to commands from the connection management application of the Level 1 Gateway to establish paths through the backbone subnetwork in accordance with provisioning requirements provided by the OSS. In the ATM subnetwork implementation, the PVC controller provides instructions to the ATM switching elements to establish the connections. The backbone subnetwork controller functionality also collects event and status data and aggregates traffic statistics through the backbone switching elements. Another function of the backbone subnetwork element management application is to notify the connection management application of events, such as failures, in the backbone subnetwork.

The access subnetwork management applications performed by the access subnetwork controller respond to requests from the connection management application of the Level 1 Gateway 14a to establish both downstream video communications and one-way or two-way signaling communications over the hybrid fiber-coax distribution system.

The last element of the functional hierarchy stack depicted in FIG. 2 relates to the actual element functions. For the ATM implementation of the backbone subnetwork, this function is preformed by the ATM switch or switches which will provide switched ATM virtual circuits for point to point connections from VIP's servers to ports of the access subnetwork. As part of its operations, the PVC controller will collect traffic statistics from the ATM switch (es) and monitor the status of the backbone switch fabric and of individual connections. The collected statistics are thereafter passed to the service control functionality in the OSS. Each ATM switch receives and responds to commands from the ATM portion of the element management function, i.e. from the PVC controller, to establish and tear down ATM connections and provides notice of various events (including failures) to the element management function.

The actual element function for routing through the hybrid fiber-coax implementation of the access subnetwork to individual DET's is performed by allocation of channel resources and control of the encryption and decryption operations in that subnetwork, as discussed in more detail below with regard to FIGS. 3 to 7.

Specific Network Architecture

Figure 3:
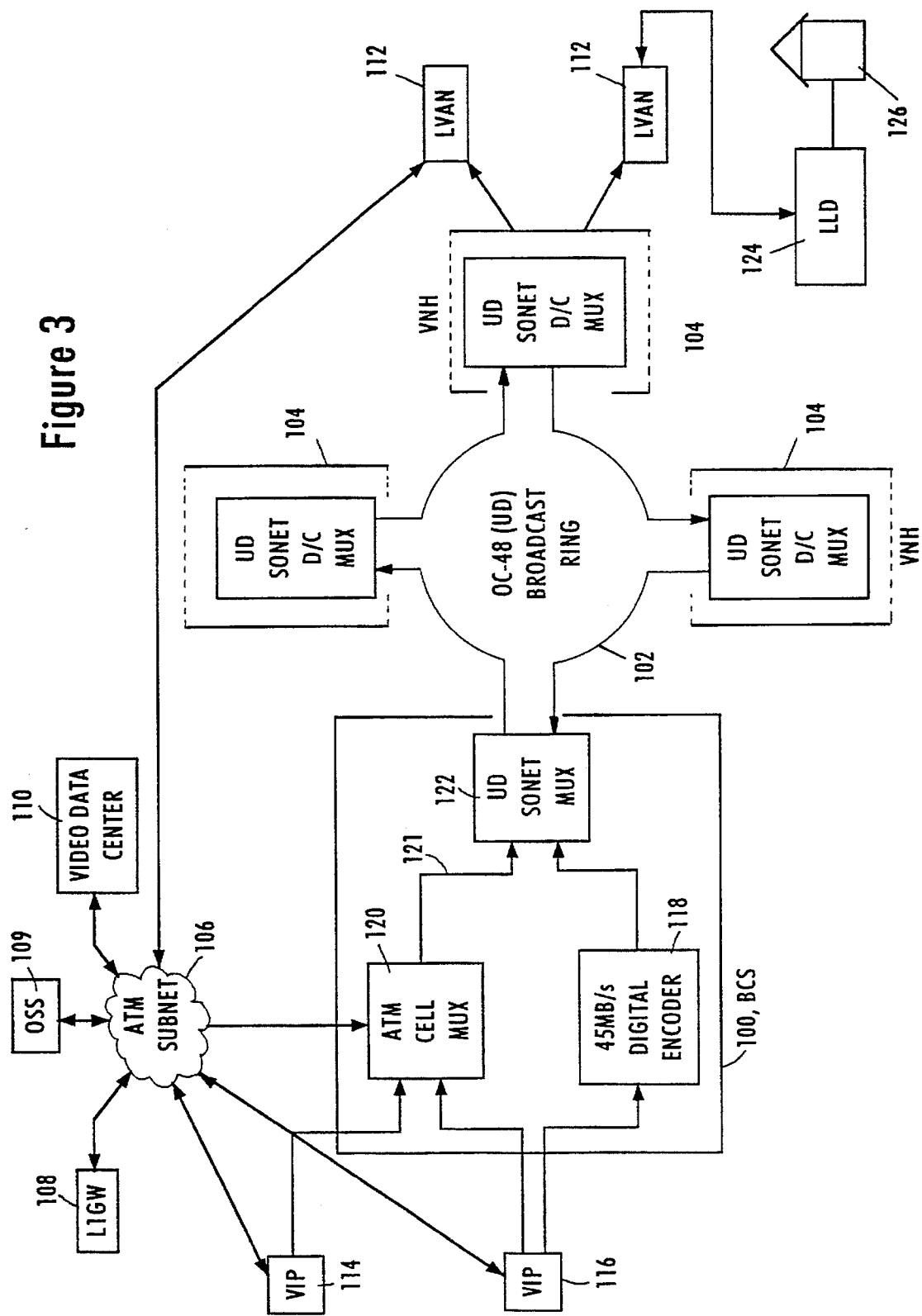
FIG. 3 is a block diagram of a distributed network architecture for the preferred implementation of the broadband data full service type video dial tone network utilizing the operational support system according to the present invention.

FIG. 3 discloses a distributed network architecture for a broadband data full service type enhanced video dial tone network according to a preferred embodiment of the present invention. FIGS. 4 to 7 provide more detailed illustrations of portions of the network of FIG. 3.

The network of FIG. 3 includes an OSS 109, a Level 1 Gateway 108, an ATM (backbone) subnetwork 106, a broadcast subnetwork, and an access subnetwork. In this implementation, the broadcast subnetwork includes at least a broadcast consolidation section (BCS) 100, and a broadcast ring 102. The access subnetwork preferably includes a plurality of video network hub offices (VNHs) 104, a plurality of local video access nodes (LVANs) 112, and a plurality of local loop distribution (LLD) networks 124 providing communications between customer premises 126 and the serving LVAN 112. The network interface module (NIM) portion of the user terminal preferably also is an element of the access subnetwork. According to the preferred embodiment, each of the video network hubs 104 will serve a corresponding plurality of up to six (6) LVANs 112. In addition, the preferred embodiment will provide up to sixteen (16) VNHs 104 serviced by the ring 102.

Figure 7:
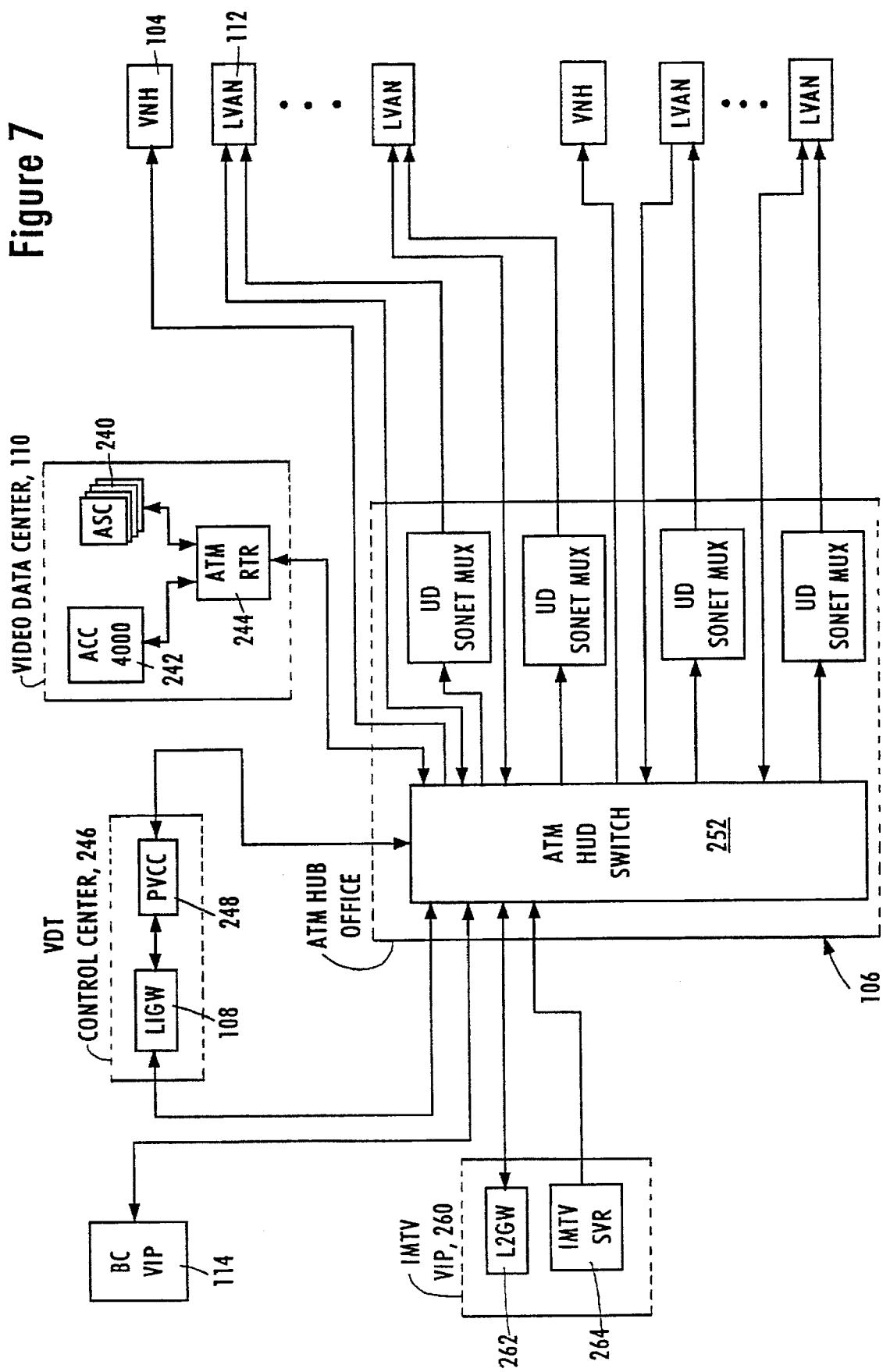
FIG. 7 is a block diagram of the ATM backbone network and the control systems for the network shown in FIG. 3.

As discussed in the network overview, in the preferred network of FIG. 3, at least the backbone subnetwork and the access subnetwork include subnetwork controllers. For the ATM type backbone subnetwork 106, the controller is a PVC controller 248, shown in FIG. 7. The access subnetwork controller 240 also is shown in FIG. 7.

The OSS 109 is implemented as a facility comprising, for example, mainframe computers and mass storage devices for storing a plurality of databases. The OS signal paths and control (C) paths in FIG. 1 are implemented in the network of FIG. 3 as dedicated virtual paths through the ATM backbone subnetwork 106. The OSS 109 is adapted for two-way communications with other network control systems, such as the Level 1 Gateway 108, PVC controller 248, and the ASNC 240, via dedicated virtual paths in the ATM subnetwork 106. In addition, each of a plurality of VIPs 114 and 116 (both IMTV and broadcast) may have the OS-4 signal path to the OSS 109 via a dedicated virtual path in the ATM subnetwork.

The Level 1 Gateway 108 is a UNIX based computer having adequate processing power and data storage capacity. In this embodiment, the Gateway 108 has an interface for two-way ATM cell based communication through the ATM backbone subnetwork. In an initial implementation, the Level 1 Gateway 108 has a direct data communication interface to the PVC controller 248, as shown in FIG. 7. In that implementation, the PVC controller 248 interfaces to the programmed control elements of the ATM hub switch 252 through an X.25 packet data interface, although an OSI/CMISE standard interface may also be used.

In a future implementation, the PVC controller 248 will have an ATM interface to the hub switch 252. Through this interface, the PVC controller 248 will transmit instructions to the hub switch 252 and receive confirmations and various reports from the hub switch. The Level 1 Gateway 108 will also communicate with the PVC controller 248 using ATM through the ATM subnetwork, in a manner similar to the communications between that gateway and the access subnetwork controller 240. The ATM interface between the PVC controller 248 and the hub switch 252 also will permit that controller to communicate with ATM access switches under its control.

The PVC Controller 248 and the access subnetwork controller (ASNC) 240 also are computers having the appropriate network interfaces and software programming. The ACC 4000 is a computer system programmed to administer encryption keys and NIM network addresses in the hybrid-fiber-coax type access subnetwork. Computers similar to the ACC 4000 are used today in CATV headend systems, but those computers also run software relating to other CATV operations, e.g. billing. In technologies such as fiber-to-the-curb or fiber-to-the-home, the ACC 4000 may be replaced with a Video Access Manager (VAM).

The network shown in FIG. 3 is arranged to centralize signal processing tasks within a serving area, geographically approximately the size of a LATA, in order to minimize hardware. At the same time, the disclosed network provides maximum flexibility by providing communications to local access nodes, each serving a local loop of subscribers.

The broadcast consolidation section 100 serves as the broadcast head-end and network POI for broadcast VIPs 114 and 116. The broadcast consolidation section 100 is adapted to receive broadcast video data in any format that may be convenient for the VIP. Specifically, the broadcast consolidation section 100 includes a digital encoder 118 to convert baseband analog video signals, for example from VIP 116, into a digitally-compressed DS-3 signal stream. Alternatively, the digital encoder 118 could be replaced with an MPEG-2 encoder to provide compressed MPEG-2 packets at a DS-3 rate.

The broadcast consolidation section 100 also includes an ATM cell multiplexer 120, also referred to as an ATM edge device, which performs policing and rate conversion of incoming ATM streams. The ATM edge device 120 performs policing of ATM cell streams by monitoring the data rate of incoming data streams from VIPs. For example, if the VIP 114 has subscribed by contract to transmit a data stream at 3 Mbits/s to the network, the ATM edge device 120 will prohibit or drop ATM cells that are transmitted above the subscribed bit rate; in this case, a 6 Mbits/s stream would be rejected as an unauthorized rate.

In order to maximize the data-carrying capacity of the ATM streams supplied to the ATM edge multiplexer 120, the VIP 144 and the VIP 116 will preferably supply digital video signals in compressed MPEG-2 format that are transported in ATM cells.

The MPEG-2 standard, recognized in the art, provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although video frames can vary in length, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 4000 transport packets.

Transport stream packets consist of a 4 byte header section, an optional adaptation field and a payload section. The header information includes, inter alia, a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

MPEG-encoded packets can be output in a variety of data rates. For example, the MPEG-2 compression standard is able to encode a video program to a 6 Mbits/sec bit stream, and packetize up to four (4) 6 Mbits/sec bit streams into a single 27 Mbits/sec stream. For other lower-rate data streams carrying text or signaling information, up to eight (8) 3 Mbits/sec bit streams can be packetized into a single 27 Mbits/sec stream, and up to sixteen (16) 1.5 Mbits/sec bit streams can be packetized into a single 27 Mbits/sec stream. In a typical implementation, 3 Mbits/sec of forward error correction information are added to the 27 Mbits/sec of MPEG payload to form an actual 30 Mbits/sec bit stream. Alternatively, six (6) analog audio-video program signals can be processed in parallel to provide six (6) 6.312 Mbits/sec MPEG-2 packets that can be output on a single 45.736 Mbits/sec DS-3 bit stream. In addition, a synchronous optical fiber such as SONET at 155 Mbits/sec (DL-3) can carry twenty (20) 6 Mbits/sec MPEG streams.

Thus, each of the VIPs 114 and 116 are preferably able to compress up to six (6) NTSC analog audio/video program signals in parallel into a 6 Mbit/sec MPEG-2 format. The resulting six (6) MPEG-2 packet streams converted into an ATM stream before transport to the ATM edge multiplexer 120. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG-encoded programs.

Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". According to the preferred embodiment, a 53 byte ATM cell includes a cell header consisting of 5 bytes and a payload consisting of 48 bytes of payload data. The ATM cell header information includes a virtual path identifier/virtual channel identifier (VPI/VCI) to identify the particular communication each cell relates to. For example, the OSS 109 may provision VPI/VCI assignments so that the virtual path identifier (VPI) may be used to identify a specific VIP 114 or 116, and the virtual channel identifier (VCI) may be used to identify a specific output port of that VIP. In such a case, for example, VIP 114 could be assigned a VPI value of "65", and VIP 116 could be assigned a VPI value of "66". Thus, the VPI/VCI value of the ATM cell header could be used to identify the source of the ATM stream.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in synchronous slots on a highspeed time division multiplexed media, such as a SONET optical fiber. ATM allows any arbitrary information transfer rate up to the maximum supported by the ATM network, simply by transmitting cells more often as more bandwidth is needed.

During the ATM conversion process, the individual programs from the MPEG packets are broken into cell payloads and VPI/VCI header information is added to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter during decoding, the packets carrying the PCR need to be encoded and transported quickly. To avoid delaying first packets containing a PCR while processing a second packet, the ATM multiplexer 215 maps first packets containing a PCR immediately, using the five cell adaptation procedure. As noted above, the PCR is typically present in only 10 out of every 4000 packets. Also, at least some of those 10 packets likely will arrive as the second packet of a pair. Consequently, only a very small number of packets are mapped using the less efficient 5-cell adaptation.

As noted above, each cell of a particular stream will have a header which contains a virtual path identifier/virtual channel identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

As noted above, the VIP 114 and/or VIP 116 may transmit the ATM cells on a SONET optical fiber at an OC-3 rate, or may transmit the ATM cells at a DS-3 rate. The transmission of ATM cells in an asynchronous DS-3 signal may require a common clock reference in order to ensure frame alignment. In a preferred network implementation, the network interface 100 receives the DS-3 signal carrying six MPEG-2 channels in ATM cell format from the ATM VIPs in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM edge multiplexer 120 acts as a groomer for multiple VIP terminations to prevent extraneous data from using network resources. The ATM streams from the VIPs 114 and 116 may arrive in either DS-3 format or via optical fiber in OC-3 format. The ATM edge device 226 provides a grooming function, whereby ATM cells are analyzed, on a cell-by-cell basis, to determine if they should be transmitted on the network. Specifically, ATM cell headers that do not have valid data are dropped from the ATM stream. Each valid ATM cell is mapped on the basis of its corresponding VPI/VCI header to a OC-3 output port of the ATM edge device 120. In addition, the ATM edge device 120 rejects the ATM idle bits containing no information that are present in the ATM stream from the VIPs.

The ATM cell mapping is based on an ATM translation table that is loaded from the OSS 109 into the ATM edge device 120. This ATM cell mapping, also referred to as cell translation, enables DS-3 or OC-3c ATM cell streams that are transmitted at less-than-full capacity to be mapped onto at least one OC-3c stream operating at full capacity. This is particularly effective when, for example, optical fibers used by the VIPs 114 or 116 to transport DS-3 ATM streams using optical fibers will not be operated at capacity, especially when VIPs using the optical fibers have varying bandwidth requirements over time.

The ATM edge processor 120 processes all incoming DS-3 bit streams received thereby, and maps the DS-3 bit streams into at least one condensed, or combined bit stream for transmission through the network. Specifically, the incoming DS-3 and OC-3c streams are supplied to corresponding first-in-first-out (FIFO) input buffers internal to the 120 to supply the ATM cells to an internal multiplexer on a cell-by-cell basis. The internal multiplexer outputs the translated cells preferably to OC-3 output buffers for synchronous transmission on optical fibers 121. Since the ATM cells are output at a rate of 155 Mhz (OC-3), each of the optical fibers 121 carry up to twenty (20) MPEG programs at 6 Mbits/sec. Thus, the ATM edge processor is able to fully load the downstream optical fibers 121 thereby to fully load the capacity of the network. A more detailed description of the ATM cell multiplexer 120 is found in copending and commonly-assigned application Ser. No. 08/380,744, filed Jan. 31, 1995 (attorney docket No. 680-109), the disclosure of which is incorporated in its entirety by reference.

According to the preferred embodiment, the digital encoder 118 outputs a digitally encoded data stream in DS-3 format (45 Mbits/s), and the ATM edge multiplexer 120 outputs an ATM stream in OC-3c format (155.5 Mbits/s), to a SONET multiplexer 122. The SONET multiplexer 122 multiplexes the DS-3 and OC-3 signals from the digital encoder 118 and the ATM edge multiplexer 120 and outputs the consolidated broadcast data onto the unidirectional optical fiber broadcast ring 102 operating at an OC-48 format (2488.3 Mbits/s). In other words, the SONET multiplexer 122 may receive a plurality of OC-3 optical fibers 121, either from the ATM edge multiplexer 120 or a plurality of such multiplexers. In addition, the SONET multiplexer 121 may receive a plurality of DS-3 signals from a corresponding plurality of encoders such as digital encoder 118. The SONET multiplexer 122 buffers the OC-3 and DS-3 input signals and multiplexes the input signals together at a rate of 2488.3 Mbits/sec. An exemplary SONET multiplexer is the FT-2000, manufactured by AT&T.

The broadcast ring 102 is arranged as a drop-and-continue (D/C) SONET transport to service up to, for example, fifteen (15) VNHs 104. Although the broadcast ring 102 preferably has one OC-48 fiber, the broadcast ring 102 may be modified to include 2 or more OC-48 fibers for additional traffic for redundancy purposes, or for bidirectional traffic around the ring. As discussed below in detail with respect to FIG. 6, each VNH 104 receives the broadcast ATM streams from the broadcast ring 102, converts the ATM streams to MPEG-2 streams that are transmitted on an RF carrier, and adds local broadcast information (e.g., over-the-air access, public access channel) before transport to the associated LVANs 112 as RF signals, preferably via optical fibers.

Each LVAN 112 receives the consolidated broadcast data from the corresponding VNH 104. The LVAN 112 combines the received RF signals from the VNH 104 with any data transmitted by the ATM backbone subnetwork 106 addressed to a subscriber served by the LVAN 112. The resulting RF signal is transmitted via a local loop distribution network 124 to a number of customer premises 126 (only one shown for convenience). As discussed below with reference to FIG. 6, the local loop distribution 124 is preferably arranged as a hybrid fiber-coax distribution system, although an ADSL system or a fiber-to-the-curb system may be substituted.

The equipment at the subscriber site 126 includes a network interface device (NID) for splitting the RF signal, a network interface module (NIM) for decoding encrypted data from the network and routing MPEG data streams, and a digital entertainment terminal (DET) for decoding the MPEG data streams passed by the NIM. Additional details regarding the NIM and the DET are discussed below with reference to FIG. 6.

As shown in FIG. 3, each LVAN 112 has access to the ATM backbone subnetwork 106 in order to send and receive network signaling information to and from the Level 1 Gateway 108 and/or the video data control center 110. For example, a video information user (VIU) who wishes service on the network via one of the LVAN's 112 may request the service either by calling a network business office by telephone or by requesting a Level 1 Gateway session from his or her customer premises 126 in order to perform on-line registration. As discussed in detail below, the ATM backbone subnetwork 106 provides signaling information between the OSS 109, the LVAN 112 serving the VIU, the Level 1 Gateway 108 and the video data control center 110 in order to activate the VIU on the network, or to update the services available to the VIU.

The ATM backbone subnetwork 106 also is adapted to communicate with the VIPs 114 and 116 in order to perform OSS account management between the VIPs, the Level 1 Gateway 108 and the video data control center 110. For example, the VIP 114 may supply a request to the OSS 109 for a desired bandwidth, or may update its VIP profile via the OS-4 interface shown in FIG. 1 in order to broadcast a pay-per-view event at a predetermined time. The OSS 109 will advise the VIP 114 as to the appropriate VPI/VCI header to be loaded onto the ATM stream to be supplied to the ATM edge multiplexer 120 of the broadcast consolidation section 100. The OSS 109 will inform the Level 1 Gateway 108 and the video data control center 110 of the scheduled event, as well as the VPI/VCI of the video data stream. The OSS 109 will also periodically communicate with the VIPs 114 and/or 116 via the ATM backbone subnetwork 106 in order to maintain up-to-date lists of authorized VIUs to receive the selected VIP services.

Finally, as discussed in detail below with respect to FIG. 7, the VIP 116 may conduct an interactive (IMTV) session with a VIU via the ATM backbone subnetwork 106 and the LVAN 112 servicing the specific VIU. Although not shown in FIG. 3, the VIP 116 can conduct IMTV sessions with a VIU using a Level 2 Gateway and an IMTV server internal to the VIP 116. The Level 2 Gateway communicates with the Level 1 Gateway 108 of the network, to receive and process requests for IMTV sessions that include routing information. The IMTV server outputs broadband data for the VIU as an ATM cell stream to the ATM backbone subnetwork 106.

Communication between the network and the VIP 116, as well as between the network and the VIU, is established under control the Level 1 Gateway 108. From the VIU perspective, a user will communicate with the network via the Level 1 Gateway 108 in order to select the VIP 116 for an IMTV session. In a network providing access to multiple IMTV service providers, the user wishing to establish an IMTV session identifies the provider of choice to the Level 1 Gateway 108 by inputting control signals to the user's DET, which supplies the appropriate signals upstream from the customer premises 126 to the Level 1 Gateway 108 via the corresponding LVAN 112 and the ATM backbone subnetwork 106. In response, the Level 1 Gateway 108 controls the broadband routing functionality of the network to establish a downstream broadband communication link and a signaling link between the provider and the user.

The Level 1 Gateway 108 receives notification of the status of broadband communications links as they are being set up and during ongoing communications through those links. The Level 1 Gateway 108 therefore can inform a subscriber when a requested session can not be set up with a selected service provider, i.e. because the provider's server ports are all busy or because the subscriber is not registered with the particular provider or due to some technical problem. The Level 1 Gateway 108 also recognizes when an established link develops a fault or is interrupted and can stop accumulating usage or billing data regarding that link. The Level 1 Gateway 108 can also notify the subscriber and/or the service provider of the failure.

The Level 1 Gateway 108 will also store various information relating to each subscriber's services and control service through the network accordingly. At least some of this stored data is accessible to the subscriber through a direct interaction with the Level 1 Gateway 108. For example, the user can identify certain service providers to the Level 1 Gateway 108 and define an authorization code or identification number which must be input before the network should provide a session with the user's equipment 126 and the identified providers.

Many of the functions of the Level 1 Gateway 108 relate principally to set up, monitoring and billing for point-to-point type interactive sessions. As noted above, however, a number of the Gateway functions also apply to broadcast services. For example, the interaction with the Level 1 Gateway 108 can be used to advance order upcoming broadcast pay-per-view events. At the time for the event to begin, the Level 1 Gateway 108 will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway 108 also permit subscribers to specify limitations they wish to place on their broadcast services, e.g. total number of hours of usage within some defined interval and/or time of day/week of permitted usage. The Level 1 Gateway 108 will then control the broadcast network and/or the subscriber's terminal in accord with the limits defined by the subscriber. If necessary, the changes initiated by the VIU subscriber are uploaded by the Level 1 Gateway 108 to the OSS 109.

FIG. 4 is a block diagram of the network showing in detail a VNH 104 in accordance with the preferred embodiment of the present invention.

As shown in FIG. 4, each VNH 104, also referred to as a broadcast headend node or video access node, comprises a SONET multiplexer 130 that receives the OC-48 signal from the broadcast ring 102. The SONET multiplexer 130 is a drop-and-continue (D/C) multiplexer that "drops" the OC-48 signal from the broadcast ring 102 for local processing, and outputs the OC-48 signal to "continue" on the broadcast ring 102. The SONET multiplexer 130 converts the OC-48 signal to obtain the OC-3 ATM stream and the digitally-encoded (DS-3) baseband video signal output by the ATM edge multiplexer 120 and the digital encoder 118, respectively, as shown in FIG. 3.

The structure of ATM cells is generally recognized in the art. The ATM cell includes a header section and a payload section. In addition, the ATM cell may include additional overhead sections that provide additional vendor-proprietary features, such as priority level assignments, or forward error correction. The first byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual channel identifier (VCI). The third byte includes the next eight bits of the VCI. The fourth byte of the header section includes: the last four bits of the VCI; a 3-bit payload type (PT); and a cell loss priority (CLP) bit. The fifth byte of the header section 410 includes an 8-bit header error check (HEC) word. The CLP bit is used to manage traffic of ATM cells: in the event of network congestion, cells with CLP set to 1, indicating a lower priority, are dropped before cells with CLP set to 0.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0-18 for the VCI are reserved; therefore, any ATM cell having valid data must have a VCI value greater than "18". Thus, prior to transmission on the network, the ATM edge multiplexer 120 identifies ATM cells that do not have VCI values greater than "18" as idle cells that do not carry valid data.

Referring to FIG. 4, the SONET multiplexer 130 extracts the ATM cells by analyzing the input stream in 5-byte increments in order to check the header/error/check (HEC) sequence for valid ATM data. If the SONET multiplexer 130 verifies the HEC sequence, the 53-byte ATM cell is extracted and supplied to an ATM packet demultiplexer (APD) 134 allocated to process cells having specified VPI/VCI values. Although FIG. 4 shows only one ATM packet demultiplexer 134, in the preferred embodiment the VNH 104 includes a plurality of the demultiplexers.

The VNH 104 includes an analog portion that receives analog baseband video signals from the VIPs, from a Public Access Channel (PAC) broadcast source 135, and from Over-the-Air (OTA). Specifically, the SONET multiplexer 130 outputs the DS-3 encoded baseband video signal to a DS-3 analog decoder 132, which converts the DS-3 signal back to the VIP analog baseband video signal. The VIP analog baseband video signal is output from the analog decoder 132 to a modulator 136, which includes a tuner to mix the VIP baseband video signal from the analog decoder 132 onto a specific 6 MHz bandwidth RF channel. The PAC Broadcast Source 135 provides public access channel (PAC) programming related to community activities as a PAC baseband analog video signal, preferably via an optical fiber. A fiber optic receiver and equalizer amplifier 138 converts the optical signal from the PAC Broadcast Source 135 to a baseband analog PAC video signal that is supplied to a modulator 136' for mixing to a specified 6 MHz channel.

The analog portion of the VNH 104 also includes a plurality of antennas 140 that receive Over-the-Air (OTA) broadcast signals at VHF and UHF frequencies. The OTA signals are supplied to an analog signal processor 142, which performs signal conditioning and modulates the OTA signals to specified 6 MHz bandwidth RF channels. For example, the analog signal processor 142 may modulate the OTA television channels 4, 7 and 9 to 24, 27, and 29, respectively, in order to avoid interference with the PAC or VIP analog video channels. The VNH 104 may also include another antenna 140' that receives FM radio signals and supplies the FM signals to an FM radio signal processor 143. The signal processor 143 outputs the FM radio signal within a specified RF band, preferably the FM radio band, to the RF combiner 144.

Thus, the video signals output by the modulator 136 and the analog signal processor 142 are analog RF video signals at different 6 MHz RF channel frequencies. The analog signals output from the FM radio signal processor 143, the modulator 136 and the analog signal processor 142 go to an RF combiner 144. The RF combiner 144 is a passive combiner which combines the VIP, PAC and OTA analog video signals and the FM radio signal into a single RF signal. The video portion of the combined RF signal includes a plurality of analog 6 MHz channels. Thus, the VIP analog video signals, the PAC analog video signals and the OTA analog video signals can be received and viewed using a conventional television set, without the need for a digital entertainment terminal. Thus, these analog video signals could make up a basic video service analogous to the type offered by contemporary cable-TV companies. A video dial tone network subscriber can also receive FM radio broadcasts using a conventional FM receiver.

The RF combiner 144, however, enables passive combining of different baseband analog video signals, as opposed to known cable-TV systems, which require a rewire of modulators whenever a change was made in channel allocation. Thus, changes in the channel allocation in the disclosed embodiment can be made merely by reprogramming the modulator 136 and the analog signal processor 142. As discussed below, the RF combiner 144 is also adapted to combine RF signals carrying the compressed digital video signals from the VIP.

The digital portion of the VNH 104 receives the compressed VIP digital video signals from the recovered OC-3c ATM stream output from the SONET multiplexer 130. The OC-3c ATM stream is output from the SONET multiplexer 130 to one of several ATM packet demultiplexers (APD) 134 (only one shown for convenience). The APD 134 performs ATM processing and repacketizes the MPEG-2 packets on the basis of the VPI/VCI headers of the incoming ATM streams. Specifically, the ATM packet demultiplexer 134 buffers cells until it finds a cell having an ATM cell Adaptation Unit (AAU) value of "0" in its header (first cell) and another cell having an AAU value of "1" in its header (last cell). The ATM packet demultiplexer 134 counts the number of cells from first to last to determine the type of adaptation used to map cells.

If the ATM packet demultiplexer 134 has captured five cells, the receiver pulls out the payload data and uses the CRC data to check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

The reconstructed MPEG packets are assigned new PID values based on the VPI/VCI value of the ATM stream that carried the MPEG packets. This mapping of a new PID value in response to the VPI/VCI of the ATM stream is based upon a translation table loaded into the ATM packet demultiplexer 134 by the access subnetwork controller 240, via a the ATM subnetwork and a signaling path 146 (Ethernet or the like), discussed in detail below.

In a typical example, there are at least three PID values for packets of a particular program, a first PID value for packets containing video, a second PID value for packets containing audio and another PID value for a packet containing a program map. There often are more than three PID's associated with programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets continuing video, audio and/or data from the particular source.

In a combined MPEG packet stream carrying packets for two or more programs, the PID values for each program will be unique. For example, the program map for HBO might be found in packets corresponding to PID 132; the program map for TMC might be found in packets identified by PID 87 and so forth. The program map for HBO in the packet with PID 132 would then identify the PID numbers for the actual packetized elementary streams (PES) for the video, audio and data (if any) channels associated with the HBO program. The program map for TMC in the packet with PID 87 would then identify the PID numbers for the actual packetized elementary streams (PES) for the video, audio and data (if any) channels associated with the TMC program.

In the received OC-3c streams received by the APD 134, the packets carried in the ATM cells have PID values assigned by the respective VIP's encoding equipment. The MPEG-2 standard also requires that a packet stream containing packets relating to one or more programs includes a program association table in a packet identified by PID 0. The program association table maps a program number (PN) assigned to each program source with the PID value associated with the program map related to that source. In accord with the standard, the VIPs' encoders will construct the MPEG packet streams for each program to include a PID 0 packet containing the program association table. The program streams also include a packet identified by a PID value in that table containing the program map for that program. Thus, the APD can capture the program association table in packet PID 0 to identify the PID value for the program map from the source of programming and can capture the program map to identify the PID values applied by the source encoder to identify the data (if any), video and audio for the particular program. Alternatively, the APDs could be preprogrammed with the relevant PID values inserted by the VIPs' encoders. The translation table in the APD 134 is used to map each PID value in the reconstructed packets of a particular program into a new PID value which is unique at least within the output stream of the particular output port of the APD, as a function of the VPI/VCI value of the received ATM cells.

For example, assume for convenience that the HBO program arriving at the APD consists of video packets with a PID value of 17 and audio packets with a PID value of 19. The program map is contained in a packet identified by PID value 3, and the program association table in packet PID 0 identifies PID '3' for the program map. The APD recognizes all of the packets as originating from a single program source based on the VPI/VCI of the ATM cells and maps the PID values into new unique values, e.g. 27 for video and 37 for audio. The APD also constructs a new program map containing the new PID values for video and audio and inserts the new map in a packet identified by PID value of 132.

The APDs provide five broadband (27 Mbits/s payload) output rails. Assuming 6 Mbits/s programs, the APDs combine four MPEG-2 packets streams of four such programs for output on each broadband rail. The APDs will combine more programs into each output transport stream if the programs use lower bit rates, e.g. 1.5 or 3 Mbits/s. If strict compliance with the MPEG-2 standard is necessary, the APDs can construct and insert a new PID 0 packet into each such broadband output stream. The PID 0 packet output in each broadband transport stream would include a new program association table for that transport stream, i.e. mapping the unique program number into the PID value of the program map for each of the four or more programs contained in the broadband transport stream output.

As discussed in more detail below, reception of a particular digital program requires that the CPE terminal device know the RF channel transporting the program and at least one PID value associated with the program. Preferably, the PID value is that of the program map for the particular desired program, e.g. 132 in the above HBO example. The transport stream may include the program association table in packet PID 0 to insure compliance with the standard, and a DET may user the program number and program association table to capture that PID value. However, downloading of the PID values for the program maps eliminates processing time delays in channel surfing required to capture and process PID 0 packets.

The ATM packet demultiplexer 134 outputs the reconstructed MPEG packets on one of five 27 Mbits/s payload (30 Mbits/s with forward error correction) digital signal paths or 'rails' to a corresponding modulator/multiplexer 150. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a CATV type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s together with 3 Mbits/s of forward error correction information can be modulated into one 6 Mhz bandwidth analog channel. Similarly, 256 QAM or 16 VSB would yield up to 40 Mbits/s payload of capacity (not counting bits added for forward error correction), e.g. for 6 channels of 6 Mbits/s or mixes of the various rate encoded digital video information modulated into one 6 Mhz bandwidth analog channel. Each RF modulator produces a 6 Mhz bandwidth output at a different carrier frequency.

In the illustrated preferred embodiment, the modulator/multiplexer 150 is a Quadrature Amplitude Modulator (QAM) operating at 64 QAM, whereby media access control (MAC) is performed to ensure proper timing of the resulting time-division multiple access (TDMA) signal. Thus, each of the five 27 Mbits/s (payload) digital signals are 64 QAM modulated and multiplexed into an IF signal, which is upconverted into a specific 6 MHz channel. The QAM/ multiplexer 150 outputs the 6 MHZ channels to the RF combiner 144 for combining with the other 6 MHz RF signals. The RF combiner 144 thereafter outputs the combined RF signals to a lightwave transmitter 154, which outputs the combined RF signals on an optical fiber 156 for transmission to the local video access nodes 112.

Although the disclosed network is designed to transport digital broadband data for high data-rate applications such as video, the network is also able to transport low data-rate information to be broadcast from an information provider to the VIUs. In such a case, the ATM packet demultiplexer 134 will determine from the VPI/VCI that the received data is a low-rate data signal; consequently, the ATM packet demultiplexer 134 will output the low-rate data signal in MPEG format to a quadrature phase-shift keyed (QPSK) modulator 152, which modulates the low-rate data signal for RF transmission after passing through the RF combinet 144. The low data rate transmission may carry text or signaling information from a VIP in some way relating to one or more services offered by that VIP.

Thus, the APDs 134 map ATM cells into MPEG packets for both broadband services and narrowband information (e.g. signaling). The APD 134 is programmed to map VPI/VCI values in the cells into certain PID values in the resultant packets. Based on the VPI/VCI value, the APD 134 also will route the packets to an identified one of its outputs. The APD 134 outputs broadband related packets and associated in-band signaling on one of five 27 (payload) Mbits/s output rails going to one of the 64 QAM modulators 150. The APD 134 outputs packets related to downstream out of band signaling on a separate 1.5 Mbits/s (payload) rail going to a QPSK 152.

The signaling path 146 coupled to the components of the VNH 104 is preferably an Ethernet communication path. Although not shown in detail, the Ethernet signaling path 146 provides signaling and control signals to each of the components of the VNH 104. The Ethernet signaling path 146 communicates with the video data control center 110 via the ATM backbone subnetwork 106 in order to provide the operating status of each of the components of the VNH 104. Specifically, the Ethernet signaling path 146 provides upstream signaling data to an ATM router 148, which packets the Ethernet signals in ATM cell format, provides a VPI/VCI header for the intended destination of the Ethernet signal, and outputs the ATM stream onto the ATM backbone subnetwork 106. The ATM backbone subnetwork 106 routes the ATM stream from the ATM router 148 of the VNH 104 to a corresponding ATM router 244 at the video data control center 110 (FIG. 7). Preferably, the ATM backbone subnetwork 106 routes ATM streams between the VNH 104 and the video data control center 110 along dedicated virtual paths. The ATM router 244 at the video data control center 110 receives the ATM stream, reassembles the Ethernet signals, and outputs the Ethernet signals on its local Ethernet bus with a destination corresponding to the VPI/VCI of the ATM stream. The ATM virtual circuit to the video data control center 110 is a two-way circuit and carries instructions from the video data control center 110 back to the components of the VNH 104.

Figure 5:
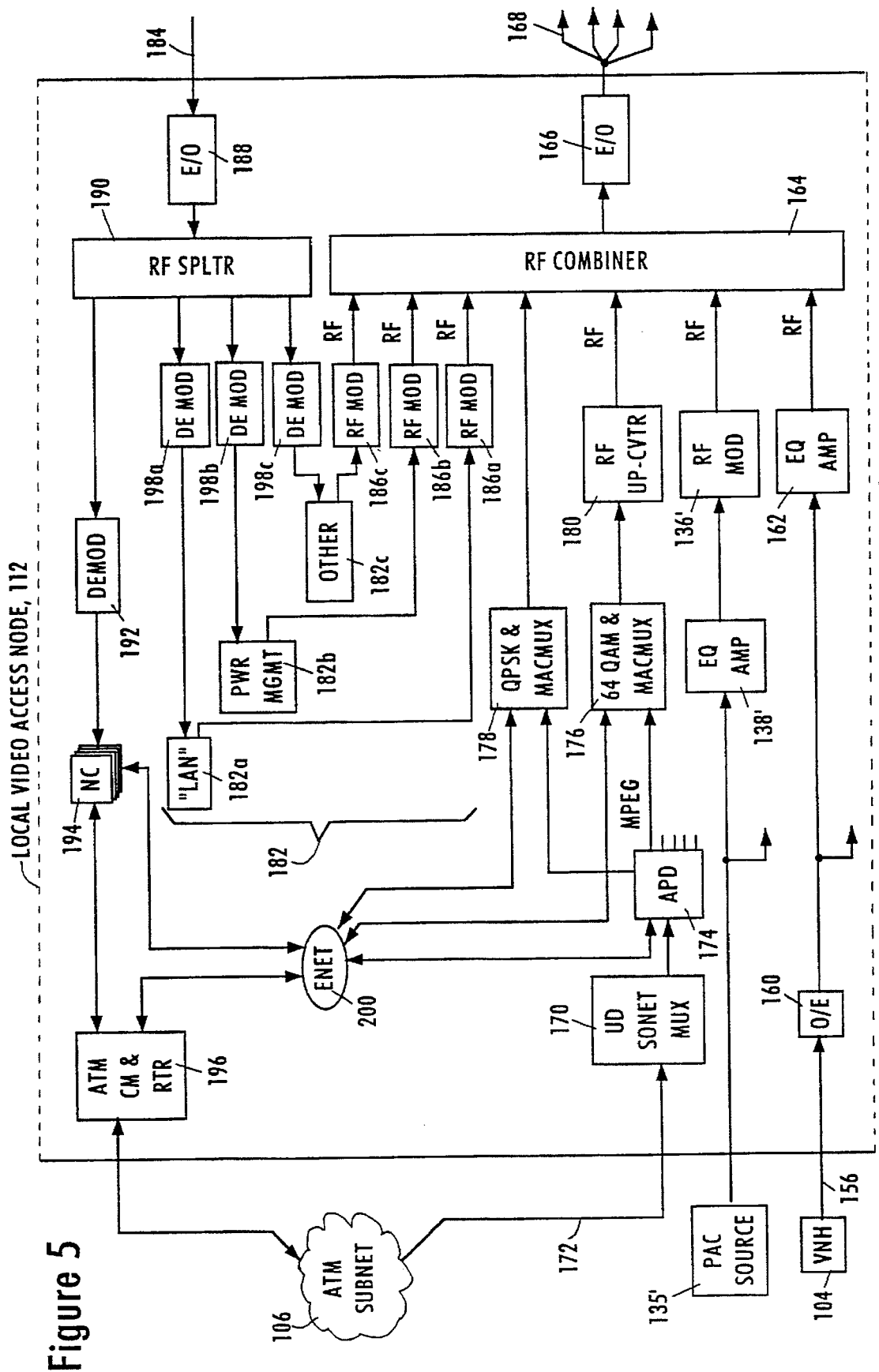
FIG. 5 is a block diagram of one of the local video access node type end offices shown in FIG. 3.

FIG. 5 discloses one of the network local video access nodes (LVAN) 112 according to a preferred embodiment of the present invention. The disclosed LVAN 112 is one of a plurality of LVANs that is distributed throughout the network service area in order to provide service to customers. In early implementation stages, however, it is anticipated that the first deployed LVAN 112 may be collocated with the VNH 104 in order to service a limited service area. Later deployed LVANs 112 will be located remotely from the VNH 104.

One of the electrical-to-optical converters 154 in the video network hub (VNH) 104 transmits the combined RF spectrum signal over an optical fiber 156 to one of the local video access nodes (LVNs) 112. As shown in FIG. 5, the LVAN 112, also referred to as a video central office or video end office, includes an optical-to-electrical (O/E) receiver 160 that converts the optical RF signal from the optical fiber 156 to an electrical RF signal. The RF signal output from the O/E receiver 160 is supplied to an equalization amplifier 162 for signal conditioning before RF combination by an RF combiner 164, similar to the RF combiner 144 shown in FIG. 4. The combined RF signal is output from the RF combiner 164 and reconverted to an optical signal by the electrical-to-optical (E/O) transmitter 166. The E/O transmitter 166 supplies the optical signal to the local loop distribution via optical fibers 168.

If desired, the LVAN 112 may also combine the RF signal from the VNH 104 with a local PAC broadcast signal supplied by a local PAC source 135. In such a case, the local PAC broadcast signal is received by a fiber optic receiver and equalizer amplifier 138', which supplies the conditioned local PAC broadcast signal to the modulator 136' for conversion to an RF signal at an available 6 MHz channel before combining by the RF combiner 164.

The LVAN 112 also provides signaling traffic between the VIU and the network, as well as broadband traffic for interactive multimedia television (IMTV) sessions. Specifically, the LVAN 112 includes a SONET multiplexer 170 that receives optical signals carrying ATM streams from the ATM backbone subnetwork 106 via a unidirectional OC-48c optical fiber 172. The SONET multiplexer 170 converts the OC-48 signal into OC-3c signals carrying ATM streams. The ATM cells transport IMTV traffic and VIU signaling traffic from the VIPs and the network, respectively. The OC-3c signal is input to an APD 134, which repacketizes the ATM cells into MPEG format and assigns PID values based on the VPI/VCI value of the received ATM cells. The APD 134 preferably is identical to the ATM packet demultiplexer 134 in the VNH 104 and performs the packet reconstruction and PID value mapping in the same manner as discussed above.

The APD 174 determines from the VPI/VCI value whether the ATM cells transport broadband data such as video, or narrowband data such as VIU signaling information or text data. The APD 174 outputs the broadband data in one of five 27 Mbits/s MPEG streams to one of five 64-QAM MACMUX modulators 176. In addition, the APD 174 outputs the narrowband data as an MPEG stream to a QPSK modulator 178, which modulates the MPEG stream carrying narrowband data for combining by the RF combiner 164. The 64-QAM MACMUX modulator 176 outputs the modulated broadband signal to an RF upconverter 180, which outputs the modulated broadband signal on an available 6 MHz RF channel for combining by the RF combiner 164. Thus, the RF combiner outputs a combined RF stream carrying 6 MHz channels of information to the VIUs from different sources, including broadcast VIPs, PAC Broadcast Source 135', IMTV VIPs, and network controllers for signaling traffic.

An additional feature of the present invention is that the information output by the RF combiner 164 is not limited to broadband video from broadcast or IMTV VIPs, and signaling traffic from the network. Rather, since the VIU is able to transmit information to the LVAN 112 via a optical fiber upstream signaling link 184, the LVAN 112 may be adapted to transmit to the VIUs information from any data source. For example, reference numeral 182 denotes other data sources that can use the disclosed network for transport to the VIU: a user could remotely access a LAN source 182a using the upstream signaling link 184 for two-way communication; the network could control power to the user's DET, or alternatively work in conjunction with electric utilities to read a user's electric meter using a power management controller 182b; or a reserved port 182c could be set aside for future interactive data applications. In such a case, the data is output from one of the sources 182 to a corresponding RF modulator 186 before combining by the RF combiner 164.

Upstream signaling from the VIU is received from the upstream signaling link 184 by an E/O receiver 188, which outputs the multiplexed RF signal from the VIUs to an RF splitter 190. The RF splitter 190 splits the RF spectrum and outputs the split RF spectrum on predetermined signal paths. For example, a predetermined RF channel will contain signaling information to be supplied from certain VIUs to the Level 1 Gateway 108, such as a request for new service, or a request for an IMTV session with a VIP via a Level 2 Gateway. This VIU signaling information will be supplied to a demodulator 192 to demodulate the signaling information off the RF carrier. The demodulator 192 will output the demodulated VIU request to one of thirteen (13) network controllers (NC) 194, each of which processes VIU requests and identifies the destinations for the requests from a specified group of CPE devices. The NC 194 passes each VIU request to an ATM router 196, which receives inputs from the network controllers, packetizes the VIU request in an ATM cell stream, adds a VPI/VCI header to identify the destination of the request, and outputs the ATM stream onto the ATM backbone subnetwork 106. The processing of the VIU request is discussed in more detail below.

As discussed above, the upstream signaling link 184 may provide upstream signaling data for the other data sources 182. For example, the RF splitter 190 outputs an RF signal at a predetermined band to one of the demodulators 198 corresponding to the devices 182. The demodulators 198 remove the RF carrier signal and output the demodulated signal to the corresponding device 182.

As discussed above with respect to FIG. 4, the VNH 104 includes an Ethernet control network to control the components of the VNH 104. Similarly, the LVAN 112 comprises an Ethernet system 200 for controlling the components of the LVAN 112. As discussed in detail below with respect to FIG. 7, the Ethernet system 200 communicates with the network via the ATM router 196, which passes Ethernet messages between the Ethernet system 200 and remote Ethernet systems via the ATM backbone subnetwork 106.

Figure 6:
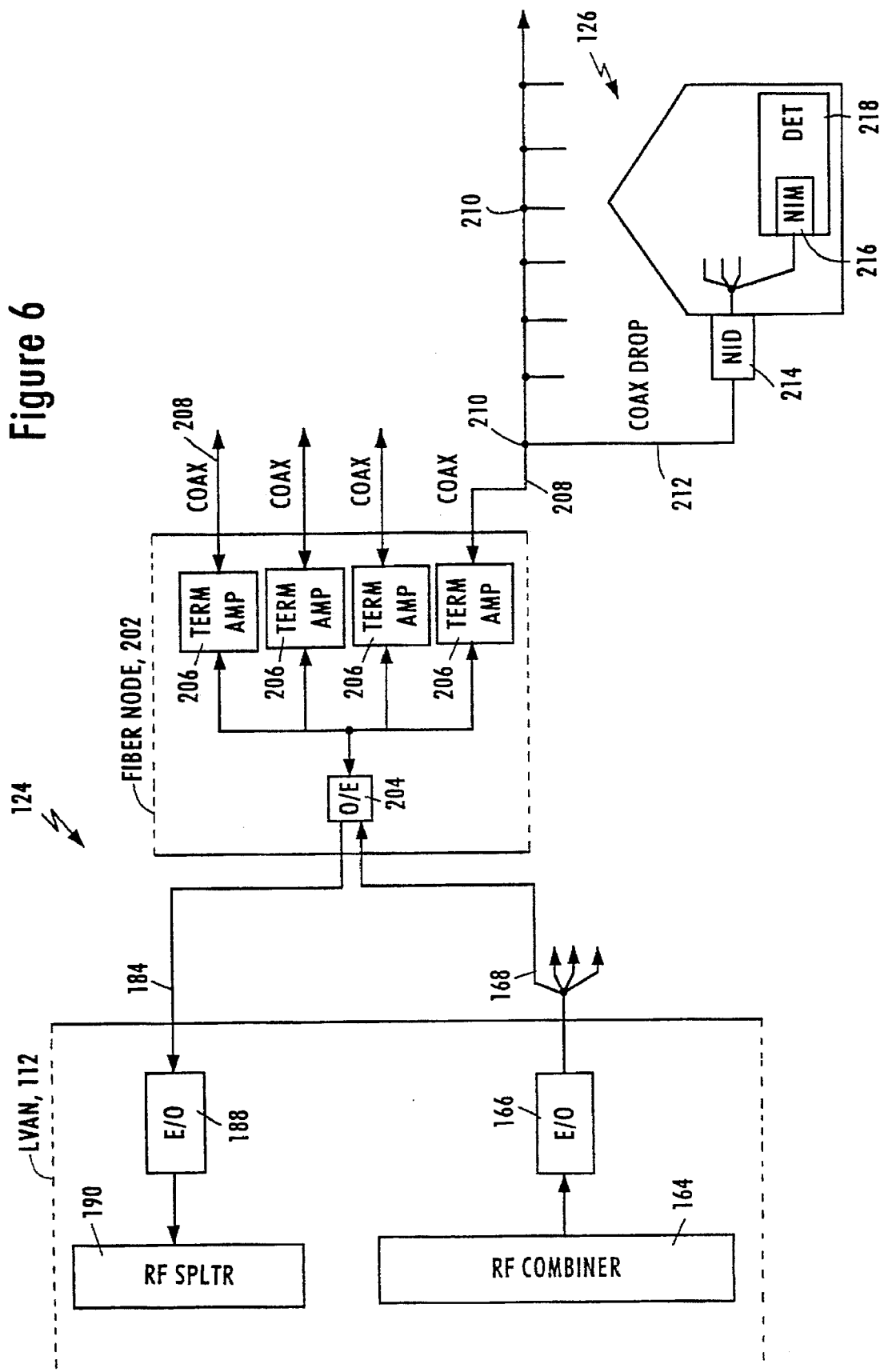
FIG. 6 is a block diagram of one local loop distribution system portion of the network shown in FIG. 3.

FIG. 6 discloses an exemplary implementation of the local loop distribution network 124 shown in FIG. 3 in accordance with the preferred embodiment of the present invention. Although the local loop distribution system 124 shown in FIG. 6 is a hybrid-fiber coax system, one having ordinary skill in the art will appreciate that other local loop distribution systems may be used, such as Asymmetrical Digital Subscriber Loop (ADSL), Fiber-to-the-Curb, or direct fiber to the living unit. Thus, the overall network architecture shown in FIG. 3 may use different local loop distribution systems in different geographic areas within the serving area. As described above with reference to FIG. 2, the OSS tracks network equipment and facilities within the network serving area, including the facilities associated with the local loop distribution network as shown in FIG. 6.

As shown in FIG. 6, the combined RF signal output from the RF combiner 164 is converted to an optical signal by the E/O transmitter 166 and output to the local loop distribution 124 on the optical fibers 168. Generally, the optical signal will be provided to a plurality of optical fibers via an optical splitter, preferably a maximum of four optical fibers per combiner 164. Each optical fiber 168 carries the combined analog RF signal to a fiber node 202. According to the preferred embodiment, each fiber node 202 serves one broadcast service area (BSA) of up to 500 homes passed.

The fiber node 202 comprises an O/E transceiver 204 that provides two-way conversion between optical and electrical RF signals transmitted to and received from a plurality of terminal amplifiers 206. Each terminal amplifier 206 outputs the downstream electrical RF signal onto a coaxial cable 208. The coaxial cable 208 is designed to pass one hundred twenty five (125) homes. Specifically, a tap 210 is installed along the coaxial cable 208 for each living unit that wishes activation on the network. A coaxial drop cable 212 is wired between the 210 and the customer premises 126. Thus, assuming each home receives a tap 210 for service on the network, each coax cable 208 will service up to 125 homes.

As shown in FIG. 6, the customer premises 126 includes a network interface device (NID) 214, a network interface module (NIM) 216, and a digital entertainment terminal (DET) 218. The NID 214 receives the coax drop 212 and splits the RF signal into four coax signal paths. Each home or living unit 126 is preferably allocated a capacity of four digital entertainment terminals 218 (DET's). Each coax feed is supplied to the NIM 216, which demodulates the downstream RF signal at a user-specified channel frequency. If the demodulated RF signal is an analog video signal from an analog source (such as the PAC 135), the NIM 216 passes the baseband analog video signal directly to the television set without further processing by the DET 218.

If, however, the NIM 216 receives an MPEG encoded signal, the NIM 216 will de-encrypt at selected program elements of the 27 Mbits/s MPEG encoded signal using a key downloaded from the network's ACC-4000 (described in detail below). Upon de-encrypting, the NIM 216 supplies the 27 Mbits/s MPEG encoded signal to the main portion of the DET 218 for further processing to present a selected program to the user.

The NIM 216 also demodulates a downstream signaling channel carrying signaling data in MPEG packets. From the signaling channel, if the MPEG encoded signal has a PID value corresponding to the NIM address, the NIM 214 processes the MPEG stream as NIM signaling data. If, however, the PID value corresponds to the DET address, the NIM 214 extracts the data from the MPEG stream and outputs that data to the DET CPU. Alternatively, the NIM and DET may have a single PID value address, in which case, data within the signaling packet indicates whether the message is for the NIM or the main portion of the DET.

The DET used in the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

The NIM 216 provides the interface necessary for the DET 218 to communicate with the local loop distribution system 124. The structure of the NIM 216 is dependent on the local access technology (in this case, hybrid-fiber coax), the NIM 216 provides standardized control signals to and from the DET 218. Consequently, the main portion of the DET 218 can be implemented as a generic consumer product that is independent of the local access technology, whether it is hybrid-fiber coax, ADSL, satellite receiver, or fiber to the curb.

Although not shown in FIG. 6, the NIM 216 presents two connections to the DET 218, a high bit rate broadband connection and a low bit rate signaling connection. The broadband connection is a one-way downstream only connection, but the low-bit rate signaling connection is a two-way connection.

The NIM 216 includes a frequency agile QPSK demodulator for processing the downstream narrowband transmissions. The demodulated data may relate to NIM functions or to functions of the main portion of the DET 218. The NIM also includes a frequency agile QPSK modulator, to permit transmission of upstream signaling information over the coaxial cable on specified RF channels not used for downstream transport. The main portion of the DET can supply messages to the NIM for such upstream transmissions, and under certain circumstances, the NIM's internal control processor can transmit upstream messages in this manner.

As discussed below, the network OSS 109 assigns each NIM 216 to a default channel for downstream reception and a default channel for upstream transmission. The QPSK demodulator and the QPSK modulator within the NIM can also shift to other channels allocated on a dynamic basis, e.g. to provide signaling for IMTV services requiring more bandwidth than is available through the default channels.

The main portion of the DET 218 receives selected MPEG streams from the NIM 216, and decompresses selected MPEG packets in order to recover the original digital signal. If the digital signal is narrowband signaling information for the DET 218, the signaling information is supplied to the DET microprocessor as raw data, for appropriate processing. If the digital signal is broadband information, the NIM 216 supplies the MPEG packet stream to the main portion of the DET via a broadband (e.g. 27 Mbits/s) interface. The DET determines whether the data in the broadband MPEG packets is digital video or audio data or other broadband data, and supplies the data through respective MPEG decoders to the television or to the DET microprocessor, accordingly.

The DET 218 is adapted to receive and store downloaded control software. The DET 218 can establish a link to the network via a Level 1 Gateway session to receive operation systems code, default channel maps, and permissions tables in order to receive broadcast services from multiple VIPs. In some cases, the DET may also establish a point to point link to a VIP's interactive equipment. For broadcast services, the DET captures a cyclically broadcast application, for example navigation software.

The DET 218 captures and processes a digital channel based on the RF channel and the PID value associated with the program map for the particular source program. The program map PID value may be retrieved from the program association table (PID 0 packet) or from information downloaded and stored in memory. As noted above, the program map specifies the PID values for packets continuing video, audio and/or data from the particular source. For example, HBO might be one of four digital programs carried in RF channel 53, and the program map for HBO might be found in packets corresponding to PID 132. The program map for CBS in the packet with PID 132 would then identify the PID numbers for the actual packetized elementary streams (PES) for the data (if any), video and audio channels associated with the HBO program.

Once the DET 218 identifies and captures the program map, the MPEG decoder section can extract the video elementary stream, the audio elementary stream(s) and any associated data stream for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

In the preferred network implementation, the NIM 216 stores the decryption keys that are supplied from the APD 134 via the downstream signaling channel output on the 64-QAM MACMUX modulator 176 and the RF upconverter 180 in FIG. 5. The NIM uses those keys to decrypt selected programs before supplying the program signals to the main portion of the DET. Thus, a user's DET 218 receives only authorized MPEG data streams, thereby improving network security and reducing the ability of unauthorized users to access other video programming.

A more detailed description of the structure of the DET and NIM and the operations thereof involved in downloading applications software and operating system changes into the DET are disclosed in copending application Ser. No. 08/380,755, filed Jan. 31, 1995 (attorney docket No. 680-083C), incorporated herein in its entirety by reference.

FIG. 7 is a block diagram illustrating the relation of the ATM backbone subnetwork 106, the video data control center 110, and a Video Dial Tone (VDT) control center including the Level 1 Gateway 108 shown in FIG. 3. As shown in FIG. 7, the video data control center 110 includes an access subnetwork controller 240, an ACC-4000 242, and an ATM router 244 for sending and receiving ATM cell streams to and from the ATM backbone subnetwork 106. Although not shown in FIG. 7, the OSS 109 is responsible for providing provisioning and assignment information to each of the components of FIG. 7 in accordance with the OS control signal paths disclosed in FIG. 1.

The access subnetwork controller 240 communicates with the elements in the VNHs 104 and the LVANs 112 via the ATM router 244, dedicated virtual circuits through the ATM subnetwork 106 and the ATM routers 148, 196 and associated Ethernets 146, 200 in the respective offices. The ACC 4000 242 communicates with the APDs 134, 174 in the VNHs 104 and the LVANs 112 via the ATM router 244, dedicated virtual circuits through the ATM subnetwork 106 and the ATM routers 148, 196 and associated Ethernets 146, 200 in the respective offices. For example, through such communications, the access subnetwork controller 240 downloads PID value mapping information based on the VPI/VCI values of incoming cells to the respective APDs, and the ACC 4000 242 downloads encryption keys to the APDs. The ATM router 244 and the ATM backbone network 106 also permit the access subnetwork controller 242 to communicate with the Level 1 Gateway 108 of the present invention.

The VDT Control Center 246 comprises the Level 1 Gateway 108 and a Permanent Virtual Circuit (PVC) controller 248. Although not shown, the VDT Control Center 246 includes a corresponding ATM router to repacketize the ATM cells and supply the messages to the Level 1 Gateway.

The PVC controller 248 is the controller for the ATM subnetwork 106. The ATM subnetwork 106 includes at least one hub ATM switch 252, as shown in FIG. 7. In future implementations providing IMTV services from larger numbers of VIPs to larger numbers of VIUs, the ATM subnetwork 106 will include the hub switch 252 and a number of ATM access switches (not shown). The access switches will provide connections from the hub switch to particular nodes of the access subnetwork.

As shown, the PVC controller 248 connects directly to the ATM hub switch 252. In one implementation, this is an X.25 connection. When upgraded to interact with multiple ATM switches, the PVC controller 248 has an open interface to all of the ATM switches to allow communication with and control of switches produced by various manufactures. In the preferred multi-switch embodiment, an ATM signaling connection from the PVC controller 248 provides communications with the programmed controller of the hub switch itself and provides virtual circuit connections through the hub switch to the programmed controllers of the various ATM access switches. Although not shown in FIG. 7, the ATM hub switch 252 may also provide a dedicated permanent virtual circuit for the communications between the Level 1 Gateway 108 and the PVC controller 248.

The PVC controller 248 interfaces to the network operations support system (OSS) 109, the Level 1 Gateway 108 and the one or more switches of the ATM subnetwork 106.

The PVC controller 248 stores data tables defining all possible virtual circuits through the ATM switch network. These data tables define the header information and the particular input port and output port used to route cells from each interactive multimedia (IMTV) service VIP to an input point on the access subnetwork. The data tables thus define "permanent virtual circuits" (PVC's) between the providers and the input ports of the access subnetwork. The data tables within the PVC controller also define various dedicated circuits established by the OSS for communications between various controllers of the network and/or to the VIP's equipment. The tables in the PVC controller 248 include current availability data for VPI/VCI values and an ongoing record of which VPI/VCI values are in use. Thus, at any given time the PVC controller 254 knows what VPI/VCI values are available to and can be assigned dynamically to provide requested bandwidth for each new IMTV session.

The ATM backbone subnetwork 106 also comprises a plurality of unidirectional SONET multiplexers 254. Although only four (4) SONET multiplexers 254 are shown in FIG. 7. It should be understood that all connections to and from the ATM switch 252 are preferably at a transmission rate of OC-3 or OC-48.

According to the preferred embodiment, the ATM switch 252 routes all ATM streams on the basis of the VPI/VCI of the cell streams. The ATM stream virtual path is controlled by the PVC controller 248, which provides switching control instructions to the ATM switch 252 to set up the virtual paths in the ATM switch 252 from the source to the destination in response to assignments from the Level 1 Gateway 108. In addition, each VNH 104 and LVAN 112 is assigned a predetermined virtual path for communication with the video data control center 110, thereby relieving management requirements by the PVC controller 248. Upstream signaling traffic from a VIU to the Level 1 Gateway 108 or the video data control center 110 is routed along dedicated virtual paths.

The access subnetwork controller 240 controls all routing of broadband and narrowband data throughout the access subnetwork in response to bandwidth requirements supplied from the Level 1 Gateway 108. For example, in the case of broadcast services such as pay-per-view, the broadcast VIP 114 may desire to broadcast broadband data to be transported by the network. In one variation, the broadcast VIP 114 may communicate with the Level 1 Gateway 108 via the ATM backbone subnetwork 106 to exchange interactive broadcast signaling information in order to request a specified bandwidth at a scheduled time. Preferably, however, the broadcast VIP 114 will communicate with the OSS via the OS-4 control signal interface shown in FIG. 1 whereby the broadcast information is loaded into the VIP's event profile stored in the OSS system 109, and from there, into the Level 1 Gateway 108. The ATM edge multiplexer 120 receives a message that the specified VPI/VCI is permitted to pass into the network. The Level 1 Gateway 108 will send an instruction to the access subnetwork controller 240 that bandwidth is required at the scheduled time for a specified duration. The Level 1 Gateway will specify the logical network channel number for the channel that will carry the event. From that information the controller 240 can identify the ATM stream having a VPI/VCI header value for the transmission from VIP. The access subnetwork controller 240 sends signaling messages throughout the access subnetwork to establish the bandwidth at the correct time. For example, the ATM packet demultiplexer 134 is loaded with the appropriate PID values to map the ATM stream to an MPEG stream having a specified MPEG format. The access subnetwork controller 240 will also send an instruction to the ACC-4000 242 to send an encryption key to the ATM packet demultiplexer 134 to encrypt the program before RF transmission to the LVANs 112.

At the customer premises as shown in FIG. 6, an authorized VIU will have downloaded into the NIM 216 the encryption key from the ACC-4000 242 via a control channel (broadband) or an out-of-band signaling channel.

The VIU will access the Level 1 Gateway 108 in order to initiate an IMTV session with an IMTV VIP 260. As shown in FIG. 7, the system of the IMTV VIP 260 includes a Level 2 Gateway 262 for communication with the Level 1 Gateway 108 via the ATM backbone subnetwork 106 and with the DET 218, and an IMTV server 264 for outputting broadband video data in ATM streams to the ATM backbone subnetwork 106.

During the communication session between the VIU subscriber and the IMTV VIP 260, the DET 218 can transmit control signalling upstream through the ATM subnetwork 106 to the Level 2 Gateway IMTV VIP 260. The Level 2 Gateway IMTV VIP 260 can also send signaling information, such as control data and text/graphics, downstream through the same path to the DET or as in-band data included within the broadband output stream from the server 264. For downstream transmission, the server 264 will provide ATM cells with an appropriate header. The ATM switch 252 will route the cells using the header and transmit those cells to the APD 134 serving the requesting subscriber 236 for conversion to MPEG format. In the presently preferred embodiment, the downstream signaling from the VIP is included as user data (in-band) as part of the broadband MPEG packet stream transmitted to the DET from the server 264.

Certain VPI/VCI values would be assigned and available to each IMTV VIP, and other VPI/VCI values would be assigned to the access subnetwork. For each session, the access subnetwork controller would pick the port and VPI/VCI value for entry into the access subnetwork, and the VIP would pick the output port and the VPI/VCI value to be output by its equipment. The Level 1 Gateway supplies both port identifiers and the two end point VPI/VCI values as terminating and originating information to the PVC controller as part of the request for connection through the backbone subnetwork 106. The PVC controller 248 assigns VPI/VCI values within the ATM subnetwork.

Each physical port of the ATM subnetwork 106 will have more than one VPI/VCI assigned to cells passing through that port. The PVC controller 248 stores data corresponding to each port that indicates the VPI/VCI values in use for each connection ID. When the Level 1 Gateway 108 requests a connection through the ATM subnetwork 106, the PVC controller 248 accesses its data tables to determine if the requisite bandwidth is available between the two identified ports. If not, the PVC controller 248 returns a negative acknowledgement message indicating the reason for the inability to complete the requested connection. If the bandwidth is available, the PVC controller 248 provides appropriate instructions to the switch or switches which will establish the link and provides a confirmation reply message to the Level 1 Gateway 108 when the link through the ATM subnetwork 106 is complete.

OSS Architecture

Figure 12:
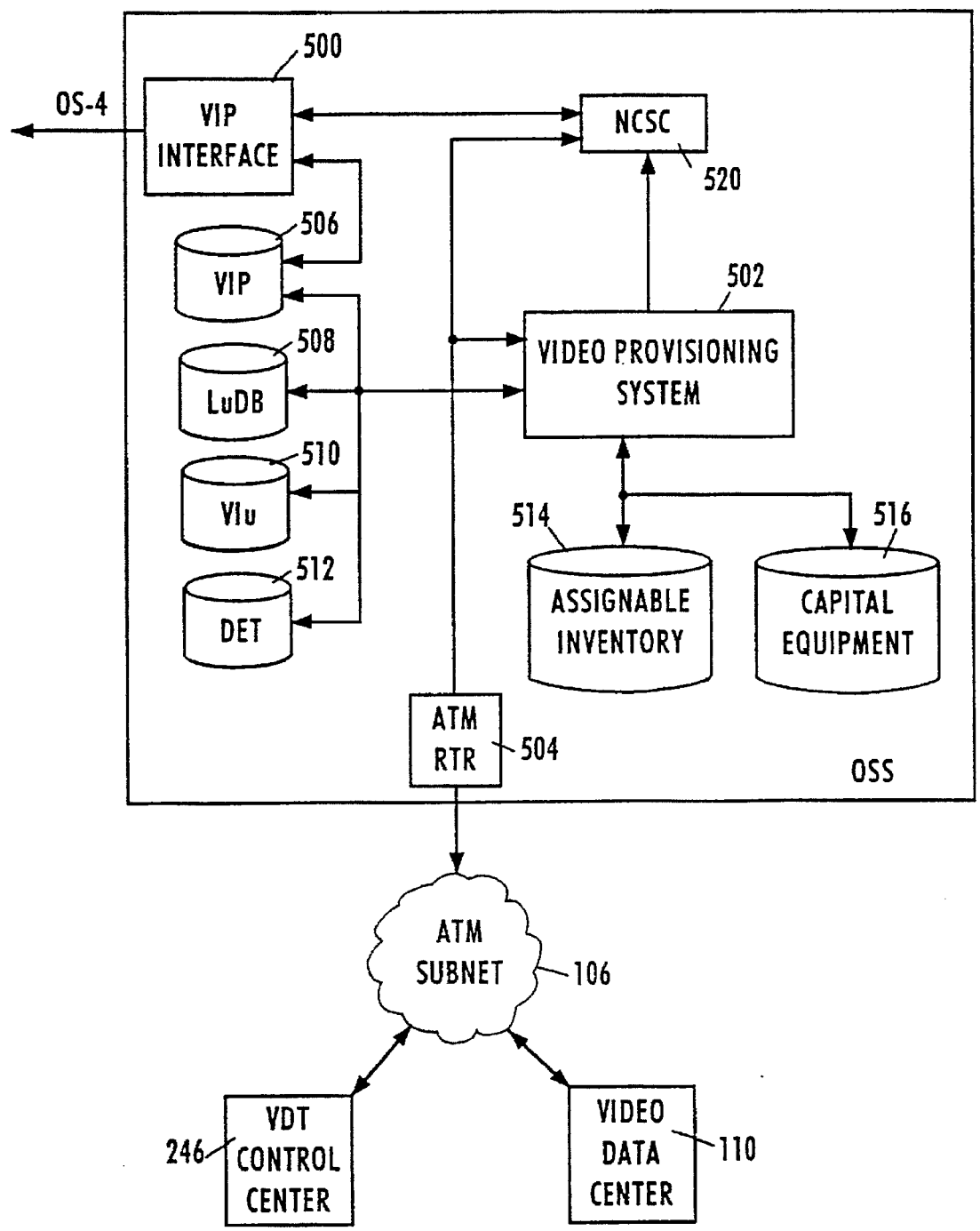
FIG. 12 is a block diagram of an exemplary operational support system according to the preferred embodiment of the present invention.

FIG. 12 provides an exemplary block diagram of the OSS 109 used for service creation, activation and control in the network. As shown in FIG. 12, the OSS 109 preferably includes a VIP interface 500, a video provisioning system 502, an ATM router 504, and a plurality of databases, namely, a VIP database 506, a living unit database (LUDB) 508, a VIU database 510, a DET database 512, an assignable inventory database 514, and a capital equipment database 516. In addition, the OSS communicates with a network customer service center (NCSC) 520 that processes billing information and network usage and capacity statistics for network subscribers, including VIPs and VIUs.

An exemplary network customer service center may handle all service transactions for VIPs and VIUs, including generating service activation requests based on new contracts with VIPs or VIUs. If the VIP prefers, the broadband usage information can be provided to a customer record information system, or "CRIS". CRIS would store information as to each VIP's service/usage charges, as well as the video dial tone access charge, and the OSS would process that information together with the usage data from the Level 1 Gateway to generate a combined bill for the end user/subscriber. The subscriber would pay the billed amount to the network operations company, typically the local telephone company, and the network operations company would process the received revenues. Alternatively, these functions may be performed by the VIP at its VIP service center.

The NCSC 520 preferably also includes a work order manager system for issuing installation work orders, and a VIP support subsystem (VIPSC) that provides carrier services to enable sale of video dial tone services and access link and transport to VIPs. The VIPSC will provide immediate access to descriptive information about service offerings, VIPs, and subscribers (existing and potential) by accessing the OSS databases. In addition, the VIPSC may be able to retrieve information from other legacy systems, including Trunks Integrated Records Keeping System (TIRKS), Service Order and Activation Center (SOAC), Billing and Order Support System (BOSS), Computer System for Mainframe Operations (COSMOS), and Premises Information System (PREMIS). The VIPSC would coordinate service orders for video access links from the VIP head end to the network POI. Preferably, the work order manager system will handle field coordination and support for installation and maintenance dispatches where VIPs have a contractual relationship with an outside contractor to do outside drop and customer premises work. The work order manager system would also dispatch work orders and/or trouble tickets for any trouble or equipment failure in the network.

The databases in the OSS are used by the video provisioning system 502 and the network customer service center 520 to track the network assets and facilities as well as the subscriber services that are in use on the network. The VIP database 506 contains all pertinent data for all VIPs that subscribe to the network, including VIP profiles, VIP event schedules, and VIP assignment information regarding network resources. The LUDB 508 includes all the information related to homes passed in a serving area, including a list of homes that are pathed to addresses, the video dial tone status, the drop status (buried cable, aerial or building), the architecture type of the local loop distribution 124, a VIU's settop address, etc., thereby enabling network planners and VIP business systems to determine the availability of service within a certain period.

The VIU database 510 contains all relevant information regarding a VIU, including the VIU profile (E.164 address, DET address, service subscription, etc.). Similarly, the DET database 512 identifies all DETs active in the network by their DET ID or serial number, DET make and model, the corresponding network address (for example E.164, CMID—Communication Module Identifier—or IP addressing), VPI/VCI values for signaling, and any revision information. The assignable inventory database 514 and capital equipment database 516 are used by the video provisioning system 502 for the service creation, service activation and service control functions discussed above with respect to FIG. 2.

The VIP interface 500 provides an interface for the VIPs that restricts their access in the network to their own VIP profiles in the VIP database 506. Thus, the VIPs are given limited access to the databases, thereby ensuring security for other competing VIPs.

As shown in FIG. 12, the NCSC and the video provisioning system 502 are coupled to the ATM router 504 for access to any of the network elements via the ATM subnetwork 106. Thus, the OSS 109 can pass any necessary provisioning or assignment information to the respective network elements. In addition, the ATM subnetwork 109 passes messages shown in FIGS. 8–11 between the OSS and the Level 1 Gateway along dedicated virtual paths. Thus, the OSS is preferably implemented such that the OS interface paths shown in FIG. 1 are routed along the ATM backbone subnetwork. If desired, the OS-4 interface path may also be implemented on the ATM subnetwork 106, so long as the VIP interface 500 is maintained to restrict access to the VIP database 506.

Level 1 Gateway Communications

As outlined in the above discussion of the preferred network architecture, the Level 1 Gateway 108 will communicate with a VIU type subscriber through that subscriber's DET 218 and associated television set. The Level 1 Gateway 108 also communicates with IMTV VIPs Level 2 Gateways 262. The Level 1 Gateway 108 also communicates with the relevant subnetwork controllers, i.e. the access subnetwork controller 240 and the PVC controller 248. As shown in FIG. 3, the ATM subnetwork 106 provides a connection to an Operations and Support System (OSS) 109. The Level 1 Gateway 108 will communicate with the OSS 109 for a variety of provisioning and usage accounting functions. The OSS 109 includes a number of information processing systems used for provisioning, the NCSC and one or more billing systems, such as the CABS and CRIS systems, discussed in detail below. To facilitate understanding of the relationship of the OSS and the Level 1 Gateway in the context of the preferred network architecture, the following discussion provides a detailed explanation of the types of signaling and communications that the Level 1 Gateway exchanges with these other network elements. A detailed description of the OSS will then be given to provide a better understanding of the OSS functions in the context of the preferred network architecture.

The OSS 109 provides a variety of information regarding VIPs and VIUs to the Level 1 Gateway 108. For example, in the preferred network architecture, the VIU information would include VIU profile information, such as the identities of VIPs from whom the VIU has subscribed for services, the type of services subscribed to etc. The information regarding each VIP relates to the types of services the VIP offers through the VDT network, e.g. number of channels, which channels provide pay-per-view service, etc.

The OSS 109 can also send requests to the Level 1 Gateway 108 to set-up, tear down and modify connections. For example, when a new VIU becomes a subscriber on the VDT network, the OSS 109 provides the new subscriber profile information to the Level 1 Gateway and instructs the Level 1 Gateway 108 to establish a permanent signaling connection to the new subscriber's DET 218. The Level 1 Gateway 108 then interacts with the PVC controller 248 and the access subnetwork controller 240 to establish the default signaling channel through the subnetworks, between the Level 1 Gateway 108 and the subscriber's DET 218. This process flow is described in more detail below.

When a VIU subscribes to broadcast services of a particular VIP, the VIP will identify the VIU to the OSS, preferably by the OS-4 signal interface. The OSS 109, in turn, instructs the Level 1 Gateway 108 to make the broadcast services of that VIP available to the particular subscriber's DET(s) 218. The steps involved in broadcast channel activation also are described in detail below.

Broadcast service VIPs typically will offer some pay-per-view services. At least some of those VIPs will provide necessary information regarding individual pay-per-view events and VIUs who have purchased particular events to the OSS 109. The OSS 109, in turn, provides the information regarding individual pay-per-view events to the Level 1 Gateway 108. The OSS 109 also instructs the Level 1 Gateway 108 to make a pay-per-view event available to each purchasing subscriber's DET(s) 218 at the time of the particular event. Alternatively, the VIP's equipment may have a direct interface to the Level 1 Gateway 108 to provide the event information and purchasing subscriber identifications directly to that Gateway.

The Level 1 Gateway 108 transmits all usage information to the OSS 109 for processing by one or more of the billing systems. For a given connection, the usage information may include bandwidth and connect time and/or an ATE cell count. For pay-per-view type services, the information will include an event identifier and the network address. The Level 1 Gateway 108 also sends alarm or failure information relating to specific session connections between a VIU and an IMTV VIP to the OSS 109 for processing by one or more maintenance related systems. The Level 1 Gateway 108 may run its own internal diagnostic routines, in which case, the Gateway 108 would also notify the OSS 109 of any faults or failures in that Gateway.

The OSS may include an interface, e.g. a Level 2 Gateway and/or server, to permit VIUs as well as VIPs to interact directly with the OSS. This is one way that a VIU might modify or upgrade their VDT services. In an integrated network providing telephone services as well as video and/or data services, the OSS 109 would also serve as the operations support system for telephone services. Consequently, the interaction with the OSS through the VDT network would allow VIUs on-line access to modify their telephone services. For this interface to the OSS 109, the Level 1 Gateway 108 would provide notification of incoming calls to the OSS from VIPs or VIUs, in a manner similar to the notification provided to a Level 2 Gateway operated by an IMTV service VIP discussed in more detail later.

Alternatively, an application running in the Level 1 Gateway 108 can interact with the VIU through the DET 218 to modify services provided to the VIU via the network. In that case, the Level 1 Gateway would notify the OSS 109 of the changes to service subscriptions made by the VIU.

As noted above, the Level 1 Gateway 108 also communicates with the PVC controller 248. The Level 1 Gateway 108 transmits requests to establish and tear down connections to the PVC controller 248. These requests will identify the entry and exit ports of the ATM subnetwork and the end point VPI/VCI values of the relevant virtual circuits. As discussed below, the Level 1 Gateway obtains one port identifier and associated VPI/VCI value from the VIP's Level 2 Gateway 262 and another port identifier and VPI/VCI value from the access subnetwork controller 240. The requests for connection also specify a bandwidth for the desired connection. The Level 1 Gateway 108 may also transmit some form of connection identifier to the PVC controller 248.

In response to a connection request, the PVC controller 248 provides appropriate instructions to the ATM hub switch 252 and any access switches (not shown) needed to make the connection. Specifically, the PVC controller 248 instructs the switch(es) to provide a virtual circuit connection between the specified end points and to translate the input VPI/VCI value into the output VPI/VCI value. The PVC controller 252 assigns any intermediate, VPI/VCI values used within the ATM subnetwork itself. In this manner, the Level 1 Gateway 108 and the PVC controller 248 interact to establish virtual circuit connections, for downstream broadband transmissions (one-way), for associated upstream signaling connections (one-way), and for two-way connections.

In the above discussed preferred operation, the Level 1 Gateway 108 obtained the VPI/VCI values from the endpoints (the VIP and the access subnetwork) and supplied those values to the PVC controller 248. Alternatively, the PVC controller 248 could use its mapping tables to map the port ID information into appropriate termination and origination VPI/VCI values, or the Level 1 Gateway itself could administer and assign endpoint VPI/VCI values for each virtual connection it needs to establish through the ATM subnetwork.

ATM switches provide bidirectional virtual circuits. However, in the video dial tone network, many connections are unidirectional (particularly those for the downstream broadband connections). The requests for bandwidth can separately specify the bandwidth in each direction. For example, for unidirectional connections, the Level 1 Gateway 108 will specify the required bandwidth in one direction, e.g. downstream, and specify a 'O' bandwidth in the other direction.

The above discussion of connection set-up and tear down by the Level 1 Gateway, the PVC controller and the ATM switch(es) applies to the downstream broadband connection from the VIP to a port for IMTV services. The network also provides two-way signaling between the VIP's equipment and the DET 218. For this purpose, the ATM subnetwork can provide a requested low bandwidth two-way virtual circuit in parallel to the downstream broadband virtual circuit. The downstream signaling information would originate from a port on the VIP's Level 2 Gateway 262. If the downstream signaling is to appear as in-band information to the DET, however, the ATM subnetwork will supply the downstream cells to the same output port as for the broadband information, i.e. a port to one of the APDs 174 in the serving LVAN 112. The access subnetwork controller 240 will instruct the APD 174 to map both the broadband and the downstream signaling cells into MPEG packets having specified PID values and to output those packets on a specified one of the rails carrying data streams to one of the QAM modulators 176 for transmission together in an assigned downstream RF channel. The input port to the ATM subnetwork for the upstream signaling would be a port connected to the ATM router 196 in the same LVAN 112. The ATM subnetwork would output the upstream cells to an input port of the Level 2 Gateway 162.

Alternatively, the downstream signaling from the VIP's Level 2 Gateway to the subscriber's DET 218 can consist of user data included in the MPEG-2 stream from the server. In this later case, the ATM subnetwork would only establish a narrowband upstream channel to the Level 2 Gateway for upstream signaling from the DET. In either case, the Level 1 Gateway 108 requests the signaling connection, and the PVC controller 248 instructs the ATM switch(es) to set up the portion of signaling link through the ATM subnetwork.

In normal operation, the Level 1 gateway 108 requests establishment or tear down of specific connections through the ATM subnetwork 106. When the ATM switch(es) perform the requested connection function, reports thereof are provided to the PVC controller 248. The PVC controller in turn provides confirmation to the Level 1 Gateway 108. If necessary resources are not available when the Level 1 Gateway 108 requests a connection, the PVC controller 248 will so inform the Level 1 Gateway.

The Level 1 Gateway 108 can request audit or status information from the PVC controller 248. In response, the PVC controller 248 can supply the Level 1 Gateway 108 with audit or status information relating to the condition of ports and connections with the ATM subnetwork 106. The PVC controller 248 will also provide the Level 1 Gateway 108 alarm or failure reports relating to specification connections through the ATM subnetwork 106.

The PVC controller 248 may also provide usage information to the Level 1 Gateway 108. In particular, the ATM switch(es) and PVC controller 248 can count cells for each session connection through the ATM subnetwork and provide the cell count to the Level 1 Gateway as usage data. The cell count reflects the amount of data actually transmitted through the ATM subnetwork. For particularly bursty services, the cell count may actually provide a more accurate representation of usage than the combination of bandwidth and time duration.

As noted above, the Level 1 Gateway 108 also communicates with the access subnetwork controller 240. The Level 1 Gateway 108 transmits requests to establish and tear down connections to the access subnetwork controller 240. Such requests may relate to IMTV connections, to making certain broadcast services available to a particular VIU, defining pay-per-view events and activating pay-per-view events for VIUs who have purchased particular events, etc. In general, connection and tear down requests identify the DET and bandwidth or throughput in both directions. In the presently preferred embodiment, the DET identifier will take the form of an E.164 address.

Requests relating to broadcast services will include a channel identifier and may under some circumstances include VPI/VCI information. Specifically, the Level 1 Gateway 108 will request that the access subnetwork controller 'establish a connection' to the DET 218 for each broadcast channel to which the VIU has subscribed. These 'connections' for broadcast channels make those channels available by enabling the DET to process each channel. Once the access subnetwork establishes such a broadcast availability connection, the VIU can view each channel simply by selecting that channel through the DET 218, unless and until the Level 1 Gateway 108 instructs the access subnetwork controller 240 to tear down the particular broadcast connection.

The Level 1 Gateway 108 issues requests relating to broadcast services to the access subnetwork controller 240 only infrequently, i.e. when a VIU subscribes to a new broadcast service or when removing a broadcast service from availability to a particular VIU (e.g. a VIU that no longer subscribes to broadcast services of a specified VIP or that has not based bills for VDT services or services of the specified broadcast VIP).

Requests relating to IMTV service will include a connection identifier, VIU identifier and bandwidth. Unlike requests relating to broadcast services, the Level 1 Gateway 108 frequently issues requests relating to IMTV services to the access subnetwork controller 240, i.e. whenever a VIU requests an IMTV session.

Requests defining a broadcast pay-per-view event include an event identifier, start time, end time, date, channel, preview duration, and teaser duration. Connection requests relating to activation of a purchased event for a particular VIU identify the DET and the event.

When the access subnetwork controller 240 receives a connection establishment request from the Level 1 Gateway 108, the access subnetwork 240 transmits certain information back to that Gateway that other elements of the network need in order to set-up the end to end connection. For a broadcast channel to which the VIU subscribes, the DET needs a connection block descriptor for that channel. The connection block descriptor includes the network logical channel number and the RF channel carrying the particular program. For digital services, the connection block descriptor will also include one or more PID values (preferably the PID value for the respective program map) that the DET needs in order to capture and begin processing MPEG-2 packets relating to the particular program.

In the preferred embodiment, the access subnetwork controller administers the connection block descriptors and the VPI/VCI values available on each port of the access subnetwork.

When the access subnetwork controller 240 receives a connection establishment request for an IMTV session, the access subnetwork controller first identifies an APD 174 having available bandwidth capable of supporting the requested session. The access subnetwork controller 240 provides the port ID and an available one of the VPI/VCI values assigned to that APD 174 to the Level 1 Gateway 108. As noted above, in the preferred embodiment, the Level 1 Gateway 108 forwards the port identifier for the APD 174 and the assigned VPI/VCI value to the PVC controller 248.

The APD 174 is preprogrammed by the access subnetwork controller 240 to map ATM cells having the VPI/VCI value into MPEG packets having particular PID values and supply those packets through a specific one of its output rails for RF transmission on a particular channel. The access subnetwork controller 240 therefore knows the connection block descriptor corresponding to the bandwidth it assigned to the requested IMTV session. The access subnetwork controller 240 supplies that connection block descriptor back to the Level 1 Gateway 108, and that Gateway forwards the connection block descriptor to the DET 218 to permit tuning to the correct RF channel and capturing and processing of MPEG packets from that RF channel.

The Level 1 Gateway 108 could store the connection block descriptors for all broadcast services. However, in the preferred implementation, the access subnetwork controller 240 administers the connection block descriptors for broadcast services in a manner similar to that done for IMTV connection, albeit on a more static basis than for IMTV. When the access subnetwork controller 240 receives a connection establishment request for a broadcast channel from the Level 1 Gateway 108, the access subnetwork 240 knows the applicable connection block descriptor for that channel. The access subnetwork 240 transmits that connection block descriptor back to the Level 1 Gateway 108. The Level 1 Gateway 108 in turn forwards the connection block descriptor to the DET 218.

In response to a connection request (establishment or tear down), the access subnetwork controller 240 provides appropriate instructions to the elements of the access subnetwork needed to perform the connection function. For example, for an IMTV session, the access subnetwork may instruct the APD 174 to map cells having a specified VPI/VCI into MPEG packets having specified PID values and output those packets on a specified one of its five output rails, to thereby place the packets in a particular RF channel.

For a pay-per-view event, the access subnetwork controller provides the event definition information to the ACC 4000 242. The ACC 4000 in turn instructs the APD 134 to encrypt the program using a specific key at a specific start time. The access subnetwork controller identifies the DETs 218 of VIUs who purchase the event, and the ACC 4000 242 provides the decryption key needed to decode the program to the NIMs 216 associated with those DETs 218, at the appropriate times. At the end of an event, the ACC 4000 instructs the APD 134 to change the encryption key, thereby terminating decryption by those DETs having a now obsolete decryption key.

In normal operation, the Level 1 Gateway 108 requests establishment or tear down of specific IMTV connections through the access subnetwork. When the elements of the access subnetwork perform the requested connection function, reports thereof are provided to the access subnetwork controller 240. The access subnetwork controller 240 in turn provides confirmation to the Level 1 Gateway 108. The level 1 Gateway 108 will time the period for confirmations, and if an expected confirmation is not received in the expected time period, the Level 1 Gateway recognizes a fault in the access subnetwork. If necessary resources are not available when the Level 1 Gateway 108 requests a connection, the access subnetwork controller 240 will so inform the Level 1 Gateway.

The Level 1 Gateway 108 can request audit or status information from the access subnetwork controller 240. In response, the access subnetwork controller 240 can supply the Level 1 Gateway 108 with audit or status information relating to the condition of various channels and sessions through the access subnetwork. The access subnetwork controller 248 will also provide the Level 1 Gateway 108 will alarm or failure reports relating to specification connections through the access subnetwork.

At the CPE, the Level 1 Gateway 108 communicates with the main portion of the DET 218, and through that portion of the DET, with the actual VIU operating the DET. Logically speaking, the NIM 216 may be considered a part of the access subnetwork. The ACC 4000 242 communicates with the NIM 216, whereas the Level 1 Gateway 108 and Level 2 Gateways 262 communicate with the main portion of the DET 218.

Through its communications with the main portion of the DET, the Level 1 Gateway 108 sends menus to the VIU. The Level 1 Gateway 108 also receives selections and related inputs from the VIU through this communication.

The communications from the Level 1 Gateway 108 to the main portion of the DET carry a variety of information. For example, these communications include downloading of necessary connection block descriptors to the DET to permit reception of broadcast channels and dynamically assigned channels carrying IMTV downstream transmissions from the VIP. The Level 1 Gateway 108 may also download applications programming and/or operations system software into the main portion of the DET 218. The above incorporated copending application Ser. No. 08/380,755, filed Jan. 31, 1995 (attorney docket No. 680-083C) provides a more detailed description of the software download capabilities of the DET. If certain services require the DET to recognize some form of network address, the Level 1 Gateway 108 would also transmit that address to the main portion of the DET for storage.

The subscriber input information transmitted upstream from the DET 218 to the Level 1 Gateway 108 can relate to pay-per-view event purchases, selection of a broadcast VIP and selection of an IMTV VIP. The input information may also indicate that the VIU has requested a session with an internal application running on the Level 1 Gateway 108, for example to establish or modify PIN routines, customize menus, access account information, modify broadcast subscriptions, etc. If the OSS 109 provides a VIU user interface, the information from the input from the VIU might also request connection to that interface through the video dial tone network.

If the subscriber request to the Level 1 Gateway 108 identifies a broadcast service VIP, the Level 1 Gateway 108 transmits a connection block descriptor of one of that VIP's channels back to the DET 218. This connection block descriptor corresponds to a digital broadcast channel on which the selected VIP repeatedly broadcasts customized software for downloading into the DET. Typically, the software captured by the DET 218 controls navigation through the particular VIP's broadcast services.

The Level 1 Gateway 108 can provide its menus in two or more different languages. Through an interactive session between the subscriber's DET 218 and the Level 1 Gateway 108, the user can establish a preference for one language. Subsequently, the Level 1 Gateway 108 transmits menus to that DET 218 in the preferred language. The user also has the option to override the preference and obtain menus in any of the other languages available during each interaction with the Level 1 Gateway.

As noted above, the Level 1 Gateway 108 also communicates with Level 2 Gateways 262 operated by IMTV VIPs. For example, as part of its processing of a VIU's request for an IMTV session connection to a VIP, the Level 1 Gateway 108 transmits a connection request to the chosen VIP's Level 2 Gateway 262. This request includes the identity of the calling VIU and provides the VIP with the opportunity to accept or reject the call from the particular VIU. The VIP may reject the call for a number of reasons, e.g. because all of its server equipment is busy, because the particular VIU is not a subscriber to this VIP's services, the particular VIU has not paid his bills, etc. In the preferred embodiment, the Level 1 Gateway 108 transmits a connection request to the chosen VIP's Level 2 Gateway 262 only for IMTV type services. However, the Level 1 Gateway 108 could transmit such a request to the Level 2 Gateway 262 for pay-per-view services and broadcast services, if the particular VIP chose to offer their services in a manner requiring the VIP's acceptance or authorization before providing a requested service.

The Level 1 Gateway 108 provides information relating to network conditions to the Level 2 Gateway 262, for specific connections to that VIP's equipment. For example, when a VIP accepts a call and the Level 1 Gateway 108 instructs the various network elements to set up a session, the Level 1 Gateway 108 informs the Level 2 Gateway 262 of completion of the call set-up procedure, so that the Level 2 Gateway 262 can instruct the associated server 264 to commence transmission to the subscriber. The Level 1 Gateway 108 will also notify the Level 2 Gateway 262 of failures in specific connections to that VIP's equipment.

The Level 2 Gateway 262 also provides certain information back to the Level 1 Gateway 108. If the VIP accepts a call from a particular VIU, the Level 2 Gateway 262 transmits a server port identifier and preferably a VPI/VCI, that will service the call. The Level 2 Gateway 262 will also specify the bandwidth or throughput requirement for the particular IMTV service.

As noted above, broadcast VIPs offering pay-per-view service will provide information about events and purchasers to the network. If the VIP has a direct connection to the Level 1 Gateway 108, e.g. from a Level 2 Gateway 262, the VIP would supply that information directly to the Level 1 Gateway without going through the OSS.

The Level 1 Gateway may also provide the VIP with menus and accept selection inputs from the VIP, if the network is administered to allow VIPs to initiate calls. Such VIP initiated calls at least would go to the OSS 109. The preferred embodiment is adapted to provide connections between a VIP and a VIU only in response to an initial request by the VIU. However, if customer demand warrants, the Level 1 Gateway could allow VIPs to initiate calls to VIUs from the Level 2 Gateways 262. In that case, the Level 1 Gateway might also signal the DET 218 and ask the VIU if the VIU will accept the call from the calling VIP.

Process Flows in the Preferred Network

The OSS is responsible for service creation, service activation, and service control in the video dial tone network.

1. Network Creation

Figure 8:
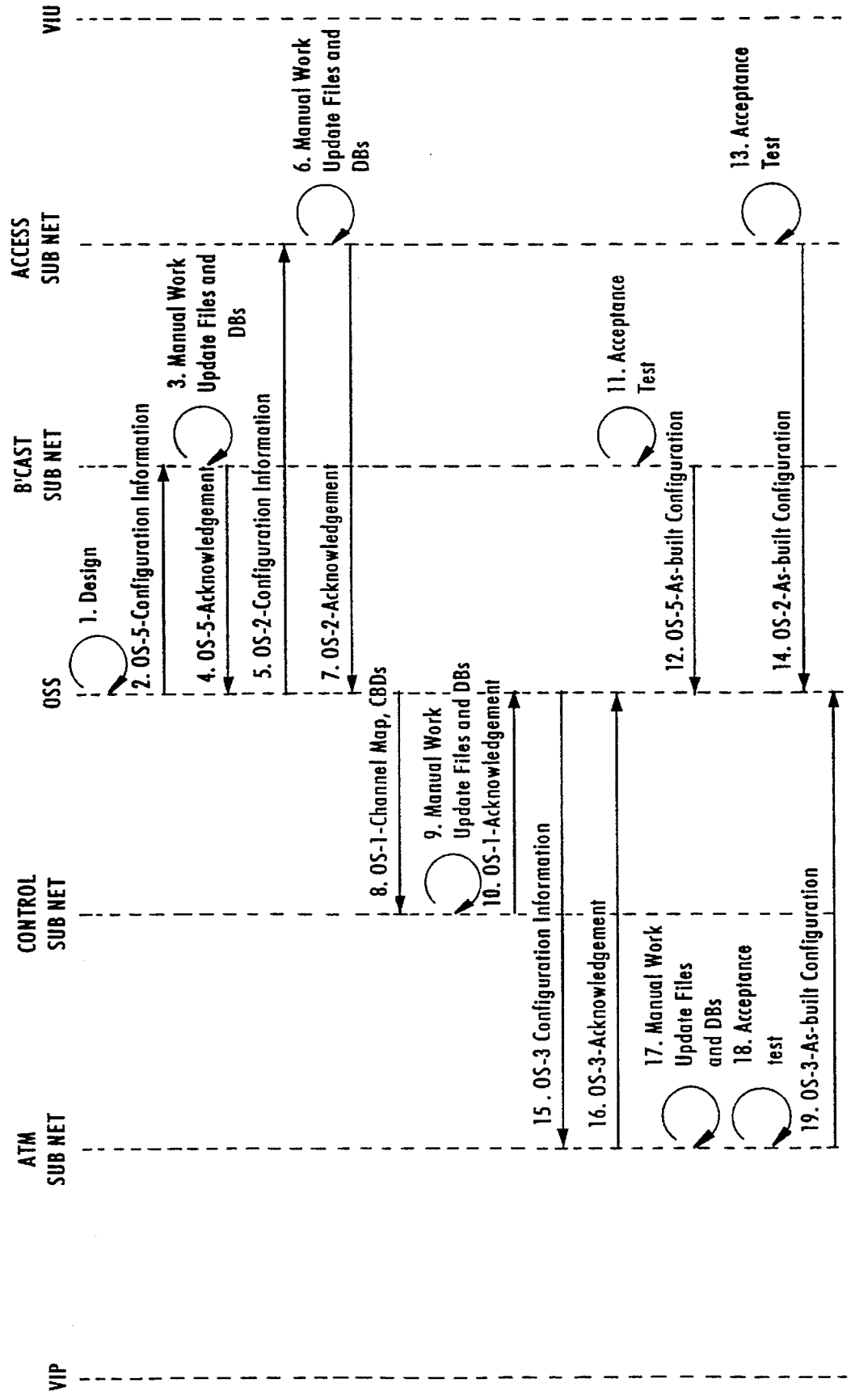
FIG. 8 illustrates, in simplified form, the flow of messages between various components of the network of FIGS. 3–7 during provisioning of broadcast channels.

As described above with respect to FIG. 2, the OSS provisions network resources in order to establish a database of assignable inventory for use in the network. FIG. 8 discloses a simplified flow of messages between various components of the enhanced video dial tone network during service creation, also referred to as network creation.

During the process of network creation, all broadcast subnetwork elements and all access subnetwork elements are preprovisioned and configured for digital broadcast. As part of the network creation process, the OSS performs a multitude of functions, including creating assignable digital channels, assignable VPI/VCIs within a serving area, and downloading the information into the access subnetwork controller, as well as broadcast controllers used to manage the SONET multiplexers coupled to the broadcast ring 102. RF spectrum bandwidth provisioning and configuration is also established at network creation. In addition, the OSS allocates the ATM backbone virtual path identifiers (VPI) and establishes dedicated virtual paths for the C-2, C-5, C-6, OS-1, OS-2, OS-3 and OS-5 interfaces shown in FIG. 1. Channel assignments are also allocated for the ATM edge multiplexer 120 shown in FIG. 3. In addition, each of the ATM packet demultiplexers 134, 174 are separately assigned either digital broadcast or IMTV processing. Further, upon completion of the network creation process, the OSS will store in an internal database the assignable logical and physical inventory, including VPI/VCI assignable inventory for the ATM edge multiplexer, and the ATM packet demultiplexers of the network (see FIG. 12). In addition, the OSS defines during network creation the VPI for upstream and downstream default signaling in the access subnetwork and the VPI for upstream and downstream signaling in the ATM subnetwork.

As shown in FIG. 8, step 1 of network creation involves designing in the OSS a network model, initiating work instructions for capacity activation and capacity creation, including establishing a living unit database (LUDB), and establishing or updating network configuration databases. The OSS then assigns identity information to the PVC controller, the access subnetwork controller, and the Level 1 Gateway, after which the OSS allocates VPI/VCI values from the Level 1 Gateway to the PVC controller and the access subnetwork controller in order to establish the signaling/data network. Thus, the OSS identifies all the network elements, and establishes VPI/VCI assignments for each of the network elements to determine the end point of virtual path connections for signaling and data traffic. The OSS also will have completed VPI/VCI assignment information establishing addresses at the network POI at the broadcast subnetwork.

Step 2 of FIG. 8 shows that configuration information is passed from the OSS to the broadcast subnetwork, including VPI/VCI translation tables for the ATM cell multiplexer 120, as well as configuration information for the encoder 118 adapted to receive VIP analog broadcast signals.

In step 3 of FIG. 8, the broadcast subnetwork is established by performing all physical work, including connecting the broadcast ring 102, terminating fiber connections, and connecting low speed termination ports from the SONET multiplexers coupled to the broadcast ring to their respective devices. During step 4 of FIG. 8, an acknowledgement is sent back to the OSS via the OS-5 signal interface path that all work in the broadcast subnetwork is completed.

In step 5 of FIG. 8, the OSS transmits, via the OS-2 signal interface, configuration information to the access subnetwork related to tuning the modulators shown in FIGS. 4 and 5, and assigns the coaxial inputs for the RF combiner/splitter network.

Step 6 of FIG. 8 involves adjusting signal processors and modulators in accordance with the supply configuration information, designing and building fiber feeds, fiber nodes, power nodes and RF distribution plants up to and including the taps 210 shown in FIG. 6. Upon completion of the office equipment and facilities in the access subnetwork, the access subnetwork controller updates its inventory files, and generates and stores a set of connection block descriptors. In step 7 of FIG. 8, the access subnetwork controller sends an acknowledgement to the OSS via the OS-2 interface, along with the developed assignable inventory and connection block descriptors.

In step 8 of FIG. 8, the OSS supplies to the Level 1 Gateway the channel map information, and the connection block descriptors. The Level 1 Gateway then updates its internal database, as shown in step 9 of FIG. 8, and upon completion sends an acknowledgement to the OSS that the Level 1 Gateway is updated with the newly created information (step 10).

The broadcast subnetwork and access subnetwork then perform acceptance and quality testing in steps 11 and 13, respectively, and upon completion of the testing provide "as-built" subnetwork configuration data to the OSS in steps 12 and 14, respectively. The as-built configuration information, which is added to the assignable inventory database, is supplied to the ATM subnetwork via the OS-3 interface, as equipment ready for transmission and reception of ATM cell streams on the ATM backbone network (step 15). The PVC controller in response establishes virtual circuits for the assignable inventory, and sends an acknowledgement message in step 16 back to the OSS. The ATM subnetwork in step 17 generates any work orders necessary for physical connections needed to carry the newly-established virtual circuits in the PVC controller, and updates its internal databases, including the PVC controller, identifying virtual circuits and hardware connections. The ATM subnetwork in step 18 performs its own acceptance and quality testing, and upon completion of the testing, sends an as-built configuration message in step 19 to the OSS via the OS-3 interface, at which point the as-built configuration data from the ATM subnetwork is added by the OSS to the assignable inventory.

Thus, upon completion of the steps in FIG. 8, the OSS has a database including assignable inventory for each of the network elements, and has established transport paths for signaling and data communications throughout the network. At this point, the network is ready to activate video information providers and video information users on the network.

2. Service Activation

As discussed above with respect to FIG. 2, the OSS performs service activation functions for subscribers on the network, including VIPs and VIUs. Service activation includes the functions of: 1) negotiating description, availability, and price of services resulting in a customer service contract/request in establishment of a customer account profile (e.g., the VIP profile); 2) selecting a path based on the network configuration and assignable inventory to satisfy the service requirements in the service contract/request; 3) formulating and transmitting the instructions that network elements and word groups must perform to satisfy the service requirements; and 4) completing and verifying the work instructions, resulting in service to the customer, as well as updating the necessary databases, such as the customer account profile.

According to the preferred embodiment, the functions associated with service activation for VIP service requests will include activation of a VIPs signalling and control network, including the OS-4 and C-1 interface paths shown in FIG. 1. A VIP offering broadcast services only may have only an OS-4 interface. However, any VIP offering IMTV services, along or in combination with broadcast services, will have both the OS-4 interface and the C-1 interface. The VIP related service activation functions also include: setting up signalling and control paths for pay per view events, setting IMTV ports for use by the VIP, establishing transport facilities from the head end to the POI, and the VPI/VCI assignments for access to the Level 1 Gateway, the ATM packet demultiplexer 134 and 174 shown in FIGS. 5 and 6, respectively, the access subnetwork controller 240 shown in FIG. 7, and the Level 2 Gateway.

The OSS performs the following functions associated with service activation for VIU service requests: establishing and verifying the connection of VDT service, NIM/DET initialization and activation, and activation of digital broadcast services. For interactive services, the OSS preprovisions a set of inventory for: dynamic assignments of signaling, control and content, interaction and control of Level 2 Gateway access, and collection of bandwidth and usage data. As discussed earlier, most of the functions associated with IMTV are managed dynamically by the Level 1 Gateway.

During the VIP service activation process, the OSS will typically receive an activation request from a VIP, either electronically or manually, identifying the nature of the service desired, as well as the desired service area. In response, the OSS will access its living unit data base (LUDB) and provide the VIP with LUDB homes passed information, architecture type and build areas, to give the VIP information on the potential VIU subscribers within a desired service area, as well as the type of services that the VIP may provide in accordance with the network architecture functionality. Upon receiving a customer request from the VIP, the OSS will typically provision up to 6 MB/s channels based upon the assignable inventory. The OSS will map and assign new requests for digital broadcast channels across the bandwidth available (now assigned to the VIP) into the APD 134 in FIG. 4, as well as the VPI/VCI for that APD. The OSS will also assign VPI/VCI to the ATM edge multiplexer 120, and will provide the input/output ports for the incoming and outgoing data streams, respectively. The OSS will also assign facility paths from the VIP to the ATM edge multiplexer, which in this instance is the network POI.

As noted before, the VIP is considered an inter-exchange carrier, such that the VIP may provide its own link to the network POI, a contract with the network to provide services to transport the data from the VIP head end to the network POI, or may use a third party to transport the data to the network POI. The OSS also generates any work orders necessary for any connections and tracks the work orders until completion. The OSS will also assign logical channel IDs for digital broadcast channels. The OSS also creates a VIP profile specific to the new VIP subscriber, and stores the VIP profile in a VIP database that may be remotely accessible by the VIP after completion of the activation process. After completing all service and assurance tests on the newly-assigned equipment, the OSS sends notification to the VIP, as well as its internal billing systems, and passes to the VIP LUDB information regarding the areas the VIP will be serving. If the VIP desires an OS-4 interface, a work order is issued to install a mechanized interface between the VIP and the OSS to enable the VIP to remotely provision its VIP profile, establish pay-per-view events, and activate VIUs. The OSS also provides a portion of the VIP profile to the Level 1 Gateway.

The VIP profile contains all information related to the VIP and the services provided by the VIP. During the creation of a VIP profile, the VIP provides to the OSS information such as: name, address, head end location, transport type to POI, including signaling and video content, number of channels, bandwidth of each channel, channel type (e.g., pay per view, impulse pay per view (IPPV), stagger cast, broadcast, IMTV, application download carousel), pay per view request preference (i.e., via Level 2 Gateway, or application download), serving area, activation date, billing information, VIP representative name and related information, hours of operation, application download channel mapping information, IMTV ports requested, MPEG-2 program IDs desired, and upstream signalling rate for IMTV sessions. Upon receiving the above profile information, the OSS processes the information and returns to the VIP: a VIP ID, a VIP account number, an assigned logical channel ID, an assigned VPI/VCI, assigned IMTV ports, and any completion information. After transport facilities have been activated, the OSS also provides circuit ID, mileage, rate schedules, number of homes passed, and number of homes served.

If a VIP wishes to modify the VIP profile, for example via the OS-4 interface, the VIP provides: VIP ID, VIP account number, requested due date, add/delete transport facilities, the serving area affected, the number of IMTV ports, and the details of the change to profile. The details of changes to profile may include delete/add channels, change bandwidth requirements between the available 1.5, 3.0 and 6.0 MB/s, change the program map, change channel type, or change MPEG-2 program IDs. In response, the OSS provides the additional transport requirements, logical channel assignment, VPI/VCI assignments, rate elements, milage and completion information. The OSS also updates the VIP profile stored in the VIP database.

Upon receiving the VIP profile from the OSS, the Level 1 Gateway updates the VIP profile subset and the VIP broadcast listing menu, and the network logical channel map. The Level 1 Gateway requests connection block descriptors from the access subnetwork controller for the digital broadcast channels. The Level 2 Gateway stores the connection block descriptors in the VIP profile subset, and sends an acknowledgement completion of VIP broadcast service activation to the OSS.

FIG. 9A discloses a simplified flow of messages between various components of the enhanced video dial tone network for activating a VIP for digital broadcast channels. The above-described VIP service activation procedure will now be described with respect to FIG. 9A.

As shown in FIG. 9A, step 1 involves the VIP activation request, whereby the VIP calls the network service center to request service. For initial service, the VIP will likely need to place a phone call or submit a written request; however, an established VIP can request additional channels via a transaction across the OS-4 interface. In response to the VIP request, the OSS, or the network service center, identifies the proposed serving area, identifies the architectures of the local loop distribution networks in the serving areas, and negotiates services and features of the architecture with the VIP. The OSS then collects the VIP information in preparation for establishing a VIP profile, and the OSS writes up a service order to request service and capacity on the network. While the above-identified functions in step 1 may be performed by the OSS, it is also possible that a separate VIP service center (VIPSC) may be established to handle customer support issues for the VIPs.

Step 2 of FIG. 9A relates to the provisioning and assignment of the VIP to the network POI. The OSS provisions and assigns transport from the VIP head end to the POI, if the VIP has requested transport services to the network POI. The OSS configures broadcast facilities from the POI to the access subnetwork based upon the VIP request for channel capacity and bandwidth capacity. The OSS also assigns a logical channel ID representing the VIPs channel assignments for the serving area. The OSS also provisions and assigns the VPI and VCI values for each six megabits per second channel for the ATM packet demultiplexer, and may also assign real time MPEG-2 PID values. If the VIP desires only broadcast services, provisioning is only performed in the APD 134 in the VNH 104 shown in FIG. 4; however, if the VIP also desires interactive services, the APD 174 in the LVAN 112 shown in FIG. 5 is also provisioned for IMTV services. Finally, the OSS provisions and assigns the ATM edge multiplexer 120 at the network POI.

If the network does not provide transport for the VIP to the POI, the OSS in step 3 of FIG. 9A requests the transport termination location at the network POI.

In step 4 of FIG. 9A, the OSS sends a portion of the VIP profile established in step 2 to the Level 1 Gateway, including the following information: transaction ID, transaction type (new VIP, disconnect VIP, or modified VIP profile), as well as the VIP subprofile. The VIP subprofile includes the VIP ID, name, logical channel number, channel descriptor, channel type, VPI/VCI of the appropriate APD, the digital broadcast preference, bandwidth per channel, and MPEG-2 program number or ID. In response to the message from the OSS, the Level 1 Gateway updates its configuration and VIP profile with the information supplied by the OSS.

In step 6 of FIG. 9A, the Level 1 Gateway sends a message to the access subnetwork controller, and requests connection block descriptors to be provided. The message to the access subnetwork controller includes transaction ID, transaction type, logical channel number, channel descriptor, channel type, VPI/VCI of the appropriate VPD, bandwidth per channel, and MPEG-2 program ID.

In step 7 of FIG. 9A, the access subnetwork controller updates its configuration with the information from step 6. As shown in step 8, the access subnetwork controller returns the connection block descriptors, along with the transaction ID and the status (confirmation) of the request. In response, the Level 1 Gateway in step 9 provides confirmation of the completion of steps 5 and 8 to the OSS, passing the transaction ID and the status.

As shown in step 10 of FIG. 9A, the OSS communicates network configuration information for the broadcast subnetwork. Specifically, the OSS provides transaction ID, transaction type, and data for the ATM edge device 120, including location and address of the ATM edge device, the unit ID and type to identify the physical port in the ATE edge device 120. The OSS also provides bandwidth assignment, input port VPI/VCI, and output port VPI/VCI. If the VIP has requested analog channels, the OSS also sends to the broadcast subnetwork configuration data for the digital encoder 118, namely the input port ID for the incoming analog signal from the VIP.

As shown in step 11 of FIG. 9A, the broadcast subnetwork provides a confirmation signal to the OSS, including transaction ID and status.

The OSS performs all necessary performance tests of the activated digital broadcast channel in step 12. In step 13, the OSS provides the following information to the VIP: VIP ID, VIP account number, logical channel ID assignments, VPI/VCI's assignments for the VIP real time encoders, number of homes passed, and living unit addresses. If the network provides transport facilities to the network POI, the OSS also provides transport type, activation date, circuit ID, milage and rate element.

Figure 9B:
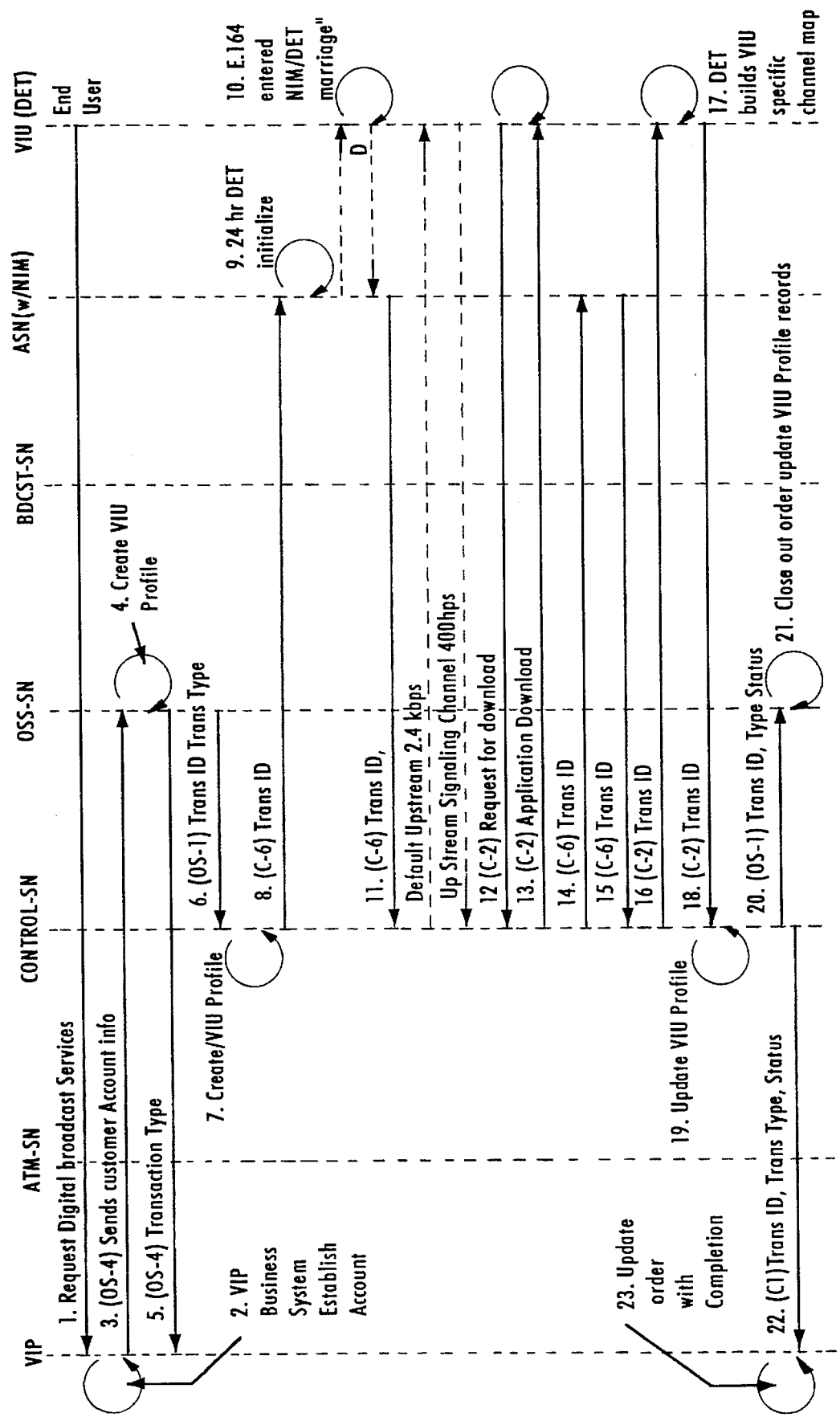

FIG. 9B depicts a simplified flow of messages between various components at the enhanced video dial tone network during VIU service activation. Typically, a VIU will have access to a set of analog channels and digital channels. In order to receive the digital channel services, the VIU will require a DET to access these services which is typically sold by a VIP to the VIU. Generally, the VIUs will be able to receive basic and premium CATV programming (e.g., The Discovery Channel, The Learning Channel, and HBO) through subscription to the VIP of their choice. VIUs will be able to access pay per view events from VIPs as per the VIPs event schedules and definition. The VIP broadcasts the event per the schedule they define in the VDT network using the channel and specified bandwidth that was purchased.

Referring to FIG. 9B, step 1 shows that a VIU will request activation of digital broadcast services by calling a VIP or a VIP agent. In step 2, the VIP negotiates the service request to establish details of the subscriber's account, including the steps of: verifying the customer VDT status using the LUDB information previously supplied by the OSS; determining the drop status, e.g., whether the customer's living unit has an existing coax drop and NID 214 as shown in FIG. 6; and determining if the customer requires a DET or additional DETs. In addition, the VIP negotiates with the VIU for authorization to use or replace existing inside wire for the customer premises. The VIP will also negotiate installation due dates, and preauthorize VIU for the selected services, for example pay per view purchases.

The VIP in step 3 of FIG. 9B creates a service request to the network via the OS-4 interface signal path for installation at the customer premises, if required, plus a request for assignment of a network address for a new DET or activate an existing DET with a predetermined network address. In addition, the VIP identifies the logical channels to be activated as part of the digital broadcast channel activation request.

In response to the activation request of the OS-4 interface, the OSS in step 4 performs the following functions: creates a VIU profile in the VIU database, checks the living unit data base to determine if the request service address is in a currently-serviced area, checks the status of the drop cable to the living unit, determines the VPI/VCI assignments of the digital broadcast channels requested, creates a transaction ID, transaction type, and transaction status, and assigns the Level 1 Gateway, access subnetwork controller, and fiber node that will serve the VIU. In checking the status of the drop, if a request for a drop is required, the OSS will assign a terminal location, tap and port assignment; if there are no ports available, the OSS will issue a work order to install another tap on the cable 208.

The OSS then in step 5 of FIG. 9B sends to the VIP the network address of each DET ordered, as well as the transaction ID, transaction type and transaction status for the service request. In step 6 of FIG. 9B, the OSS sends the request to the Level 1 Gateway for a new VIU subscriber, along with portions of the VIU profile stored in the OSS needed by the Level 1 Gateway. Specifically, the OSS supplies to the Level 1 Gateway a transaction ID, transaction type, and the following portions of the VIU profile ("VIU subprofile"): VIU ID (including the network address for each DET), types of channels subscribed to (analog broadcast, digital broadcast, PPV, staggercast, IMTV, download carousel), VPI/VCI's of the channels subscribed to for each DET, the identification of the access subnetwork controller servicing the VIU, the fiber node ID for the node serving the VIU, the NIM type, the due date, and any purchased preauthorization information for pay per view events.

In step 7 of FIG. 9B, the Level 1 Gateway creates the VIU profile and holds the order to activate the NIM until the due date. On the due date, as shown in step 8 of FIG. 9B, the Level I Gateway sends the request to the access subnetwork controller to add a new network address. In response, the access subnetwork controller in step 9 will poll the fiber node for the new network address on the default upstream signaling channel.

At the customer premises, a DET installer at step 10 of FIG. 9B will begin DET initialization by entering the network address identified on the service order. At this point, the DET will output the network address onto the network default upstream signalling channel. As shown in step 11 of FIG. 9B, when the access subnetwork controller receives the network address response from the DET, the access subnetwork controller sends the assigned default signaling upstream and downstream VPI/VCI identifiers to the Level 1 Gateway. Thus, as part of the installation procedure, the installer in step 12 of FIG. 9B will issue a DET request to the Level 1 Gateway for the resident application download. In response to the request, the Level 1 Gateway in step 13 of FIG. 9B will download the DET resident application.

The Level 1 Gateway in step 14 requests from the access subnetwork controller the connection block descriptors for the channels subscribed to using the VPI/VCI's for the digital broadcast channels. In response, the access subnetwork controller in step 15 returns the connection block descriptors for the requested channels. The Level 1 Gateway then in step 16 communicates the connection block descriptors for the digital channels subscribed to down to the DET. After the downloading from the Level 1 Gateway, the DET in step 17 builds the channel map. Upon completing the channel map in step 17, the DET in step 18 returns an acknowledgement to the Level 1 Gateway. Upon receiving the acknowledgement from the DET of the completion of the channel map, the Level 1 Gateway updates the VIU profile in step 19, and sends the completed status to the OSS in step 20.

The OSS in step 21 completes the service order in all the databases, including the VIP database, the LUDB database, the VIU database, and the DET database. Specifically, the VIP database is updated with the VIU subscriber profile, the LUDB database is updated with the status of the local loop and customer premises equipment at the VIU site, the VIU database is updated with the updated VIU profile, and the DET database is updated with the serial number of the DETs installed, the DET make and model by the network address, as well as any software revision numbers. That information is also passed on for billing and usage statistics management.

As shown in step 22 of FIG. 9B, the OSS sends the transaction ID, transaction type and completed status to the VIP. In response thereto, the VIP in step 23 updates its own records indicating completion of the service order.

If a VIP wishes to add or delete digital broadcast services, for example, new digital channels for new VIP services or to modify a VIU's subscription, the VIP sends a request to the OSS via the OS-4 interface. In response, the OSS determines and verifies the network address against the VIU profile, creates and tracks transaction IDs, and sends the request to the Level 1 Gateway to modify the channel subscription based on channel assignment or VPI/VCI assignments. The OSS will then update the VIU profile.

Figure 10B:
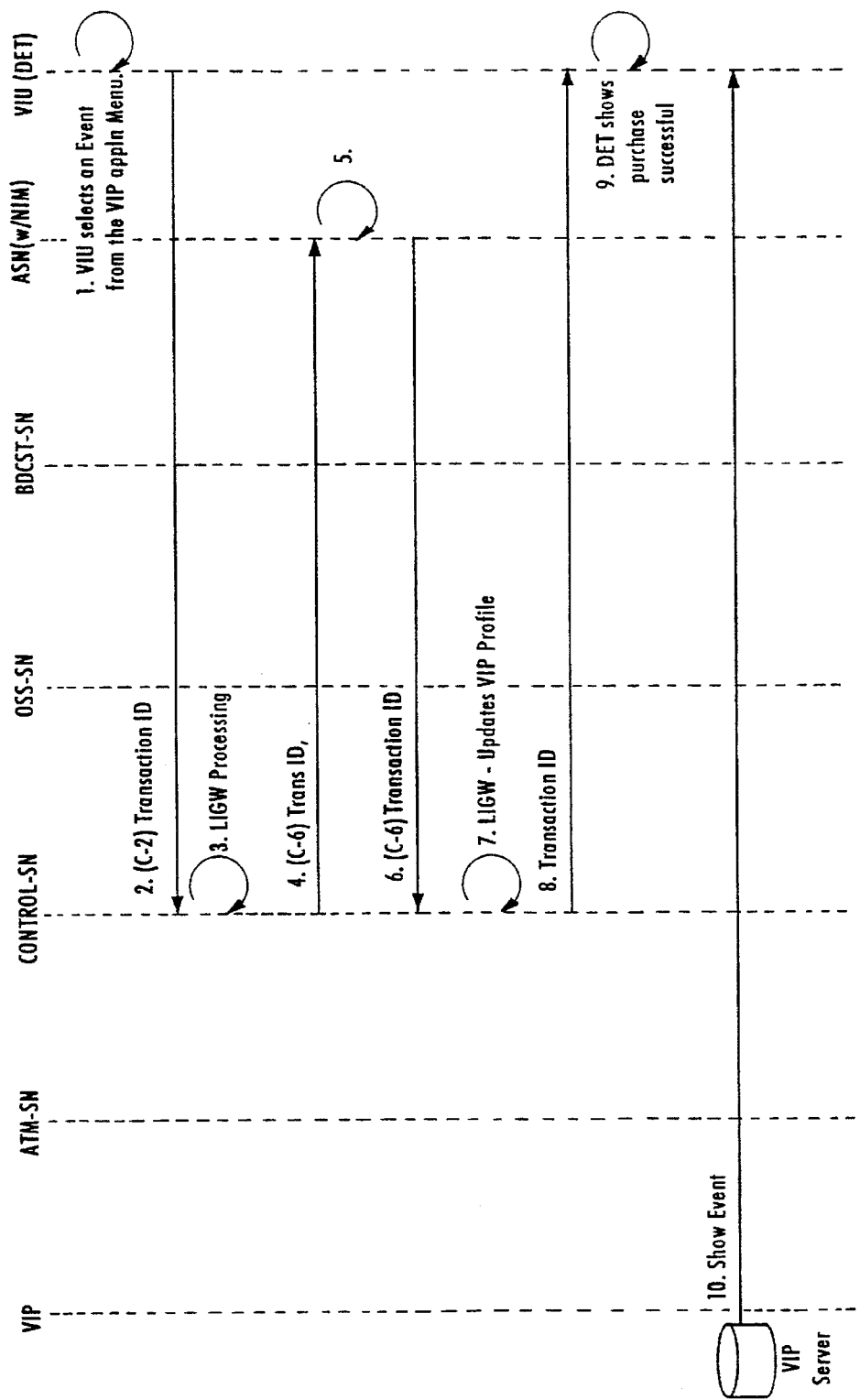

FIGS. 10A and 10B show a simplified flow diagram of a purchase of a pay per view event both as a service activation function and as a service control function (on line purchase). The term "pay per view" (PPV) refers to a special event promoted by a VIP customer. As described in detail below, the VIP loads its event schedule and definitions via the OS-4 interface. The VIP broadcasts the event per the schedule using the channel and specified bandwidth that was purchased. An additional service, referred to as enhanced pay per view (EPPV) or "staggercast" comprises a one-way broadcast video channel with functionality similar to video on demand, whereby the service provides a broadcast of a particular program on a regular interval basis, such as every fifteen minutes, over multiple channels rather than on a scheduled event basis like pay per view.

As shown in step 1 of FIG. 10A, a VIU will typically telephone a VIP to request subscription to the pay per view service, for example in response to an advertisement. The VIU will typically give the VIP or VIP agent the event identifier and the network address of the DET. After the VIP processes and records the purchase in its own business system, as shown in step 2, the VIP in step 3 will order purchase information via the OS-4 interface including transaction ID, transaction type, event ID, VIP ID, channel number, group number for enhanced pay per view, VIU identifier and the DET network address.

The OSS in step 4 processes the request from the VIP in a manner similar as described with respect to step 4 of FIG. 9B, namely, verifying the VIU information, adding to the VIU profile the event ID as a purchased event, and updating the event schedule with the VIU identifier and the DET network address. The OSS sends the request to the Level 1 Gateway in step 5 of FIG. 10A, including the transaction ID, transaction type, a time stamp reference, the event ID, and the network address of the DET. As shown in step 6 of FIG. 10A, the Level 1 Gateway begins on-line provisioning by "validating" the VIU against the VIU profile, validating the event ID against the event schedule, validating the time of the event purchase against the "buy window" of the event and the event schedule, and retrieving from the VIU profile the ID for the access subnetwork controller serving the VIU.

In step 7 of FIG. 10A, the Level 1 Gateway requests access control set-up for the event from the access subnetwork controller. The Level 1 Gateway sends the transaction ID, transaction type, event ID identifying the pay per view event, and the network address of the DET. In response, the access subnetwork controller sets up the access control functionality to send the encryption keys to the NIM. Specifically, the access subnetwork controller sends the network address and the QPSK values for the RF default downstream channels to the ACC 4000 242. The ACC 4000 242 in turn outputs the encryption key for the network address. The ATM router serving the ACC 4000 in turn provides a VPI/VCI header which is supplied to the APD serving the VIU. The APD in the local video access node serving the VIU recognizes the VPI/VCI of the incoming ATM cell stream and outputs an MPEG packet having a PID value corresponding to the network address to the QPSK for transmission to the NIM via the VIU downstream default signaling channel. The NIM, which continually monitors the downstream default signaling channel, receives the MPEG stream and identifies the network address, thereby receiving the decryption keys from the ACC 4000. Optionally, the NIM might send an acknowledgement back to the ACC 4000 that the encryption key has been received. In any event, the ACC 4000 sends an acknowledgement to the access subnetwork controller indicating that the decryption key has been sent to the NIM.

Optionally, the access subnetwork controller may download the connection block descriptors for the event to the DET in step 8. Preferably, however, the connection block descriptors will be provided by the VIP on a VIP control channel, or else by the Level 1 Gateway transmitting the connection block descriptors to the DET after step 10 below.

As shown in step 9 of FIG. 10A, the access subnetwork controller sends an acknowledgement to the Level 1 Gateway, including transaction ID and transaction status. The Level 1 Gateway in step 10 updates the VIU profile indicating the event purchased for billing data collection back to the OSS and the VIP (step 11). Upon receiving the acknowledgement, the OSS in step 12 sends an acknowledgement to the VIP via the OS-4 interface that the VIU has been activated.

FIG. 10B shows, in contrast, a pay per view purchase which is considered part of the service control functions performed by the Level 1 Gateway. As shown in FIG. 10B, the Level 1 Gateway has exclusive control during the process of the Level 1 Gateway session between the DET and the Level 1 Gateway. Thus, it is assumed that the DET already has a VIP application resident in the DET in order to perform the on-line purchase. Thus, the VIP application residing in the DET includes the VIP ID, logical channel number and the program ID. The Level 1 Gateway has all the necessary information in the VIU profile to approve the on-line event purchase.

As shown in FIG. 10B, the VIU in step 1 selects an event from the VIP application menu resident in the DET. The DET initiates in step 2 a Level 1 Gateway session via the default upstream signaling channel, providing the transaction ID, the transaction type, the event ID, the DET network address, and the time stamp of the order.

In step 3 of FIG. 10B, the Level 1 Gateway processes the DET request by validating the VIU against the VIU profile, validating the event ID against the event schedule, validating the receipt/time of event purchase against the buy-window of the event in the event schedule, and retrieving from the VIU profile the identifier address of the access subnetwork controller serving the particular VIU. The Level 1 Gateway then in step 4 sends a message to the access subnetwork controller to activate the DET for reception of the pay per view event. In response, the access subnetwork controller in step 5 issues a request to the ACC-4000 to download the decryption keys for the NIM. In addition, the access subnetwork controller will ensure that the VIU does not have access prior to event start, and that at the end of the event the VIU will no longer have access.

The access subnetwork controller then sends a message to the Level 1 Gateway, confirming processing of the VIU. As shown in step 7 of FIG. 10B, the Level 1 Gateway updates its VIP profile with the event purchase for billing data collection back to the VIP. In step 8, the Level 1 Gateway transmits a message via the downstream default signaling channel, identifying the transaction ID, the transaction status, the event ID, indicating that the purchase was successful. Optionally, the downstream message may also include a text display that purchase was successful, as well as the connection block descriptors unless provided by the VIP on a VIP control channel. The DET in step 9 displays a message to the user that the purchase was successful. The message preferably will be generated by a subroutine in the DET native application or by the transaction status sent by the Level 1 Gateway triggers the routine to display the message. As shown in step 10, the DET is then able to receive the event shown by the VIP. If necessary, the DET will first obtain the connection block descriptors from the VIP control channel, then load the connection block descriptors to retrieve the event data from the VIP. Although not shown in FIG. 10B, the Level 1 Gateway will upload the billing and usage statistics to the OSS.

Service Control Event Loading

Figure 11:
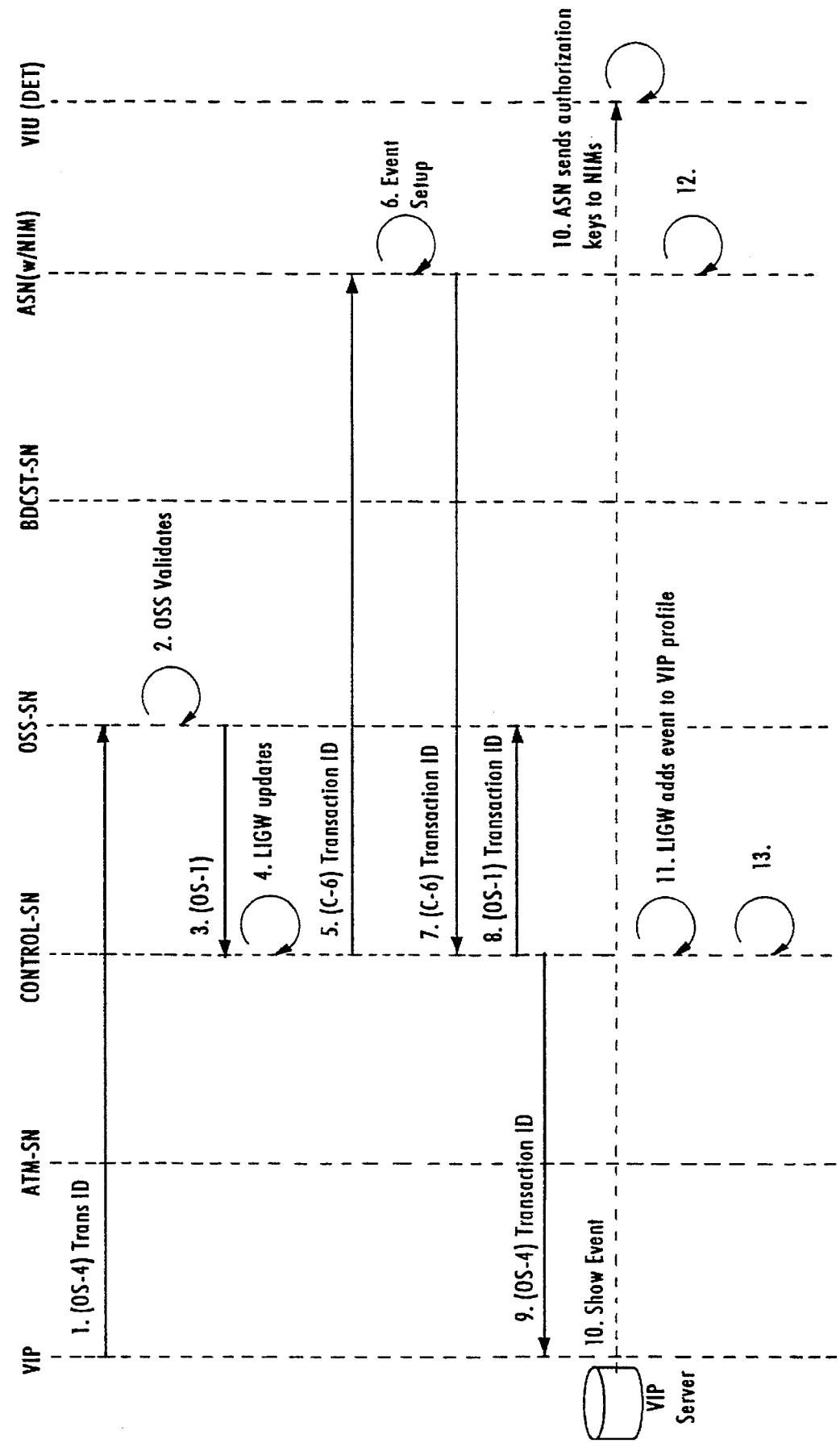
FIG. 11 illustrates, in simplified form, the flow of messages between various components of the network of FIGS. 3–7 during event loading for a video information provider.

FIG. 11 discloses a simplified flow diagram showing the messages transmitted between elements of the network for event loading by the VIP. As described before, a VIP is able to remotely provision its allocated network resources by accessing its VIP profile in the VIP database. Part of that VIP profile includes the VIP event schedule which identifies upcoming events scheduled for broadcast on the network by the VIP. Thus, rather than relying on the OSS to manually provision digital channels or bandwidth assignments, the VIP is able to schedule in advance the necessary requirements.

As shown in FIG. 11, the VIP accesses the event schedule via the OS-4 interface of FIG. 1. The VIP provides the transaction ID, transaction type, VIP ID, event ID (program ID), the logical channel, the start time and duration of the event, any offset for previews, teasers, and cancel windows, a cancel window duration defining how late a VIU may cancel the service, the buy-window duration that identifies how late a VIU may purchase the event, the bandwidth required, and whether the VIU may impulse purchase. In other words, an event typically includes the preview, a teaser, plus the actual event, whereby the preview is defined as a predetermined number of minutes of commercial time, the teaser is a free portion of the desired event, for example, the first fifteen minutes of the event, used to motivate VIUs to purchase the event. Generally, a teaser is scheduled as a separate pay per view event that all DETs can view. Further, the event schedule includes the event start time, duration, buy-window, cancel window, whether the event is impulse purchasable and offsets for EPPV.

In response to the request from the VIP, the OSS in step 2 validates against the VIP profile the VIP ID, the VIP logical channel and verifies that the bandwidth request matches the bandwidth provision upon service activation. After a verification of the order, the OSS passes the information received from the VIP to the Level 1 Gateway in step 3. In response, the Level 1 Gateway updates its VIP event schedule database. The Level 1 Gateway in step 5 then sends the event data to the access subnetwork controller to set up access control. In response, the access subnetwork controller in step 6 sets up the event, and sends the information to the set-top box controller, for example the ACC 4000D or the VAM to set up the event. Specifically, the access subnetwork controller accepts and stores the event schedule information from the Level 1 Gateway, and sets up reserved bandwidth for use at the start of the event. In addition, the access subnetwork manages authorizations and access control to restrict viewing of teaser/preview to users that are authorized for the channel. The access subnetwork controller also manages authorizations and access control to restrict viewing of the event to users that have purchased the event. The access subnetwork controller then sends an acknowledgement message back to the Level 1 Gateway in step 7 of FIG. 11. In response, the Level 1 Gateway in step 8 sends an acknowledgement message back to the OSS in step 8 that the event is loaded into the network. The OSS in response sends a confirmation message in step 9 to the VIP.

At the time the event is to be broadcast by the VIP (step 10), the access subnetwork controller sends a command to the set top box controller to send the authorization keys to the NIMs. After the event, the Level 1 Gateway adds the event to the VIP profile for billing. Upon completion of the event, the ACC 4000D in step 12 changes the authorization keys and removes the event from the schedule. Finally, at the end of the event, the Level 1 Gateway in step 13 will remove the event from schedule and close the billing record. As previously indicated, the Level 1 Gateway will later send the billing and usage statistics to the OSS.

Thus, as shown above, the OSS is primarily responsible for overall service creation, service activation, and service control of network services generally. The Level 1 Gateway, however, is primarily responsible for on-line services between the VIPs and the video information users. As such, the OSS generally will preprovision bandwidth for IMTV purposes. A more detailed description of the control functionality associated with IMTV services is found in commonly-assigned copending application Ser. No. 08/413,812, filed Mar. 28, 1995, entitled "LEVEL 1 GATEWAY FOR VIDEO DIAL TONE NETWORKS" (Atty Docket No. 680-093A), the disclosure of which is hereby incorporated in its entirety by reference. In addition, detailed descriptions regarding the control and operations of the access subnetwork controller is found in commonly-assigned copending application Ser. No. 08/413,810, filed Mar. 28, 1995, entitled "ACCESS SUBNETWORK CONTROLLER FOR VIDEO DIAL TONE NETWORKS" (Atty Docket No. 680-093B), the disclosure of which is incorporated herein by reference. Finally, while the OSS of the present invention is primarily directed to "semi dynamic" allocation of network resources for IMTV purposes, the routing of broadband data throughout the network is described in more detail with respect to the ATM packet demultiplexers in the VNH and the local video access node in commonly-assigned U.S. patent application Ser. No. 08/413,207, filed Mar. 28, 1995, entitled "ATM PACKET DEMULTIPLEXER FOR USE IN A FULL SERVICE NETWORK HAVING DISTRIBUTED ARCHITECTURE" (Atty Docket No. 680-116), the disclosure of which is hereby incorporated by reference.

As shown above, the present invention provides an operational support system for use in information networks providing transport of data including broadband video and signaling data. Although the disclosed operational support system is disclosed with respect to a video system using hybrid-fiber coax, one having ordinary skill in the art will appreciate that the disclosed operational support system is also applicable to other networks using other local access technologies, as shown in the above-identified co-pending application Ser. No. 08/413,812, filed Mar. 28, 1995, entitled "LEVEL 1 GATEWAY FOR VIDEO DIAL TONE NETWORKS" (Atty Docket No. 680-093A), the disclosure of which is hereby incorporated in its entirety by reference. In addition, the above-described operational support system is applicable to other transport technologies, such as wireless systems, as shown in co-pending application Ser. No. 08/405,558, filed Mar. 16, 1995, entitled "SIMULTANEOUS OVERLAPPING BROADCASTING OF DIGITAL PROGRAMS" (Atty Docket No. 680-130), the disclosure of which is hereby incorporated in its entirety by reference.

Finally, one having ordinary skill in the art will recognize that the disclosed embodiment is not limited to service creation and service activation, but is also applicable to service assurance and network maintenance operations, such as trouble identification, trouble notification, trouble verification, trouble location, trouble repair, and service verification.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A communication network for transporting information for subscribers including a plurality of information providers and a plurality of information users, the communication network comprising:

a backbone subnetwork capable of providing point-to-point two-way communication for interactive data along assigned virtual paths;

an access subnetwork for distributing interactive and broadcast information to said information users, comprising:
  (a) a plurality of node hubs, each receiving a consolidated broadcast signal and comprising first means for integrating said received broadcast signal with a corresponding local-source broadcast signal in accordance with first provisioning data and outputting a localized broadcast signal,
  (b) a plurality of end offices arranged in groups, each of said groups receiving said localized broadcast signal from a corresponding one of said node hubs, each one of said end offices comprising second means for integrating said received localized broadcast signal with interactive data designated for a specified subscriber served by said corresponding end office and being supplied to said one end office by said backbone subnetwork, said second means outputting said designated interactive data on an assigned local transmission path corresponding to said specified subscriber, said integrated localized broadcast signal and said designated interactive data on said assigned local transmission path being output as a local distribution signal generated in accordance with end office provisioning data,
  (c) means for distributing said local distribution signal including said designated interactive data to terminal devices of said information users served by said one end office, and
  (d) an access subnetwork controller controlling routing of said integrated localized broadcast signal and said designated interactive data throughout said access subnetwork, said access subnetwork controller assigning said assigned local transmission path in response to a session request and in accordance with access subnetwork provisioning data including said first provisioning data and said end office provisioning data;

a broadcast subnetwork comprising:
  (1) a broadcast consolidation section for consolidating incoming data streams from respective information providers, in accordance with a translation table, into the consolidated broadcast signal, and
  (2) fiber optic means for transporting said consolidated broadcast signal to said node hubs;

a control subnetwork for controlling said transport of said information for said subscribers in accordance with said provisioning of network resources, said control subnetwork outputting control signals to said access subnetwork controller and said backbone subnetwork in response to subscriber service requests; and an operational support system, interfaced at least to the control subnetwork, for provisioning network resources in accordance with activation requests from said subscribers to obtain said assigned virtual paths, said first provisioning data, said subnetwork provisioning data, and said translation table.

2. A network as recited in claim 1, wherein said backbone subnetwork comprises a PVC controller storing data defining said assigned virtual paths, said assigned virtual paths comprising dedicated virtual paths to each of said node hubs, each of said end offices, said access subnetwork controller, said broadcast consolidation section and said control subnetwork, said dedicated virtual paths being provisioned by said operational support system.

3. A network as recited in claim 1, wherein said operational support system generates a profile of each of said subscribers in response to corresponding service requests.

4. A network as recited in claim 3, wherein said operational support system comprises a subscriber interface adapted to receive remote provisioning information from said subscribers, said operational support system updating said corresponding subscriber profile in response to said remote provisioning information.

5. A network as recited in claim 4, wherein said operational support system downloads at least a portion of said subscriber profile to said control subnetwork.

6. A network as recited in claim 5, wherein said control subnetwork generates an information provider selection menu in accordance with said downloaded portion of said subscriber profile.

7. A network as recited in claim 6, wherein said downloaded portion of said subscriber profile comprises an events schedule listing future events broadcast by said information providers.

8. A network as recited in claim 7, wherein said control subnetwork outputs an access control setup message to said access subnetwork controller in accordance with said events schedule, said access subnetwork controller in response thereto supplying to said control subnetwork an access acknowledgement signal including connection block descriptors.

9. A network as recited in claim 8, wherein said control subnetwork updates said events schedule with said connection block descriptors and outputs to said operational support system an event setup acknowledgement signal including said connection block descriptors, said operational support system updating said subscriber profile for said information provider with said events schedule including said connection block descriptors.

10. A network as recited in claim 9, wherein said subscriber interface enables access to said profile of said information provider by said information provider to retrieve said connection block descriptors.

11. A network as recited in claim 5, wherein said downloaded portion of said subscriber profile comprises an events schedule listing future events broadcast by said information providers.

12. A network as recited in claim 11, wherein said control subnetwork outputs an access control setup message to said access subnetwork controller in accordance with said events schedule, said access subnetwork controller in response thereto supplying to said control subnetwork an access acknowledgement signal including connection block descriptors.

13. A network as recited in claim 12, wherein said control subnetwork updates said events schedule with said connection block descriptors and outputs to said operational support system an event setup acknowledgement signal including said connection block descriptors, said operational support system updating said subscriber profile for said information provider with said events schedule including said connection block descriptors.

14. A network as recited in claim 13, wherein said subscriber interface enables access to said profile of said information provider by said information provider to retrieve said connection block descriptors.

15. A network as recited in claim 12, wherein said access subnetwork further comprises encryption means, said access subnetwork controller outputting a user decryption signal in response to said access control setup message, said encryption means in response thereto downloading decryption keys to a group of said information users authorized to receive said future events, respectively.

16. A network as recited in claim 11, wherein said downloaded portion of said subscriber profile further comprises an information user profile.

17. A network as recited in claim 16, wherein said information user profile comprises a network address, a digital entertainment terminal address, and subscription information identifying at least one of the information providers.

18. A network as recited in claim 16, wherein said information user profile is updated in response to an on-line service request by said corresponding information user to subscribe to a new information provider, said control subnetwork in response thereto uploading said updated user profile to said operational support system.

19. A network as recited in claim 18, wherein said operational support system supplies said updated user profile to said new information provider via said subscriber interface.

20. A network as recited in claim 4, wherein said control subnetwork uploads billing and usage statistics to said operational support system, said operational support system supplying said billing and usage statistics to said corresponding information providers via said subscriber interface.

21. A network for transporting broadband data for subscribers including a plurality of information providers and plurality of information users each having digital entertainment terminals, comprising:

a control subnetwork for controlling setup and tear-down of broadband communication paths, said control subnetwork adapted to access a level 2 gateway to provide connection requests to said information providers;

a backbone subnetwork for providing point-to-point, two-way communication sessions for broadband interactive multimedia communications signals throughout said network, said backbone subnetwork adapted to provide said broadband communication sessions between at least one of said information users and said level 2 gateway, said backbone subnetwork comprising a virtual circuit controller for maintaining communication paths during said communication sessions;

a broadcast subnetwork for consolidating a plurality of broadcast information signals from information providers and distributing said consolidated broadcast information signals throughout a serving area of said network;

an access subnetwork receiving said consolidated broadcast information signals from said broadcast subnetwork and said broadband interactive multimedia communications signals from said backbone subnetwork for transmission to said digital entertainment terminals, and transmitting signals from said digital entertainment terminals to said backbone subnetwork, said access subnetwork comprising an access subnetwork controller controlling the access subnetwork in response to an access control message from said control subnetwork, to provide two-way communications between said at least one information user and said level 2 gateway and to control access by the digital entertainment terminals to the consolidated broadcast information signals; and a service creation and activation system outputting network creation messages for said control subnetwork, said backbone subnetwork, said broadcast subnetwork, and said access subnetwork, said service creation and activation system generating an assignable inventory database in accordance with acknowledgements of said network creation messages, said service creation and activation system provisioning network resources from said inventory database in response to a service activation request for a subscriber.

22. A network as recited in claim 21, wherein said virtual circuit controller stores data defining said assigned virtual paths, said assigned virtual paths comprising dedicated virtual paths to said access subnetwork controller, said broadcast subnetwork and said control subnetwork, said dedicated virtual paths being provisioned by said service creation and activation system.

23. A network as recited in claim 21, wherein said service creation and activation system comprises a subscriber database storing a profile of each of said subscribers in generated by provisioning of said network resources from said inventory database in response to corresponding service requests.

24. A network as recited in claim 23, wherein said service creation and activation system comprises a subscriber interface adapted to receive remote provisioning information from said subscribers, said operational support system comprising means for updating said corresponding subscriber profile in response to said remote provisioning information.

25. A network as recited in claim 24, wherein said service creation and activation system downloads at least a portion of said subscriber profile to said control subnetwork via said backbone subnetwork.

26. A network as recited in claim 25, wherein said downloaded portion of said subscriber profile comprises an events schedule listing future events broadcast by said information providers.

27. A network as recited in claim 26, wherein said control subnetwork outputs an access control setup message to said access subnetwork controller in accordance with said events schedule, said access subnetwork controller in response thereto supplying to said control subnetwork an access acknowledgement signal including connection block descriptors.

28. A network as recited in claim 27, wherein said control subnetwork updates said events schedule with said connection block descriptors and outputs to said service creation and activation system an event setup acknowledgement signal including said connection block descriptors, said service creation and activation system updating said subscriber profile for said information provider with said events schedule including said connection block descriptors.

29. A network as recited in claim 28, wherein said subscriber interface enables access to said profile of said information provider by said information provider to retrieve said connection block descriptors.

30. A network as recited in claim 26, wherein said downloaded portion of said subscriber profile further comprises an information user profile.

31. A network as recited in claim 30, wherein said information user profile comprises a network address, a digital entertainment terminal address, and subscription information identifying at least one of the information providers.

32. A network as recited in claim 30, wherein said information user profile is updated in response to an on-line service request by said corresponding information user to subscribe to a new information provider, said control subnetwork in response thereto uploading said updated user profile to said subscriber database stored in said service creation and activation system.

33. A network as recited in claim 32, wherein said service creation and activation system supplies said updated user profile to said new information provider via said subscriber interface.

34. In a network serving a plurality of subscribers including information providers and information users having digital entertainment terminals, wherein the network comprises:
- a backbone subnetwork providing point-to-point communication sessions and having a virtual circuit controller controlling establishment of said sessions throughout the backbone subnetwork,
- a broadcast subnetwork distributing broadband data from information providers throughout a serving area of said network,
- an access subnetwork receiving said broadband data from said broadcast subnetwork and downstream signals of said sessions and distributing said received broadband data and downstream signals to said digital entertainment terminals of said information users, and receiving upstream signals from said digital entertainment terminals and supplying to said backbone subnetwork, said access subnetwork comprising an access subnetwork controller controlling said access subnetwork,
- a control subnetwork controlling data transport throughout said network, and
- an operational support system comprising an assignable inventory database;
- a method comprising the steps of:
  (1) receiving at said operational support system a subscriber activation request;
  (2) establishing a connection between the network and a subscriber at a network interface;
  (3) assigning a logical address to said connection;
  (4) provisioning bandwidth on at least one digital channel from said assignable inventory database in accordance with said subscriber activation request and generating corresponding bandwidth assignment information;
  (5) outputting from said operational support system an activation request, comprising said logical address and said bandwidth assignment information, to said control subnetwork;
  (6) outputting from said control subnetwork connection said bandwidth assignment information to said access subnetwork controller;
  (7) defining within said access subnetwork controller connection paths throughout said access subnetwork in accordance with said bandwidth assignment information and outputting connection block descriptors from said access subnetwork controller to said control subnetwork, said connection block descriptors identifying said connection paths;
  (8) outputting from said operational support system broadcast provisioning data to said broadcast subnetwork controller in accordance with said subscriber activation request;
  (9) returning acknowledgement messages to said operational support system;
  (10) creating a subscriber profile in said operational support system in response to said acknowledgement messages; and
  (11) outputting from said operational support system a subscription acknowledgement to said subscriber.

35. A method as recited in claim 34, wherein said step (5) comprises the steps of:
- receiving transport information from said subscriber identifying a new video information user subscribing to said subscriber;
- establishing a video information user profile comprising a video information user address; and
- outputting at least a part of said video information user profile to said control subnetwork including said video information user address, wherein said bandwidth assignment information includes user-assigned bandwidth.

36. A method as recited in claim 35, wherein said user-assigned bandwidth comprises upstream signaling channel bandwidth, downstream signaling channel bandwidth, and broadcast channel bandwidth, said step (7) comprising the steps of:
- assigning default signaling channels for said upstream and downstream channel bandwidth; and
- outputting said assigned default signaling channels to said control subnetwork as at least a part of said connection block descriptors.

37. A method as recited in claim 36, wherein said step (7) further comprises the steps of:
- supplying said video information user address to the digital entertainment terminal corresponding to said new video information user;
- connecting said digital entertainment terminal corresponding to said new video information user to said access subnetwork;
- receiving from said digital entertainment terminal corresponding to said new video information user said video information user address via a network default signaling channel, said connection block descriptors being output to said control subnetwork in response to the reception of said video information user address via said network default signaling channel.

38. A method as recited in claim 37, further comprising the step of downloading from said control subnetwork to said digital entertainment terminal corresponding to said new video information user said assigned default signaling channels for said upstream and downstream channel bandwidth.

39. A method as recited in claim 34, wherein said subscriber activation request comprises an event request, said step (4) comprising the step of updating said subscriber profile with said event request, said step (5) comprising the steps of:
- receiving said event request at said control subnetwork;
- updating event schedule databases in said control subnetwork with said event request;
- wherein said step (7) comprises the step of:
- receiving an event access request from said control subnetwork;
- establishing authorization tiers for portions of the event corresponding to said event request; and
- providing decryption keys to network interface modules corresponding to authorized subscribers.

40. A method as recited in claim 39, further comprising the steps of:
- supplying billing information corresponding to said event from said control subnetwork to said operational support system; and
- updating said subscriber profile with said billing information.

41. A method as recited in claim 34, wherein said step (2) comprises the step of receiving transport information identifying a transport termination location at said network interface located at said broadcast subnetwork.

42. A method as recited in claim 34, wherein said step (8) comprises the steps of:
- supplying to said broadcast subnetwork point of interconnect information identifying said connection at said network interface; and supplying a data stream translation table to said broadcast subnetwork from said operational support system identifying data stream identifiers assigned to said subscriber.

43. In a network serving a plurality of subscribers including information providers and information users having digital entertainment terminals, wherein the network comprises:
- a backbone subnetwork providing point-to-point communication sessions,
- a broadcast subnetwork distributing broadband data from information providers throughout a serving area of said network,
- an access subnetwork receiving said broadband data from said broadcast subnetwork and downstream signals of said sessions and distributing said received broadband data and downstream signals to said digital entertainment terminals of said information users, and receiving upstream signals from said digital entertainment terminals and supplying to said backbone subnetwork, said access subnetwork comprising an access subnetwork controller controlling said access subnetwork,
- a control subnetwork controlling data transport throughout said network, and
- an operational support system comprising an assignable inventory database and a living unit database;
- a method for activating an information user comprising the steps of:
    (1) receiving at said operational support system a user activation request via a service provider interface, said user activation request comprising a user identifier;
    (2) accessing the living unit database to obtain a user connection status corresponding to said user identifier;
    (3) establishing a user profile including an assigned user network address, and information from said user activation request and said user connection status;
    (4) assigning user premises installation in accordance with said user connection status;
    (5) provisioning bandwidth on at least one digital channel from said assignable inventory database in accordance with said user activation request and generating corresponding bandwidth assignment information;
    (6) outputting from said operational support system a user connection request, comprising said assigned user network address and said bandwidth assignment information, to said control subnetwork;
    (7) outputting from said control subnetwork connection said bandwidth assignment information to said access subnetwork controller;
    (8) defining within said access subnetwork controller broadcast and signaling paths throughout said access subnetwork in accordance with said bandwidth assignment information and outputting connection block descriptors from said access subnetwork controller to said control subnetwork, said connection block descriptors identifying said broadcast and signaling paths;
    (9) returning acknowledgement messages to said operational support system;
    (10) generating in said operational support system an acknowledgement to said user activation request.

44. A method as recited in claim 43, wherein said step (8) comprises the steps of:
supplying said assigned user network address to the digital entertainment terminal corresponding to said information user;
connecting said digital entertainment terminal corresponding to said information user to said access subnetwork;
receiving from said digital entertainment terminal corresponding to said information user said user network address via a network default signaling channel, said connection block descriptors being output to said control subnetwork in response to the reception of said user network address via said network default signaling channel.

45. A method as recited in claim 44, further comprising the step of downloading from said control subnetwork to said digital entertainment terminal corresponding to said new video information user said assigned default signaling channels for said upstream and downstream channel bandwidth.

46. A communication network comprising:
- a plurality of user terminals receiving and processing broadband information;
- a plurality of broadband information sources;
- a backbone subnetwork providing point-to-point communication sessions for interactive multimedia communications;
- a backbone subnetwork controller controlling establishment of point-to-point communication sessions through the backbone subnetwork;
- a broadcast subnetwork distributing broadband information signals from at least one of the broadband information sources;
- an access subnetwork providing dynamically allocated communications between one of the user terminals and the backbone subnetwork, and receiving broadcast information signals from the broadcast subnetwork and distributing the broadcast information signals to authorized ones of the user terminals;
- an access subnetwork controller controlling the access subnetwork to provide the communications between the one user terminal and the backbone subnetwork and to control terminal authorizations for reception of the broadcast information signals;
- a gateway interacting with the backbone subnetwork controller, the access subnetwork controller and the user terminals to control set-up of at least some of the communications through the communication network; and
- an operational support system coupled to communicate with and supply provisioning data to the backbone subnetwork controller, the broadcast subnetwork, the access subnetwork controller and the gateway for provisioning services through the network and activating receipt of selected services through identified ones of the user terminals.

47. A communication network as in claim 46, wherein the operational support system includes means for providing an interface to a control system of a service provider operating at least one of the broadband information sources.

48. A communication network as in claim 46, wherein the operational support system comprises:
- a service provider database containing data relating to information services provided by the broadband information sources;
- a user database data relating to the users and specific information services subscribed to be individual users.

49. A communication network as in claim 48, wherein the operational support system further comprises an assignable inventory database identifying available resources in the backbone subnetwork, the broadcast subnetwork and access subnetwork.

50. A communication network as in claim 49, wherein the operational support system further comprises a provisioning system for processing data from the databases and in response thereto supplying the provisioning data to the backbone subnetwork controller, the broadcast subnetwork, the access subnetwork controller and the gateway.

51. A communication network as in claim 46, wherein the operational support system includes a backbone subnetwork interface for providing communications links between the operational support system and at least the access subnetwork controller and the gateway.

* * * * *